United States Patent [19] [11] Patent Number: 4,763,241
Egawa et al. [45] Date of Patent: Aug. 9, 1988

[54] IMAGE FORMING APPARATUS

[75] Inventors: Jiro Egawa, Yokohama; Moriya Nagasawa, Hiratuska; Hironobu Machida, Yokohama, all of Japan

[73] Assignee: Kabushiki Kaisha Toshiba, Kawasaki, Japan

[21] Appl. No.: 29,457

[22] Filed: Mar. 23, 1987

[30] Foreign Application Priority Data

Mar. 22, 1986 [JP] Japan ................................ 61-62011

[51] Int. Cl.⁴ .......................................... G01D 15/00
[52] U.S. Cl. .................................... 346/154; 364/519
[58] Field of Search ...................... 346/154, 160, 153.1; 364/518-521; 358/300; 400/119; 355/3 R

[56] References Cited

U.S. PATENT DOCUMENTS 4,566,043 1/1986 Tamura ................................. 346/160
4,717,925 1/1988 Shibata et al. ....................... 346/160

Primary Examiner—Arthur G. Evans
Attorney, Agent, or Firm—Cushman, Darby & Cushman

[57] ABSTRACT

An image forming apparatus including pairs of a latent image forming unit for forming the latent images with the scanning of the laser beams and a developing unit for developing the latent images which are disposed around the image bearing member to accomplish multi color printing; a detector for detecting a scanning point of a laser beam irradiated before the irradiation of the beam for the image forming; counters for counting detect signals corresponding to the scanning point of the laser beam and for generating allowable signals when the values of the detect signal reaches to predetermined set values; and a write control unit for controlling the latent image forming unit to irradiate the beams for the image forming upon the generation of the allowable signals. Namely, print starting points are adjusted in accordance with the scanning point of the laser beam before the irradiation of the beam for the image forming. Therefore, by setting each of the set values in accorance with the colors of printing or the image forming ranges, it is possible to correctly and speedily adjust the print starting points.

9 Claims, 54 Drawing Sheets

FIG.9(A)

| Address | Content | | |
|---|---|---|---|
| 4000<br>4001 | First color top margin table | | |
| 4002<br>4003 | Second color top margin table | | |
| 4004<br>4005 | Left margin table | | |
| 4006<br>4007 | A 3 | Bottom margin table | |
| 4008<br>4009 | | Right margin table | |
| ⋮ | ⋮ | | |
| 4080<br>4081 | A 6 | Bottom margin table | |
| 4082<br>4083 | | Right margin table | |
| 4090<br>⋮ | Top margin coarse adjustment table | Switch | 1<br>2<br>⋮<br>n |
| 40B0<br>⋮ | Top margin fine adjustment table | Switch | 1<br>2<br>⋮<br>n |
| 40D0<br>⋮ | Left margin coarse adjustment table | Switch | 1<br>2<br>⋮<br>n |
| 4100<br>⋮ | Left margin fine adjustment table | Switch | 1<br>2<br>⋮<br>n |
| 4120<br>⋮ | 2 beam scan table | Switch | 1<br>2<br>⋮<br>n |

FIG.9(B)

| Address | Content | |
|---|---|---|
| 6000<br>6001 | Red toner | First development bias table |
| 6002<br>6003 | | Second development bias table |
| 6004<br>6005 | Blue toner | First development bias table |
| 6006<br>6007 | | Second development bias table |
| 6008<br>6009 | Green toner | First development bias table |
| 600A<br>600B | | Second development bias table |
| 600C<br>600D | Black toner | First development bias table |
| 600E<br>600F | | Second development bias table |
| | | |
| 6100<br>6101 | First charging potential control | Surface potential table |
| 6102<br>6103 | | Error in converging |
| 6104<br>6105 | | First time control output |
| 6106<br>6107 | | Minimum correction |
| 6108<br>6109 | | Surface potential limit |
| 610A<br>610B | | Control output upper limit |
| 610C<br>610D | | Control output lower limit |
| 610E<br>610F | Second charging potential control | Surface potential table |
| 6110<br>6111 | | Error in converging |
| 6112<br>6113 | | First time control output |
| 6114<br>6115 | | Minimum correction |
| 6116<br>6117 | | Surface potential limit |
| 6118<br>6119 | | Control output upper limit |
| 611A<br>611B | | Control output lower limit |
| | | |
| 6120<br>⟩<br>⟨ | Temperature correction charging potential | 40°C Correction table<br><br><br><br>10°C Correction table |

FIG.12 (A)

| Command | Abreviation of command | Function |
|---|---|---|
| 01H | SR1 | Status 1 request |
| 02H | SR2 | Status 2 request |
| 04H | SR3 | Status 3 request |
| 07H | SR4 | Status 4 request |
| 08H | SR5 | Status 5 request |
| 0BH | SR6 | Status 6 request |
| 20H | SR7 | Status 7 request |
| 23H | CSTU | Indicate casset top |
| 25H | CSTL | Indicate casset bottom |
| 26H | VSYNC | Start image data transfer |
| 29H | SP1 | Indicate first color printing mode |
| 2AH | SP2 | Indicate second color printing mode |
| 2CH | DP1 | Two color printing mode |
| 31H | MF1 | Indicate manual feeding(A4 longitudinal) |
| 32H | MF2 | Indicate manual feeding(A4 longitudinal) |
| 34H | MF3 | Indicate manual feeding(A4 transverse) |
| 37H | MF4 | Indicate manual feeding(A5 longitudinal) |
| 38H | MF5 | Indicate manual feeding(A6 longitudinal) |
| 33H | MF6 | Indicate manual feeding(A4 longitudinal) |
| 3DH | MF7 | Indicate manual feeding(A5 longitudinal) |
| 3EH | MF8 | Indicate manual feeding(A5 transverse) |
| 40H | MF9 | Indicate manual feeding(A6 longitudinal) |

FIG.12(B)

| | D7 | D6 | D5 | D4 | D3 | D2 | D1 | D0 |
|---|---|---|---|---|---|---|---|---|
| Status 1 | | Paper in transport | | VSYNC Request | Manual feeding | Cassete upper/lower | Printing-mode | First color mode Second color mode Two color mode |
| Status 2 | | | Cassette size(upper) | | | Cassette size(lower) | | |
| Status 3 | | | Toner color(first color) | | | Toner color(second color) | | |
| Status 4 | | | Test/maint | Data re-sending | In waiting | Operator call | Serviceman call | |
| Status 5 | | | Toner bag exchang | ON paper | Paper jam | No first color toner | No second color toner | |
| Status 6 | | | | First laser failure | Second laser failure | Scan moter failure | First potential sensor failure | Second potential sensor failure |
| Status 7 | | | | | | Re-sending page number | | |

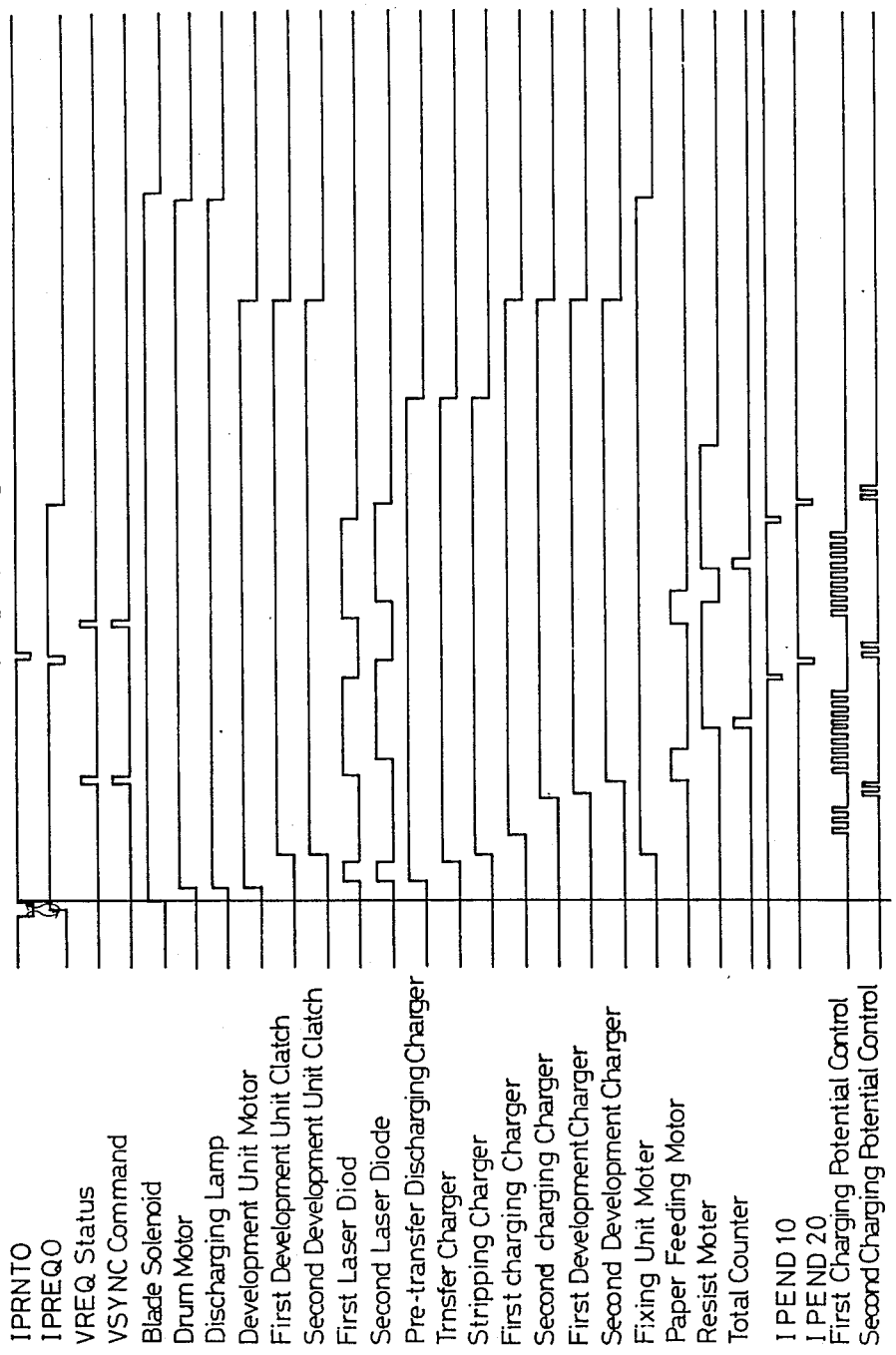

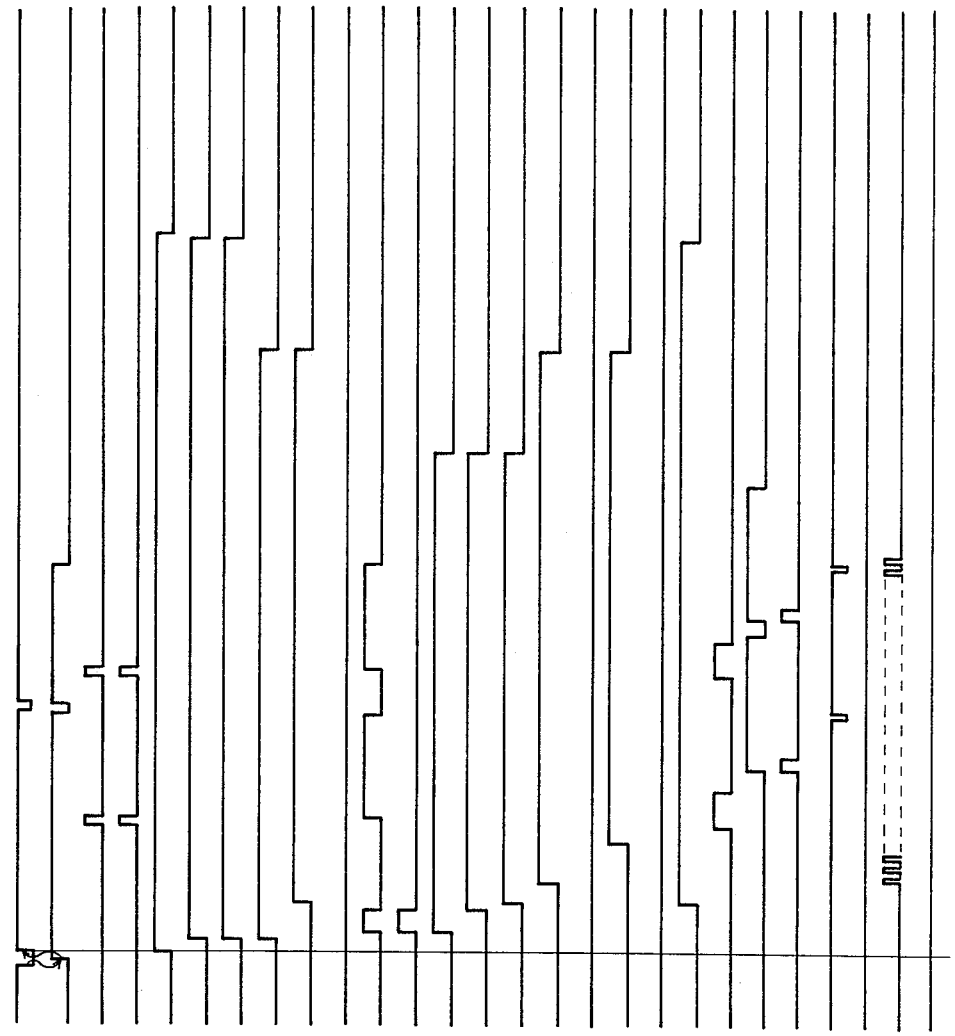

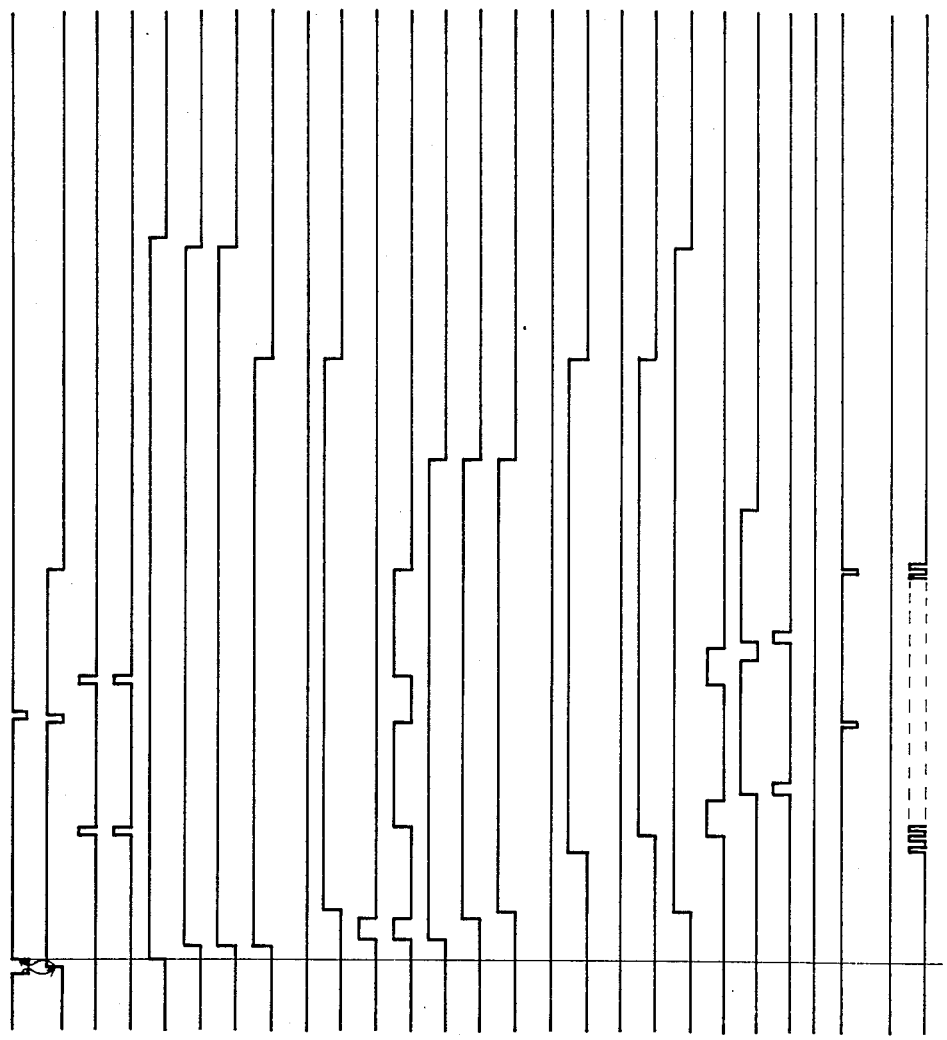

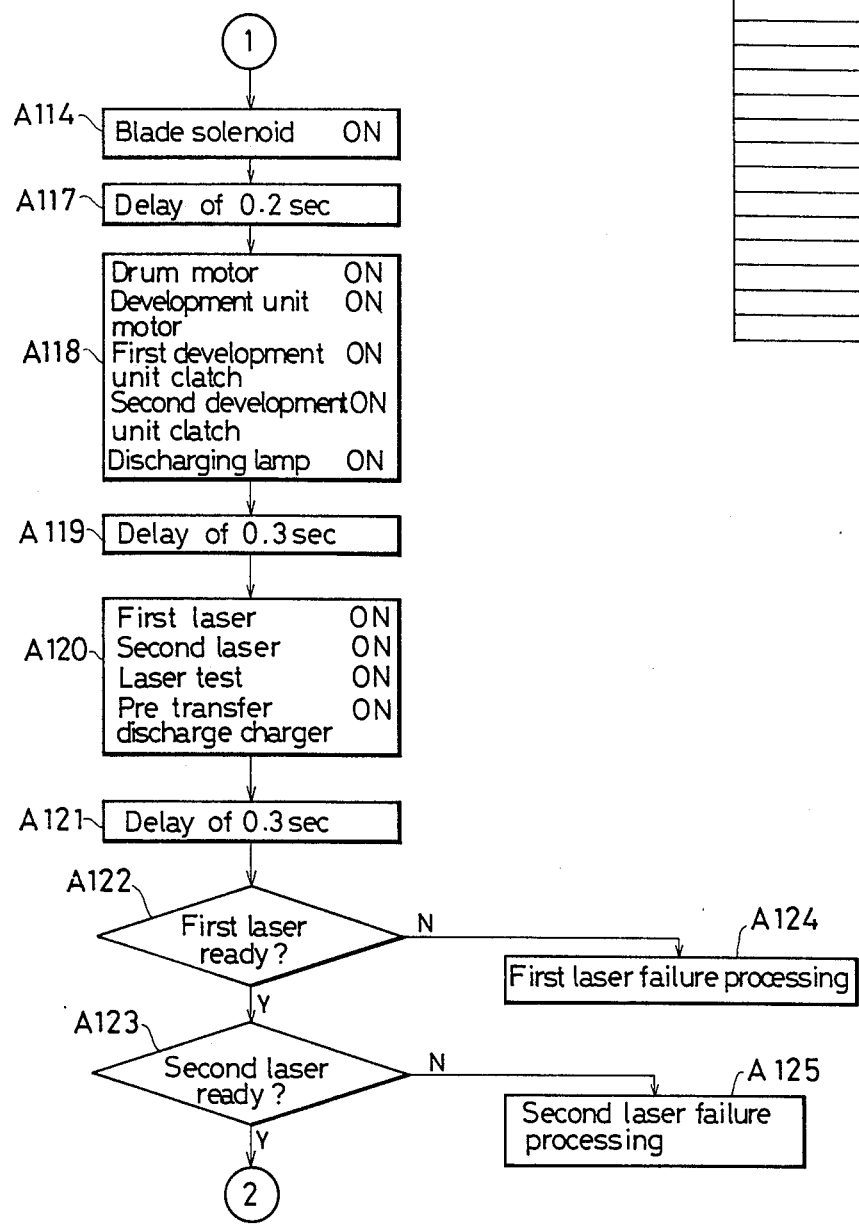

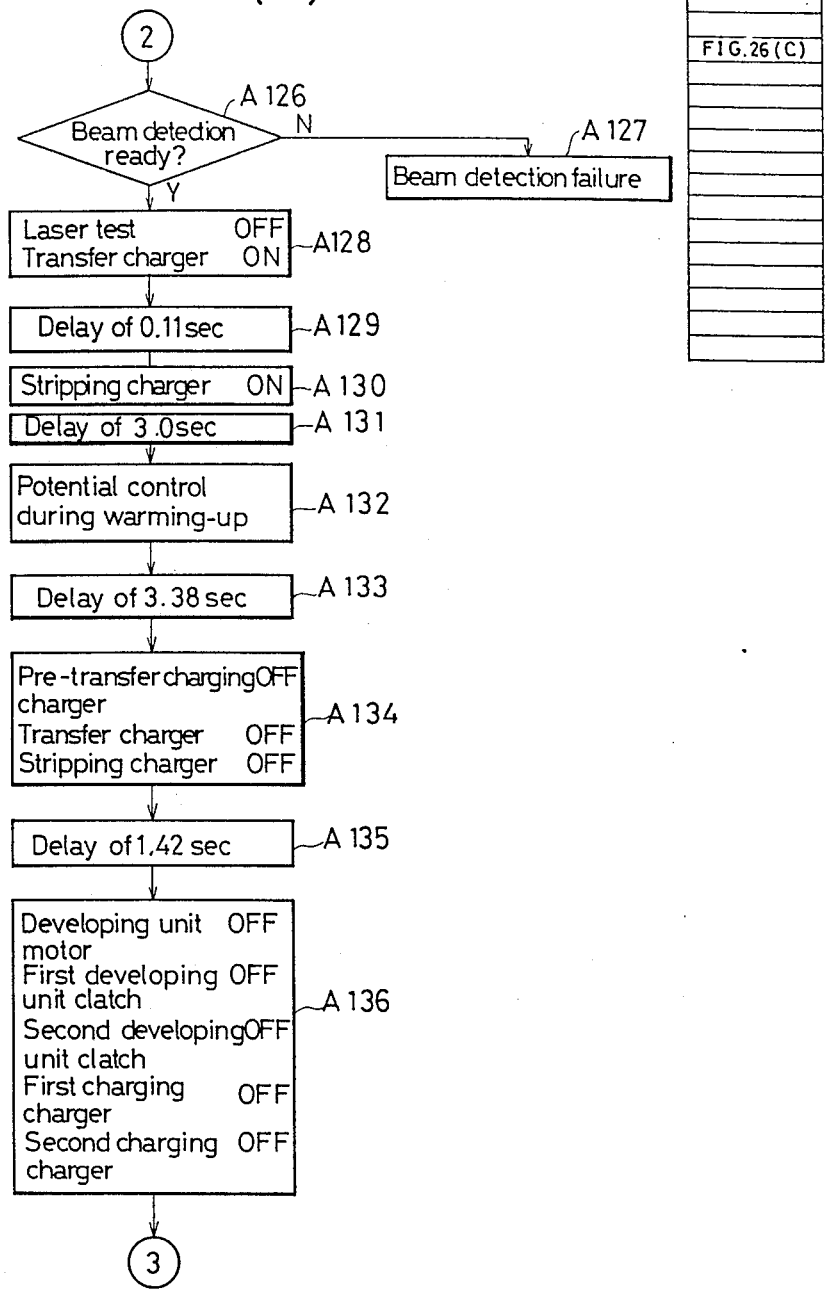

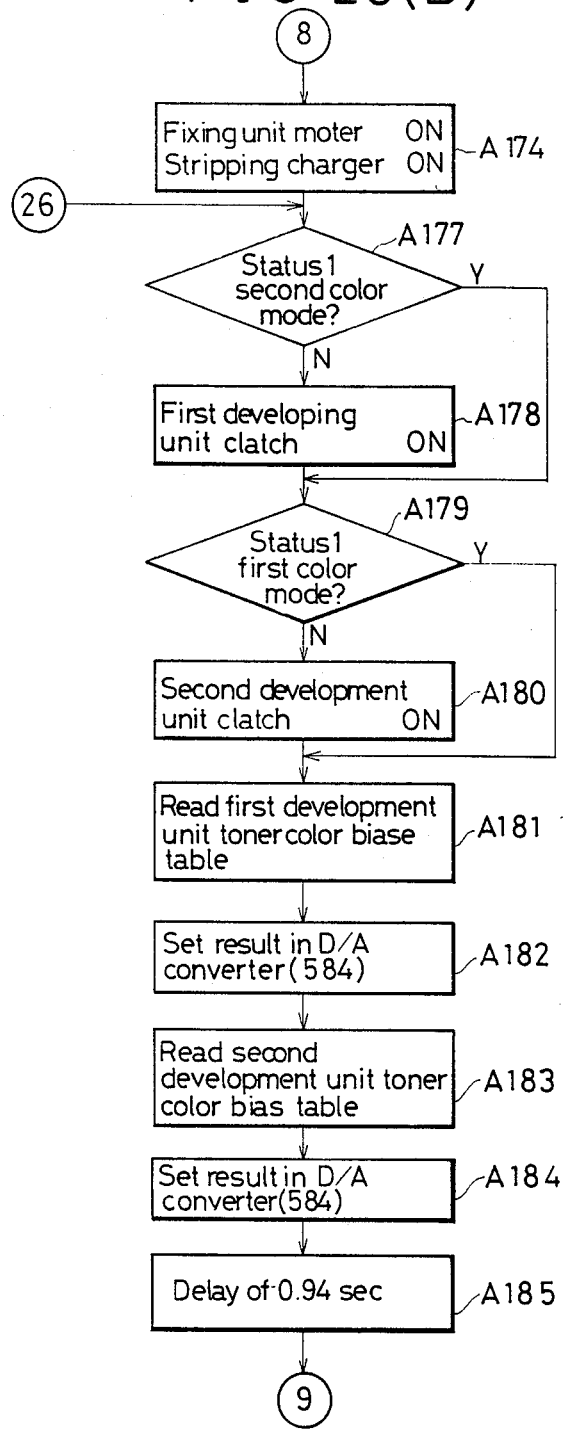
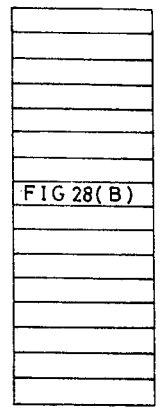
FIG. 28(B)

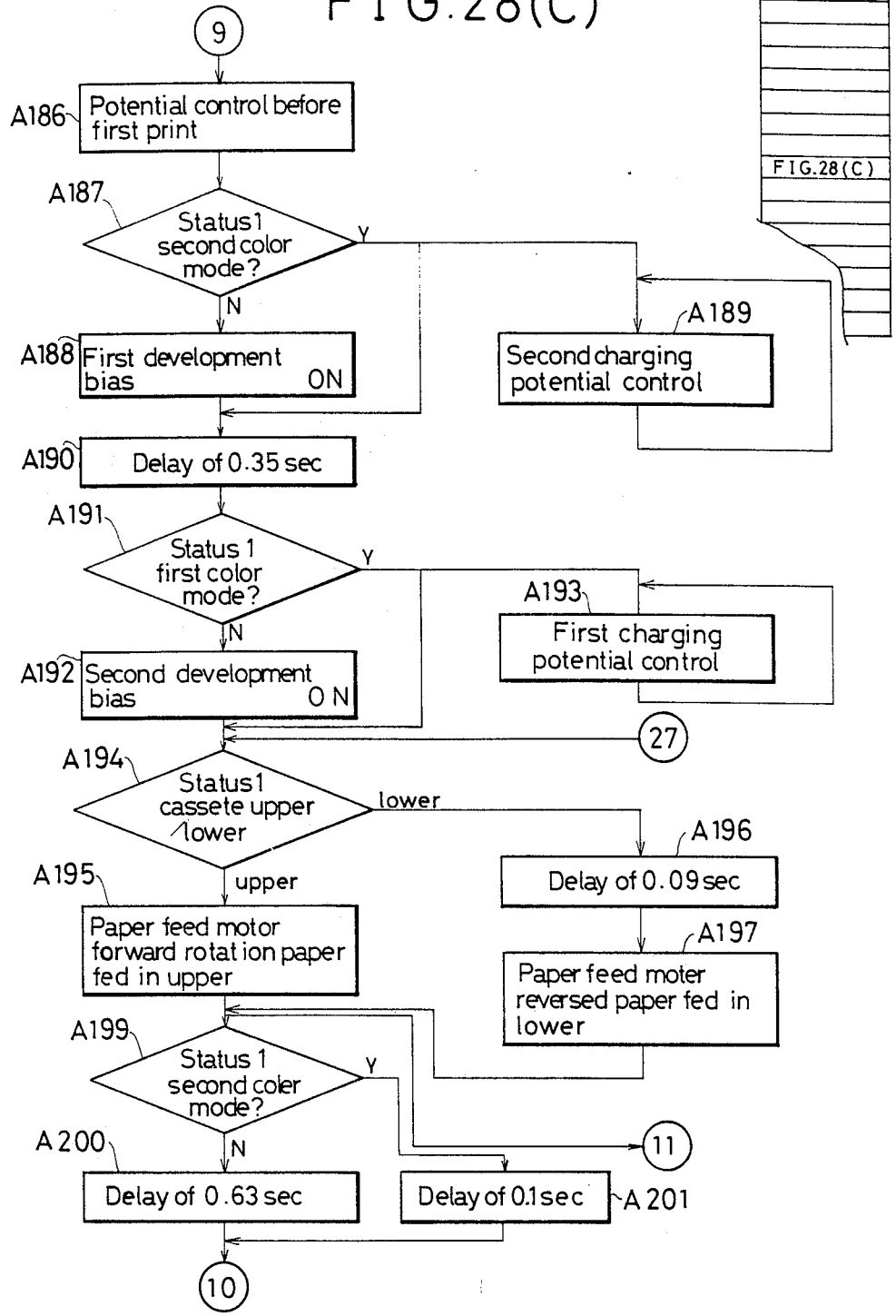

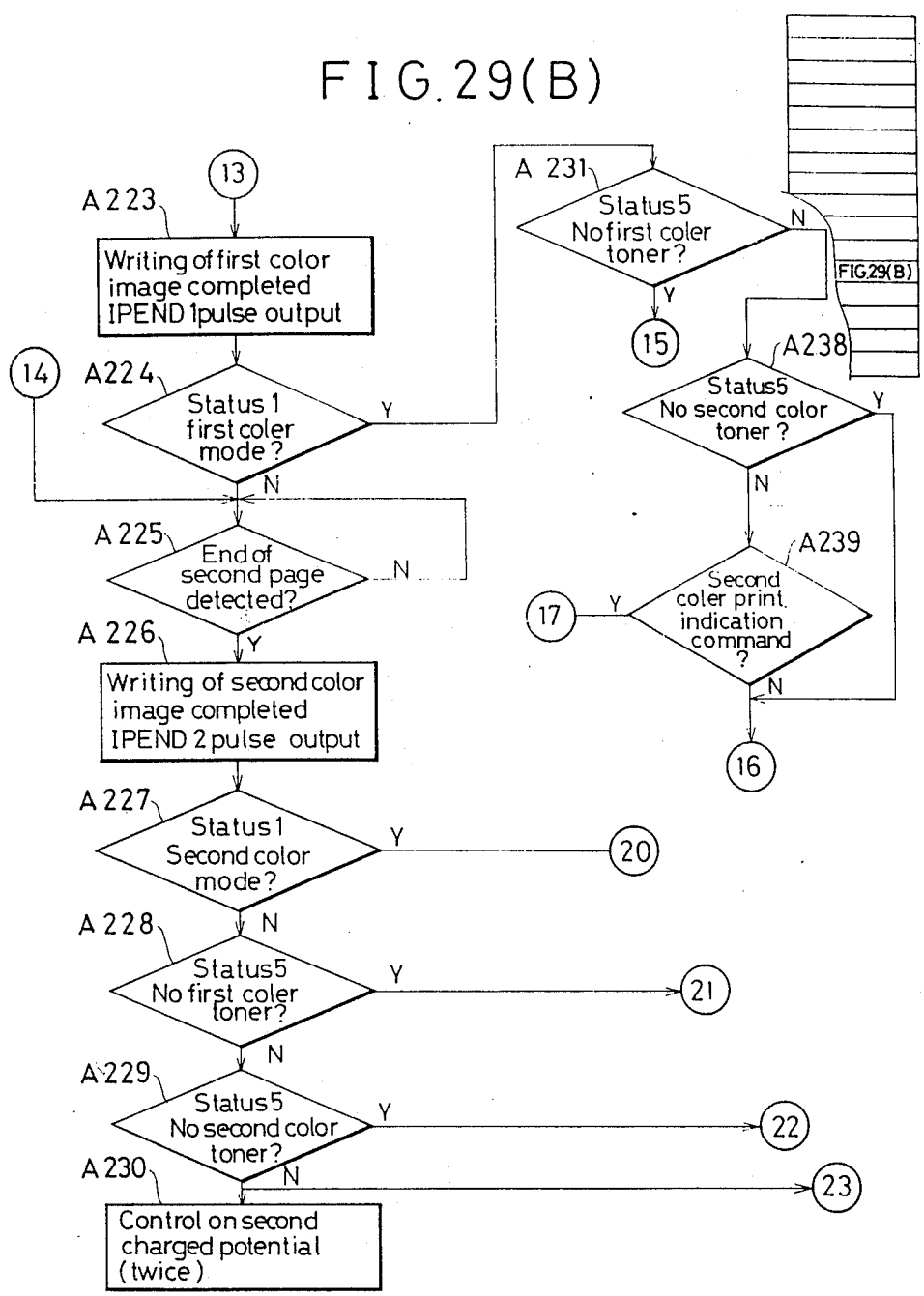

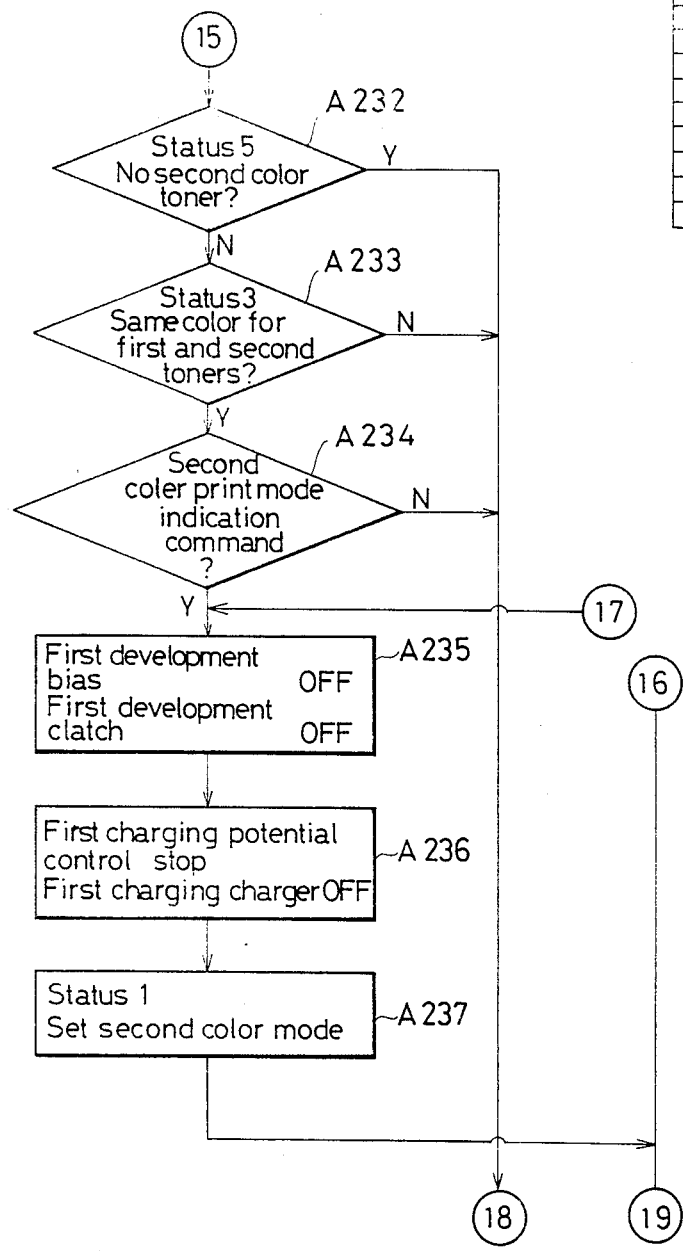

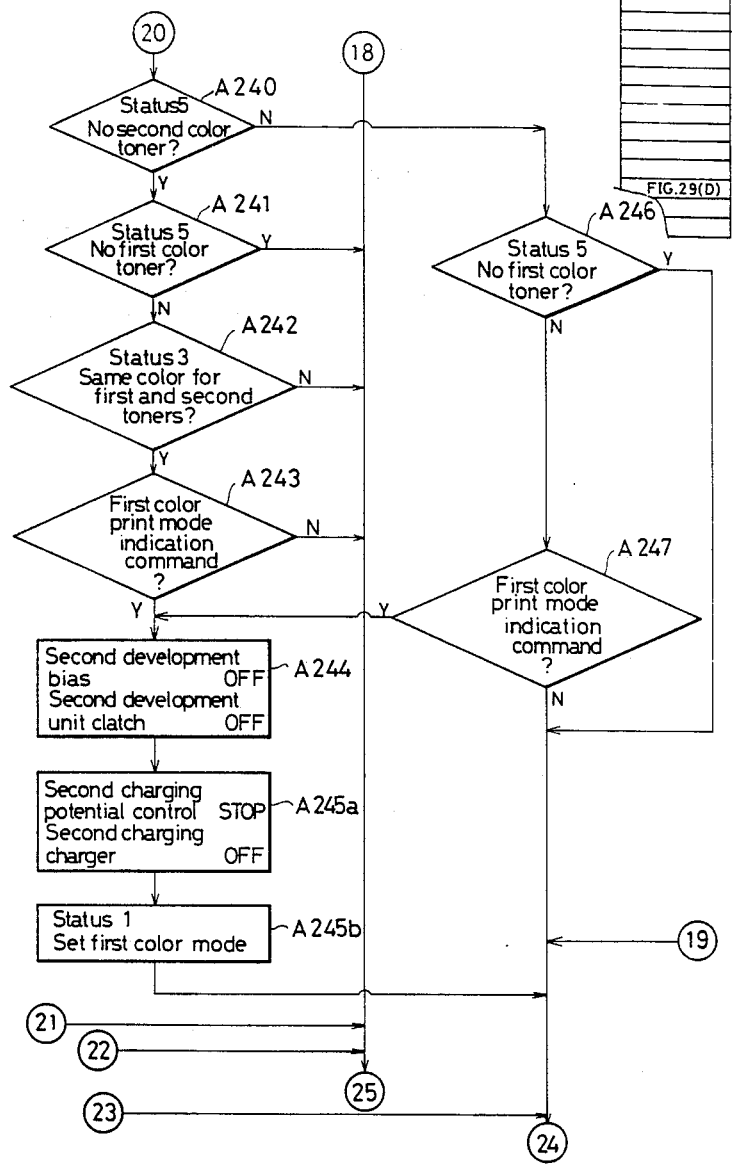

FIG. 30(B)

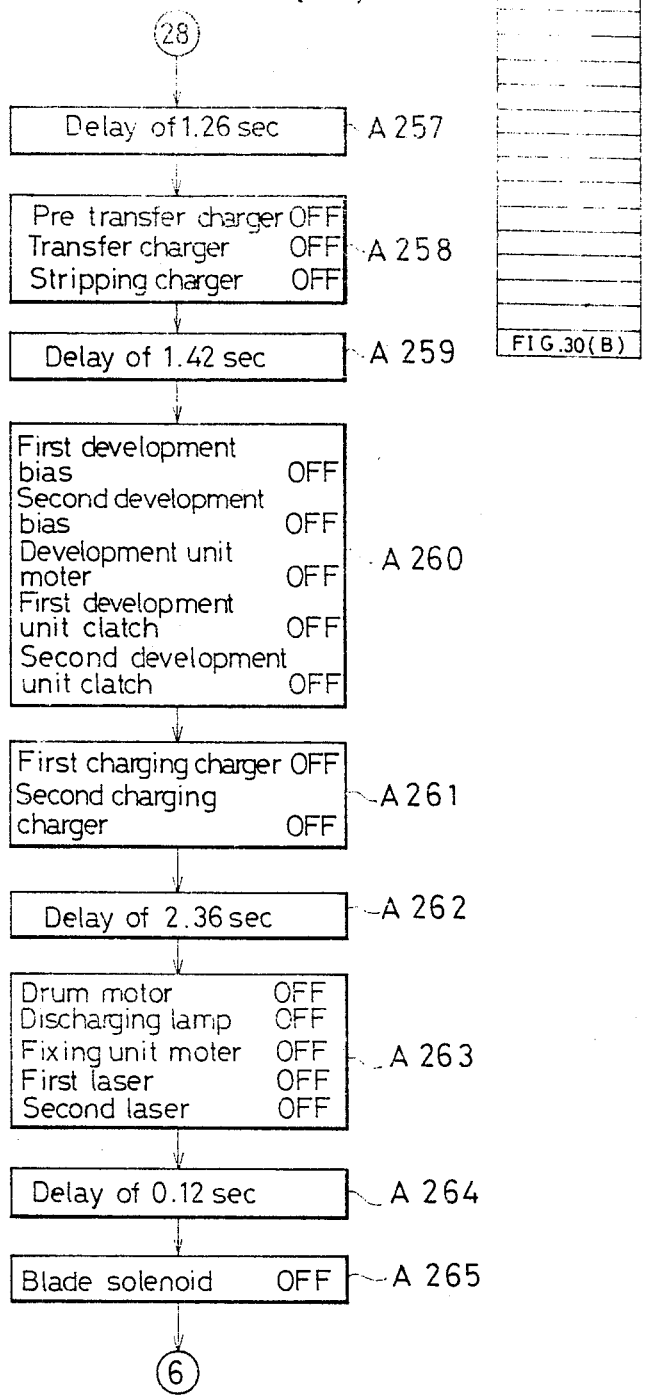

(28)
↓
Delay of 1.26 sec — A 257
↓
Pre transfer charger OFF
Transfer charger OFF — A 258
Stripping charger OFF
↓
Delay of 1.42 sec — A 259
↓
First development bias OFF
Second development bias OFF
Development unit moter OFF — A 260
First development unit clatch OFF
Second development unit clatch OFF
↓
First charging charger OFF
Second charging charger OFF — A 261
↓
Delay of 2.36 sec — A 262
↓
Drum motor OFF
Discharging lamp OFF
Fixing unit moter OFF — A 263
First laser OFF
Second laser OFF
↓
Delay of 0.12 sec — A 264
↓
Blade solenoid OFF — A 265
↓
(6)

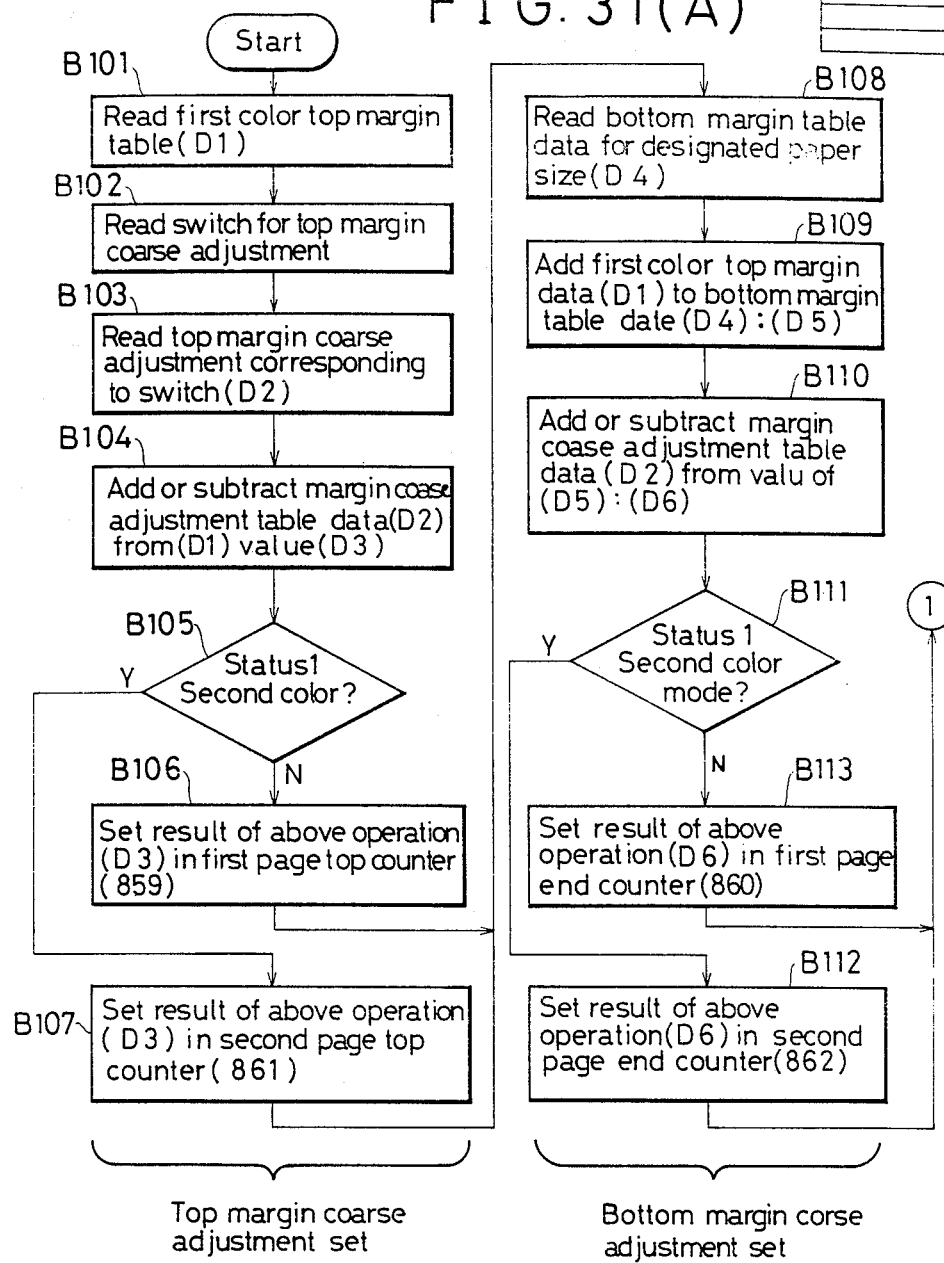

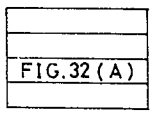
FIG. 32(A)
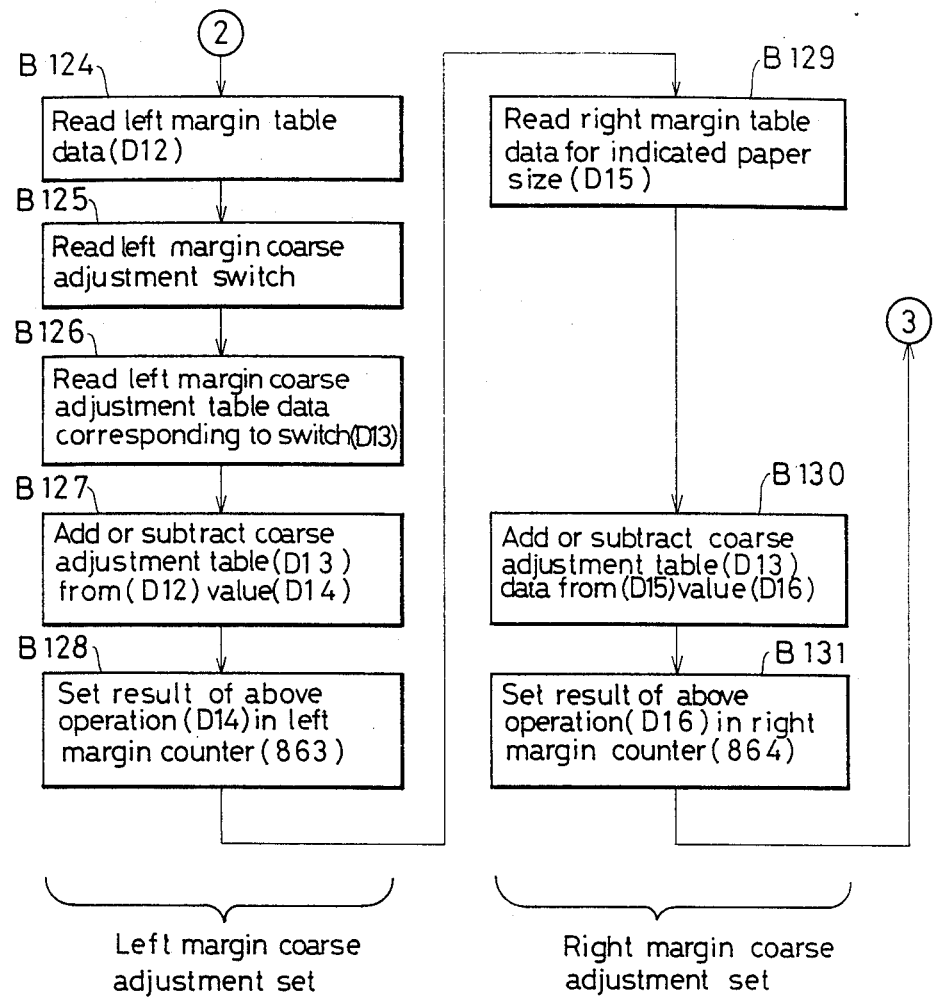

IMAGE FORMING APPARATUS

BACKGROUND OF THE INVENTION

1. Field of the Invention

The present invention relates to an image forming apparatus in which an electrostatic image is formed by emitting a light, such as a laser beam to a charged image bearing member, and the electrostatic image is developed to print the image, particularly to an image forming apparatus which is capable of automatically adjusting starting points of the printing in accordance with the image forming ranges.

2. Description of the Prior Art

A known type of image forming apparatus for plural color printing includes a drum shaped sensitive member 100 as an image bearing member, as shown in FIG. 1. Around the sensitive member 100, there is disposed a first charger 101, a first exposing portion 102, a first developing unit 103, a second charger 104, a second exposing portion 105, a second developing unit 106, a stripping charger 107, a cleaner 110, and discharger 109 in a rotational direction of the sensitive member 100 in that order. The sensitive member 100 is uniformly charged by the first charger 101, a first electrostatic image is formed at the first exposing portion 102, and the image is developed by the first developing unit 103 such that the image is visible at a first color. After that, the sensitive member 100 is charger by the second charger 104, a second electrostatic image is formed at the second exposing portion 105, and the image is developed by the second developing unit 106 to being visible the image at a second color. Two kind toners for the two color is treated to equalize the polarity of one toner to a polarity of another, the two color image is transferred on a member to be transferred, and after the transferring, a residual toner on the sensitive member 100 is cleaned by the cleaner 110 and the electrostatic image is eliminated by the discharger 109. An image forming process is accomplished by carrying out the above pressure.

In that image forming apparatus, it is very important thing to eliminate a gap between a print starting point of the first color and a print starting point of the second color for obtaining a clear color print image. However, in a conventional image forming apparatus, an adjustment of the two print starting points is carried out by an operator an all such occasions. It is very difficult and troublesome thing for the operator to carry out the adjustment in ivery time.

SUMMARY OF THE INVENTION

It is therefore an object of the present invention to provide an image forming apparatus which is capable of quickly and correctly adjusting point starting points for every color printings.

It is another object of the present invention to provide an image forming apparatus which is capable of automatically adjusting print starting points in accordance with image forming ranges, respectively.

One feature of the present invention resides in an image forming apparatus in which a data is recorded by irradiating laser beams on a charged image bearing member to form electrostatic latent images and by developing and transferring the latent images, including: pairs of a latent image forming unit for forming the latent images by irradiating the laser beams and a developing unit for developing the latent images which are disposed around the image bearing member to accomplish uni-color or multi-color printing; a detector for detecting a scanning point of a laser beam irradiated before the irradiation of the beam for the image forming; counters for counting beam detect signals and for generating allowable signals when the values of the detect signals reach to predetermined set values, respectively; and a write control unit for controlling the latent image forming units to irradurate the beams for the image forming upon the generation of the allowable signals. Namely, print starting points are adjusted in accordance with the beam detect signals before the irraduation of the beam for the image forming. Therefore, by setting each of the set values in accordance with the colors of printing or the image forming ranges, it is possible to correctly and speedly adjust the print starting points.

These and other objects, features, and advantages will be better understood from the following description of the invention with reference to the accompanying drawings.

BRIEF DESCRIPTION OF THE DRAWINGS

FIG. 9 shows a content in the ROM data table shown in FIG. 8;

FIGS. 12(A) and 12(B) illustrate details of commands and statuses used in a two color LBP;

FIG. 23 is a timing chart of a process control signal in the two color print mode;

FIG. 24 is a timing chart of a process control signal in a first color print mode;

FIG. 25 is a timing chart of a process control signal in a second color print mode;

DESCRIPTION OF THE PREFERRED EMBODIMENT

Figure 1:
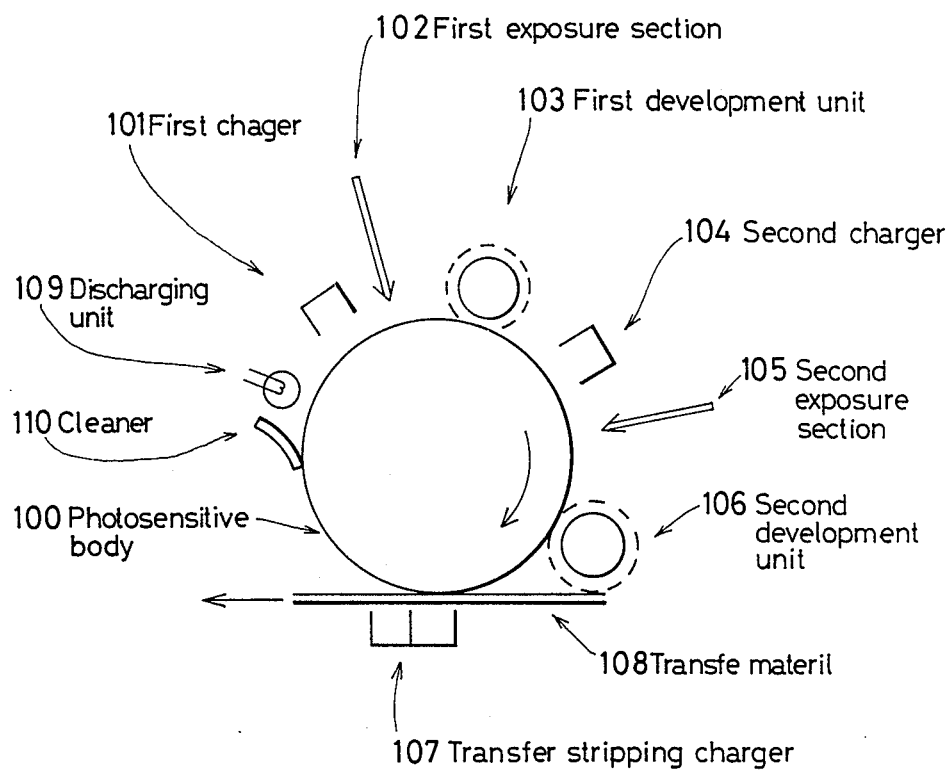
FIG. 1 is a breaf construction of a known type image forming apparatus.
Figure 2:
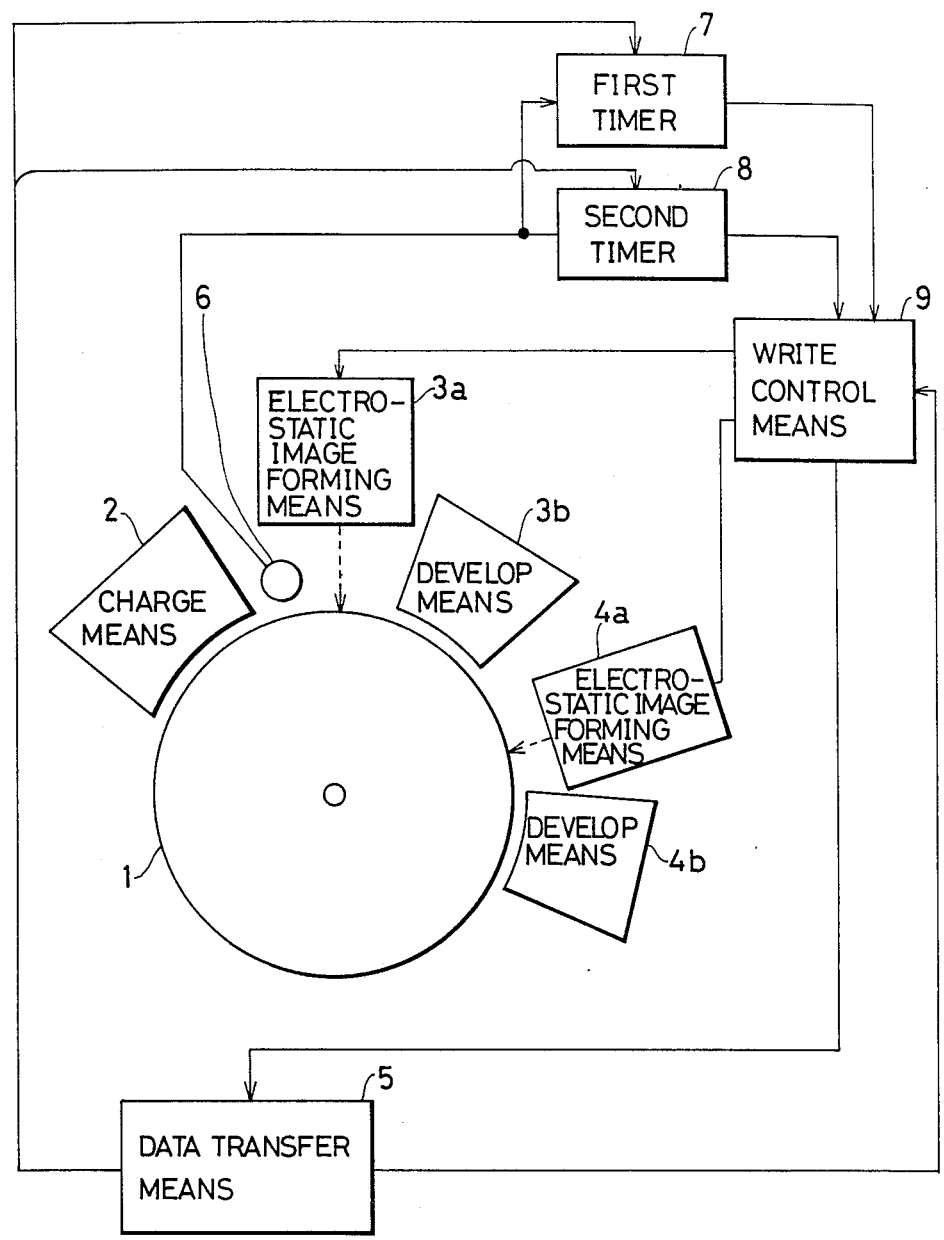
FIG. 2 is a breaf construction of an image forming apparatus in accordance with the present invention.

Referring to FIG. 2, there is shown an image forming apparatus embodying the present invention which includes an image bearing member 1, a charger 2 disposed at an opposite position to the image bearing member 1, a first pair of a latent image forming unit 3a and a developing unit 3b for a first color printing, a second pair of a latent image forming unit 4a and a developing unit 4b for a second color printing. A data transmitting unit 5 is constructed to transmit data to be printed (printing data) for two colors or one of the two colors and a print data transfer start signal. A laser beam detecting unit 6 is constructed to detect a scanning point of either one of laser beams irraduated before the irradiation of the beam for the image forming from the first latent image forming unit 3a or the second latent image forming unit 4a. A first and a second timer 7 and 8 count up to predetermined values the beam detecting signal from the beam detecting unit 6 in response to the print data transfer start signal from the data transmitting unit 5. When the predetermined values are counted by the timers 7 and 8, time up signals are supplied to a writing control unit 9.

By receiving each of the time up signals, the writing control unit 9 is constructed to supply an allowable signal to the data transmitting unit 5 and to drive control the latent image forming units 3a and 4a so as to write to the image bearing member 1 a content of the printing data, which are supplied from the data transmitting unit 5 in accordance with the allowable signal. In that manner, each of starting points of the first and second color printing is automatically and correctly adjusted without a time loss. Moreover, by providing a construction in which the predetermined values for the first and second timer 7 and 8 are automatically controlled by a microprocessor, it is possible to automatically adjust each of the print starting points for the first and second color printing.

Figure 3:
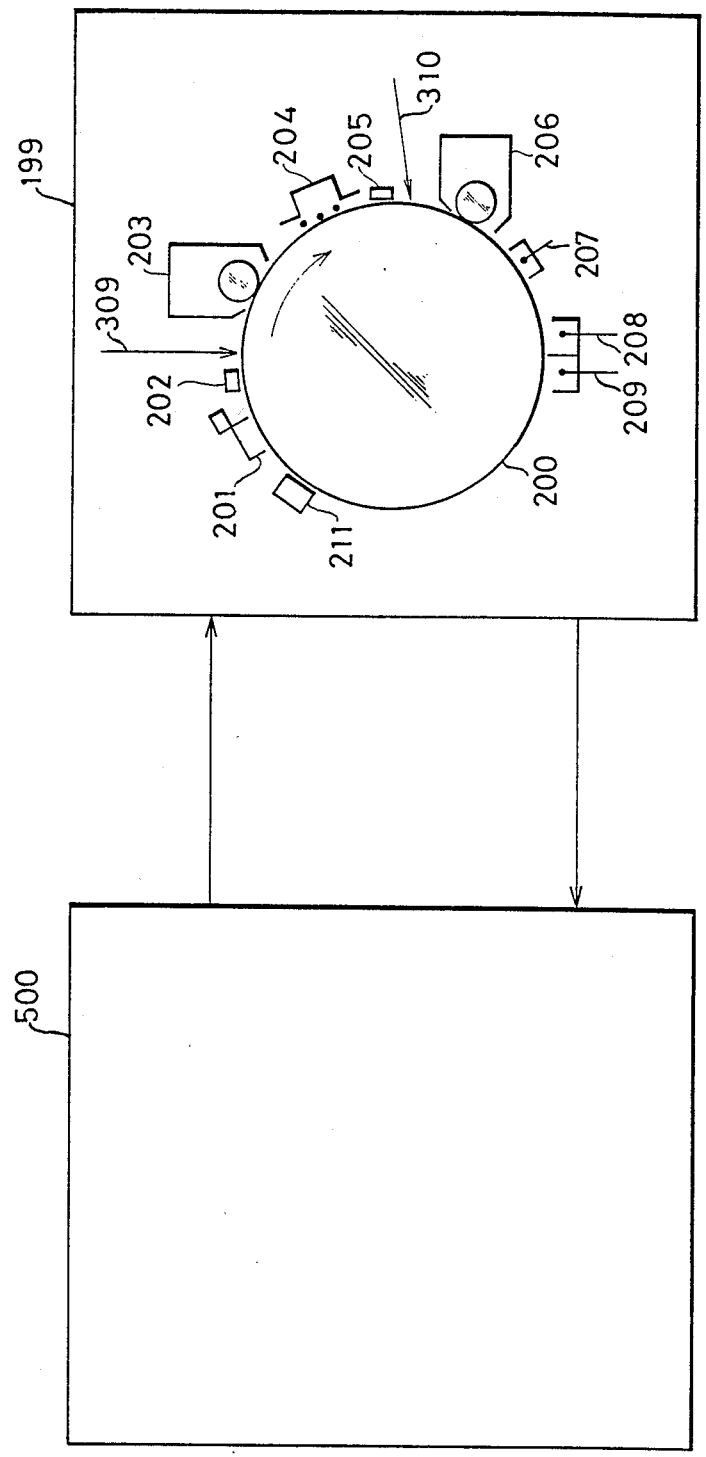
FIG. 3 is a breaf construction of a system of a two color LBP equipped with an image forming apparatus embodying the present invention.
Figure 4:
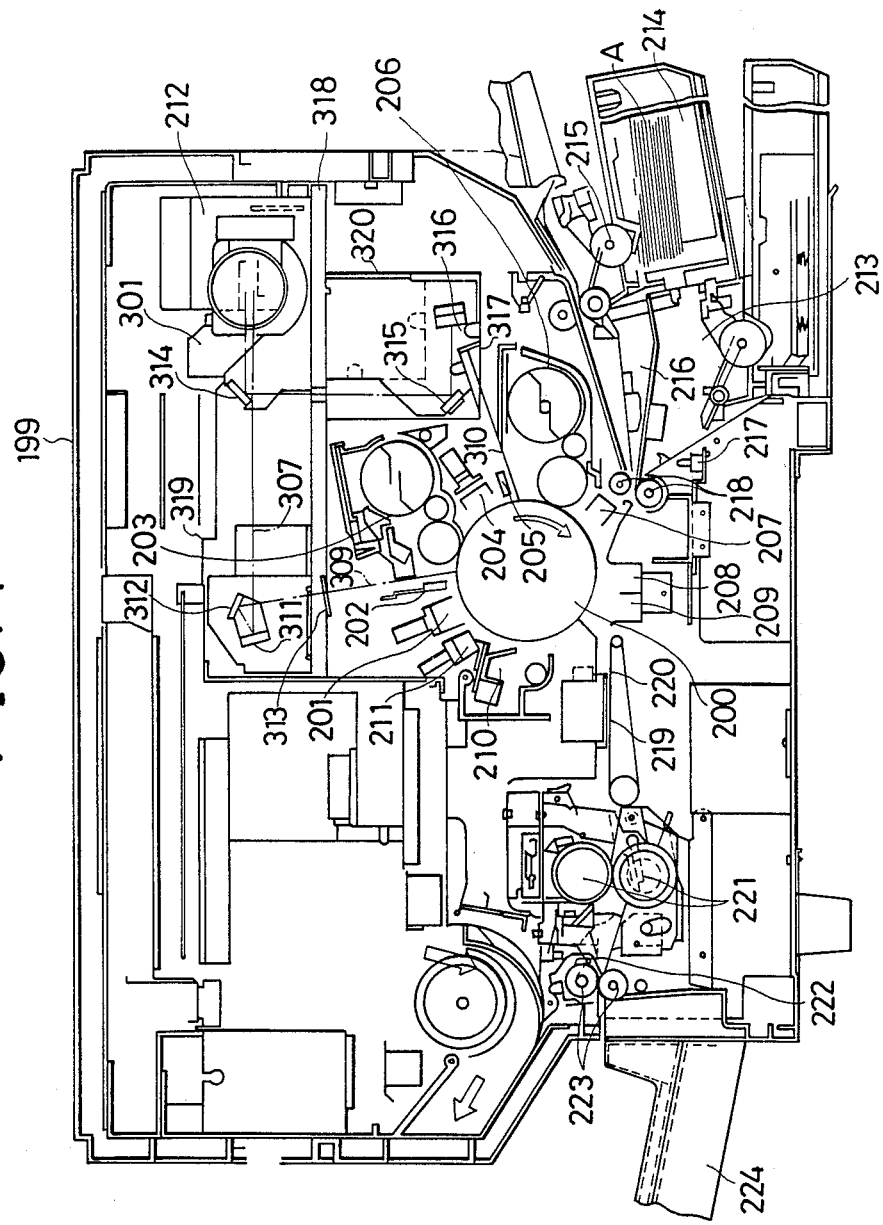
FIG. 4 illustrates a cross section of an image forming unit in a two color LBP embodying the present inventiion.

Referring to FIGS. 3 and 4, there is shown a two color LBP 199 having an image forming apparatus embodying the present invention.

The two color LBP 199 is connected to a host system, namely a computer, a word processor, or the like, through a transmission controller (not shown) to accept two kind of dot image data from the host system. In accordance with the two kind dot image data, the two color LBP 199 modulates two kind laser beams to carry out a writing to a drum-shaped photosensitive member 200 and independently develops the written dot image data to transfer the data to a recording paper. Namely, around the drum-shaped photosensitive member 200, there are disposed a first charger 201, a first surface voltage sensor 202, a first developing unit 203, a second charger 204, a second surface voltage sensor 205, a second developing unit 206, a pre transfer charger 207, a transfer charger 208, a stripping charger 209, a cleaner 210, and a discharger 211 in that order in a direction shown by arrow. In that construction, a first exposure is obtained by emitting a first laser beam 309 to the photosensitive member 200 between the first surface voltage sensor 202 and the first developing unit 203 and a second exposure is obtained by emitting a second laser beam 310 to the photosensitive member 200 between the second surface voltage sensor 205 and the second developing unit 206. Furthermore, in the LBP 199, there are provided a polygonal scanner unit 212, a paper feeding device 213, an upper paper feeding cassette 214, an upper paper feeding roller 216, a first transportation route 216, a preresist pass sensor 217, a pair of resist rollers 218, a second transportation route 219, an adsorption belt 220, a fixing unit 221, a paper ejection switch 222, a pair of paper ejection rollers 223, an ejected paper tray 224.

Of the various parts enumerated in the above, the photosensitive member 200 has an outer peripheral surface of Se-Tc layer. Because of this, the first charger 201 is made as a corona charger with positive polarity. The first charger 201 gives a charged potential of 600 V or 1000 V to the photosensitive member 200.

The first surface potential sensor 202 detects the charged condition of the photosensitive member 200 by the first charger 201.

In the stage following the first surface potential sensor 202, the phtosensitive body 200 undergoes a first exposure under the irradiation of the first laser beam 309 that is reflected from the polygonal scanner unit 212 to form an electrostatic latent image on the photosensitive member 200 due to the first exposure.

Figure 5:
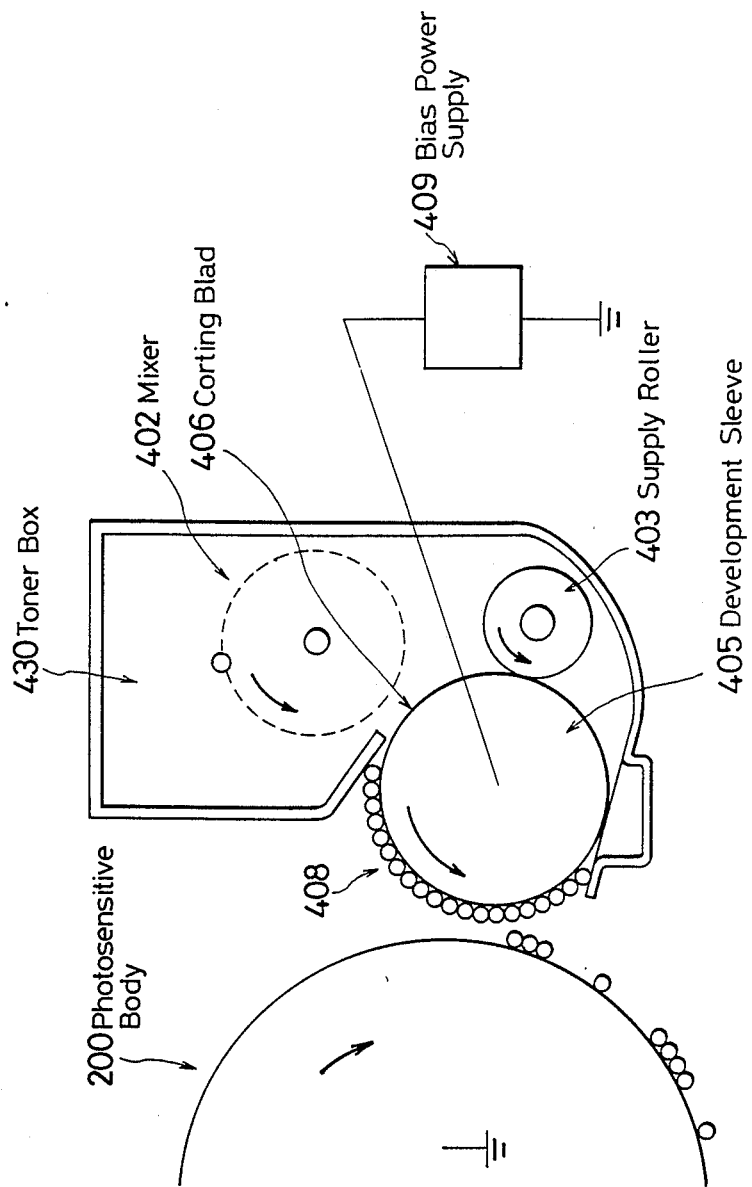
FIGS. 5 and 6 illustrate constructions of the first developing unit shown in FIG. 4.
Figure 6:
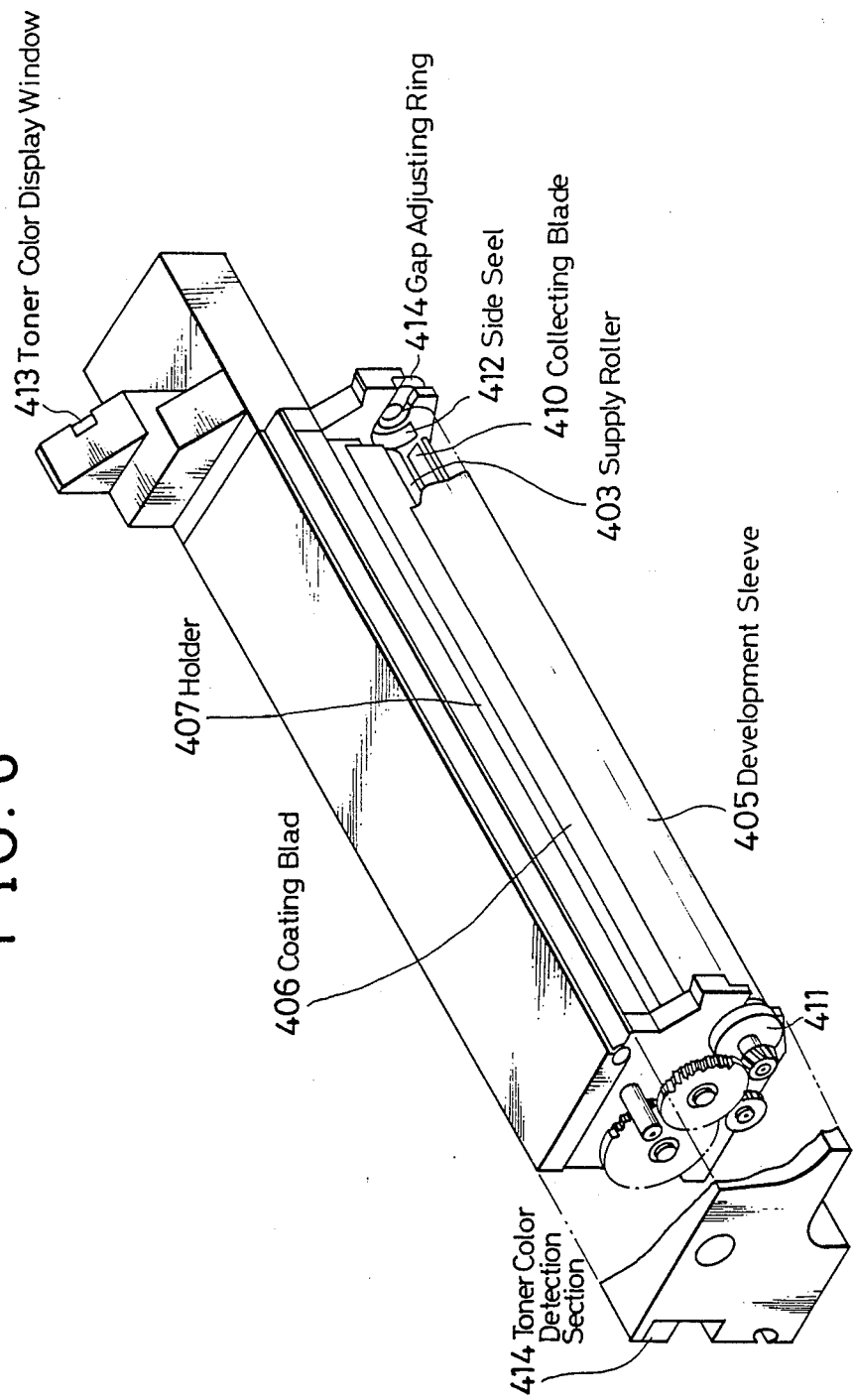

The first developing unit 203 which develops the electrostatic latent image due to the first exposure, is a nonmagnetic single component developing unit with sectional view as shown in FIG. 5 and external appearance as shown in FIG. 6.

In FIG. 6, 402 is a mixer, 506 is a coating blade, and 408 is a toner.

Further, in FIG. 6, 403 is a supply roller, 407 is a holder, 410 is a blade, 411 is a gap adjusting ring, 412 is a side seal, 413 is a toner color display window, and 414 is a toner color detection section.

Next, the photosensitive member 200 is charged again by the second charger 204. In this process, unevenness in the potential created on the surface of the photosensitive member 200 generated in the various processes up to the first developing is returned to a uniform potential.

The second surface potential sensor 205 detects the charged state of the photosensitive member 200 due to the second charger 204.

In the state following the second surface potential sensor 205, analogous to the first exposure, second laser beam 310 that is reflected by the polygonal scanner unit 212 is illuminated on the photosensitive member 200 to carry out a second exposure and to form an electrostatic latent image due to second exposure on the photosensitive member 200.

Figure 7:
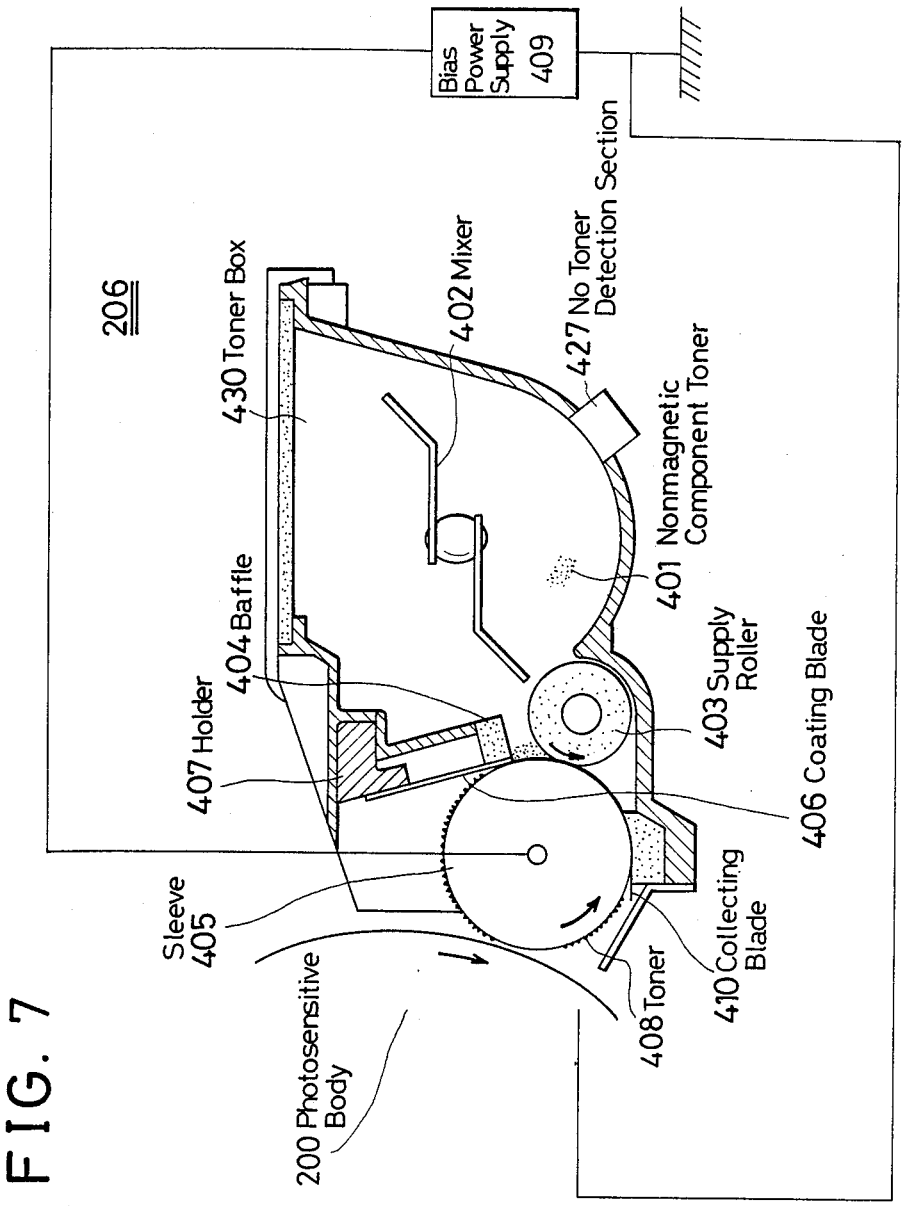
FIG. 7 illustrates a construction of the second developing unit shown in FIG. 4.

The second developing unit 206 which develops the electrostatic latent image due to the second exposure has a sectional form as shown in FIG. 7. If a nonmagnetic single-component toner 401 is present in its interior, the nonmagnetic single-component toner 401 is sent in to the gap between a baffle 40 and a supply roller 403 by means of a mixer 402 and the supply roller 403. The outer peripheral surface of the supply roller 403 is of soft material made of polyester-based polyurethane foam, and is made porous by separate bubbles. Since the supply roller 403 is rotated in the direction opposite to that of the development sleeve 405 by making contact with it, the supply roller 403 scrapes off toner 108 that remains on the development sleeve 405 without contributing to the development, and attaches fresh toner 401 on the development sleeve 405. Further, there are provided a developing blade 406 and a bias power supply 409.

Next, referring to FIG. 4, the paper feeding system of the transfer paper will be described.

On one side area of photosensitive member 200, there are provided upper and lower paper feeding devices as a paper feeding device 213 in a forwarding section. In what follows, the upper paper feeding device includes a cassette 214 for housing transfer papers A which is taken out one by one by a paper feeding roller 215. A transfer paper A thus taken out is transported toward the photosensitive member 200 via a first transporting route 216 as a first forwarding section. In midpoints of the first transporting route 216, there are arranged a first detector 217 and resist rollers 218 along the transporting direction of the transfer papger A. In addition, on the transporting route 216, along the transporting direction of the transfer paper A there are arranged successively the stripping charger 209, an adsorption belt 220, a fixing unit 221, a second detector 222, and paper ejection rollers 223.

To describe image formation, a transfer paper A is taken out from the paper feeding cassette 214, and its position is put in order by being pushed against the resist rollers 218. The transfer paper A is detected by the first detector 217, sent to the transfer charger 208 by re-starting the resist rollers 218 by synchronizing the timing with the image on the photosensitive member 200, and the image is transferred on one side of the paper. The transfer paper to which image transfer is completed, is removed of static electricity that was accumulated on the paper, detached from the drum, sent to the fixing unit 221 where the image is fixed. The transfer paper A with image fixing completed, is ejected to a tray for ejected paper 224 via rollers 223 after passing the fixing unit 221.

Next, a detailed description of an embodiment of the present invention will be given based on its electrical comfiguration.

Figure 8:
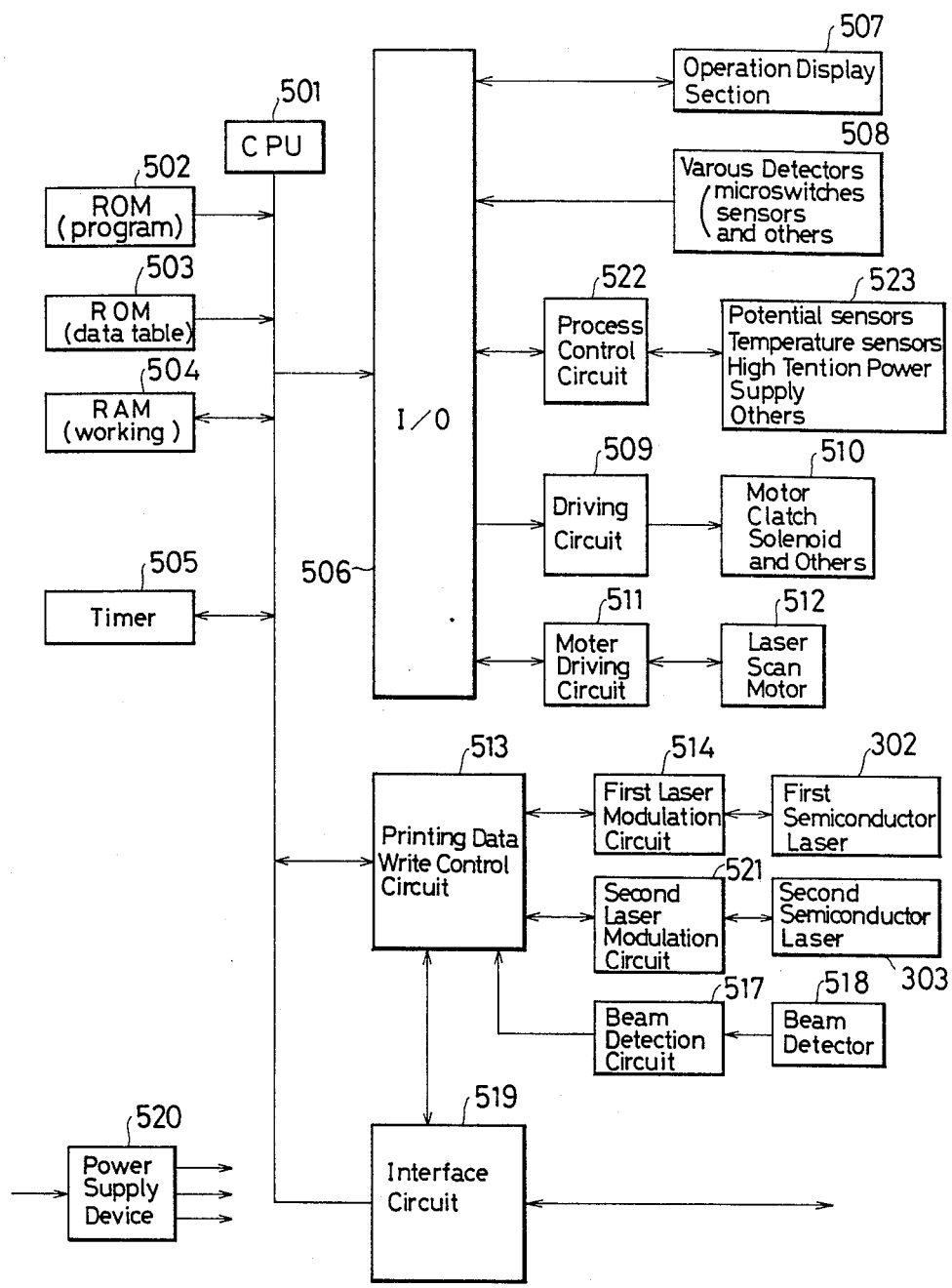
FIG. 8 is a brock diagram of the control system shown in FIG. 3.

FIG. 8 is a block diagram which shows the configuration of the control section of the dichromatic LBP.

The control section of the dichromatic LBP includes basically a ROM 502 which houses a system program with CPU 501 as the control center, a ROM 503 which houses a data table, a ROM 504 which is used as a working memory, a timer 505, an I/O device 506 for I/O data, a writing control circuit 513 for printing data, and an interface circuit 519.

As shown in FIG. 9, the contents of the data table housed in the ROM 503 consist of top margin control data for a first color stored in addresses (4000) and (4001), top margin control data for a second color stored in addresses (4002) and 4003), and left margin control data stored in addresses (4004) and (4005).

Further, in addresses (4006) and (4007) there are stored bottom margin control data in the case of paper size of A3, and in addresses (4008) and (4009) right margin control data for the same size of the paper are stored. In a similar manner, tables corresponding to various sizes of the paper are stored up to the address (4083).

in addresses starting with (4090) there are stored coarse adjustment data for top margin, in addresses starting with (40B0) there are stored fine adjustment data for top margin, in addresses starting with (40D0) there are stored coarse adjustment data for left margin, in addresses starting with (4100) there are stored fine adjustment data for left margin, and in addresses starting with (4120) there are stored data for correcting scanning length for two beams, each of the foregoing data corresponding to switches from 1 to n.

These margin control data, coarse adjustment data, and fine adjustment data will be used as the setting data a margin controlling counter and a binary counter, of a printing data write control circuit 513 that will be described later.

In addresses (6000) and (6001) there is stored a first development bias data for red toner, and in addresses (6002) and (6003) there is stored a second development data for the same color. Similarly, first and second development bias data for blue toner, green toner, and black toner are stored in the addresses up to (600F). These will be used as the setting data for development bias control for a process control circuit 522 that will be described later.

In addresses (6100) and (6101) there are stored target surface potential table data for a first charging potential control, having a reference value of 25° C.

n addresses (6102) and (6103) there are stored error table data in convergence, which represents a tolerance control range for the target surface potential. In the addresses (6104) and (6015) there are stored output table data for a first time control, which will be used as a setting value for a first corona charger which is output for the first time during the warning up.

In the addresses (6106) and (6107) there are stored minimum correction table data.

In addresses (6108) and (6109) there are stored surface potential limits table data, in addresses (610A) and (610B) there are stored control output upper limits table data, an in addresses (610C) and (610D) there are stored control output lower limits table data. The surface potential limits table data, the control output upper limits table data, and the control output lower limits table data will be used for self diagnosis of the control system.

Following them tables that correspond to second charging potential control are stored in addresses up to (611B). In addresses starting with (6120) there are stored charge voltage temperature correction table data for a temperature range of 10° C. to 40° C., which serves as a temperature correction data for the target surface potential table data of 25° C.

The time 505 is a general purpose timer and generates fundamental timings for controlling the paper transportion processes around the photosensitive body, and so forth.

The I/O device 506 carries out outputting of display data to an operation display section 507, inputting of various kinds of switch data or the like, inputting to each of the detector in the control section, outputting to driving circuits for driving elements such as motor clatches, solenoids, outputting to a driving circuit 511 for driving a laser scan motor 512 that scans the two laser beams, and inputting and outputting to and from a process control circuit 522 that controls the output of a high tension power supply 523 and others in response to the inputs of detected signals such as potential sensors, temperature sensors, and so forth.

The printing data write control circuit 513 controls the driving of a first laser modulation circuit 514 for optically modulating the first semiconductor laser 302 for image data writing of the first color and a second laser modulation circuit 521 for optically modulating the second semiconductor laser 303 for image data writing of the second color, and controls the writing of the printing data of video image sent from a host system 500 in a predetermined position on the photosensitive body. In this case, a beam detector 518 which makes use of pin diode of high speed response, detects one of the two light beams that are scanned by a laser scanning motor, horizontal synchronized pulses are generated by a beam detector 517 by digitizing analog signals from the beam detector 518 with a high speed comparator, and the detector 517 sends out the pulses to the printing data write control circuit 513.

An interface circuit 519 carries out outputting of status data to the host system 500 as well as receiving of command data and printing data from the host system 500.

In addition, there is provided a power supply 520 to supply power to each of these control sections.

In what follows a detailed description will be given for the major blocks in FIG. 8.

Figure 10:
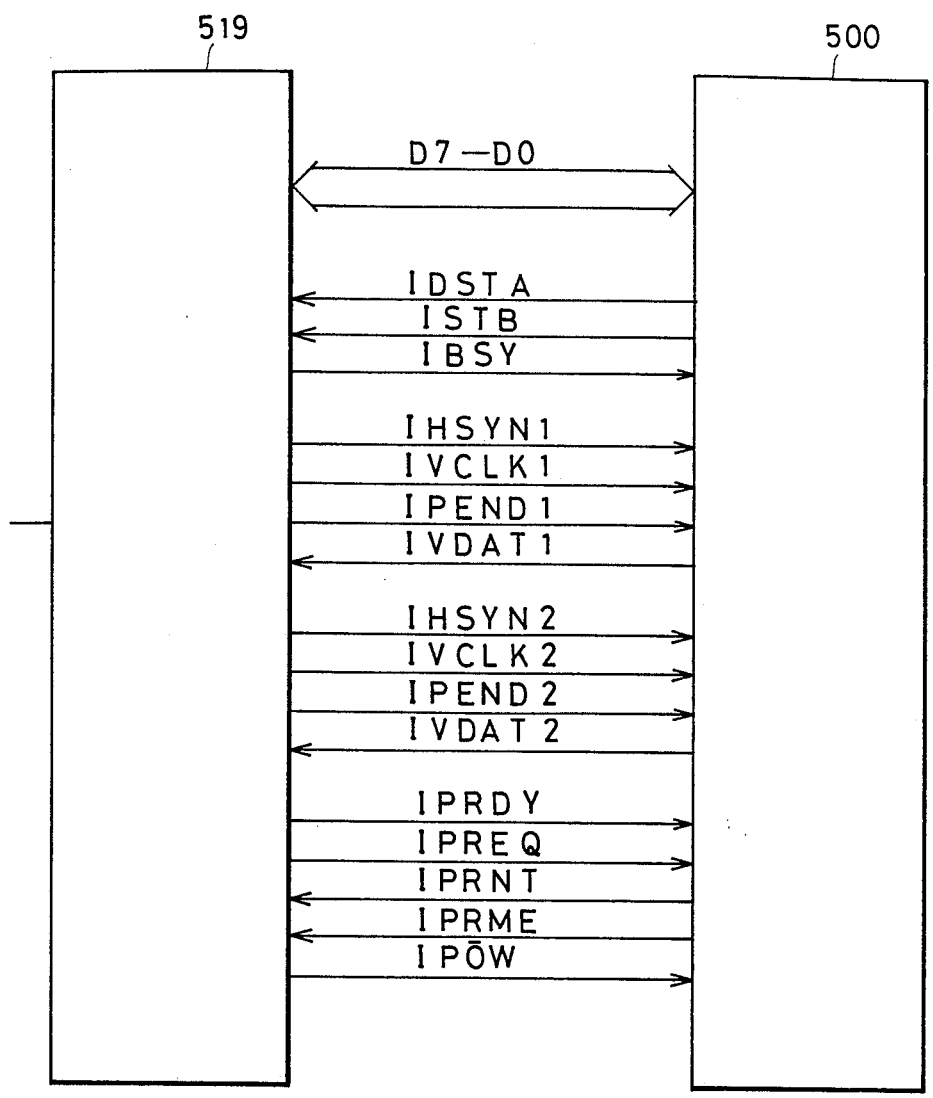
FIG. 10 show a content of a interface signal flowing between the interface circuit and the host system shown in FIGS. 3 and 8.

FIG. 10 is a diagram for illustrating the details of the interface signals that are transferred between the interface circuit 519 and the host system 500. In the figure, D7-D0 is an 8-bit both-way data bus, IDSTA is a selection signal for the data bus, which will be used for selecting which one is to be used between a status data bus to the host system 500 and a command data bus from the host system 500. Further, ISTB is a strobe signal for latching the command data within the interface circuit, and IBSY is a signal for approving the sending of a strobe signal ISTB and for approving the reading of the status data.

A signal IHSYN 1 is a horizontal synchronized signal of the first color which requests sending of one line of printing data.

A signal IVCLK 1 is a video clock signal of the first color which requests sending of one dot of printing data.

A signal IPEND 1 is a page end signal which informs the completion of one line of printing.

The host system 500 sends out a video data signal IVDAT 1 for the dot image data of the first color, based on IHSYN1 and IVCLK 1 signals, and discontinues the sending upon receipt of an IPEND 1 signal.

Figure 11:
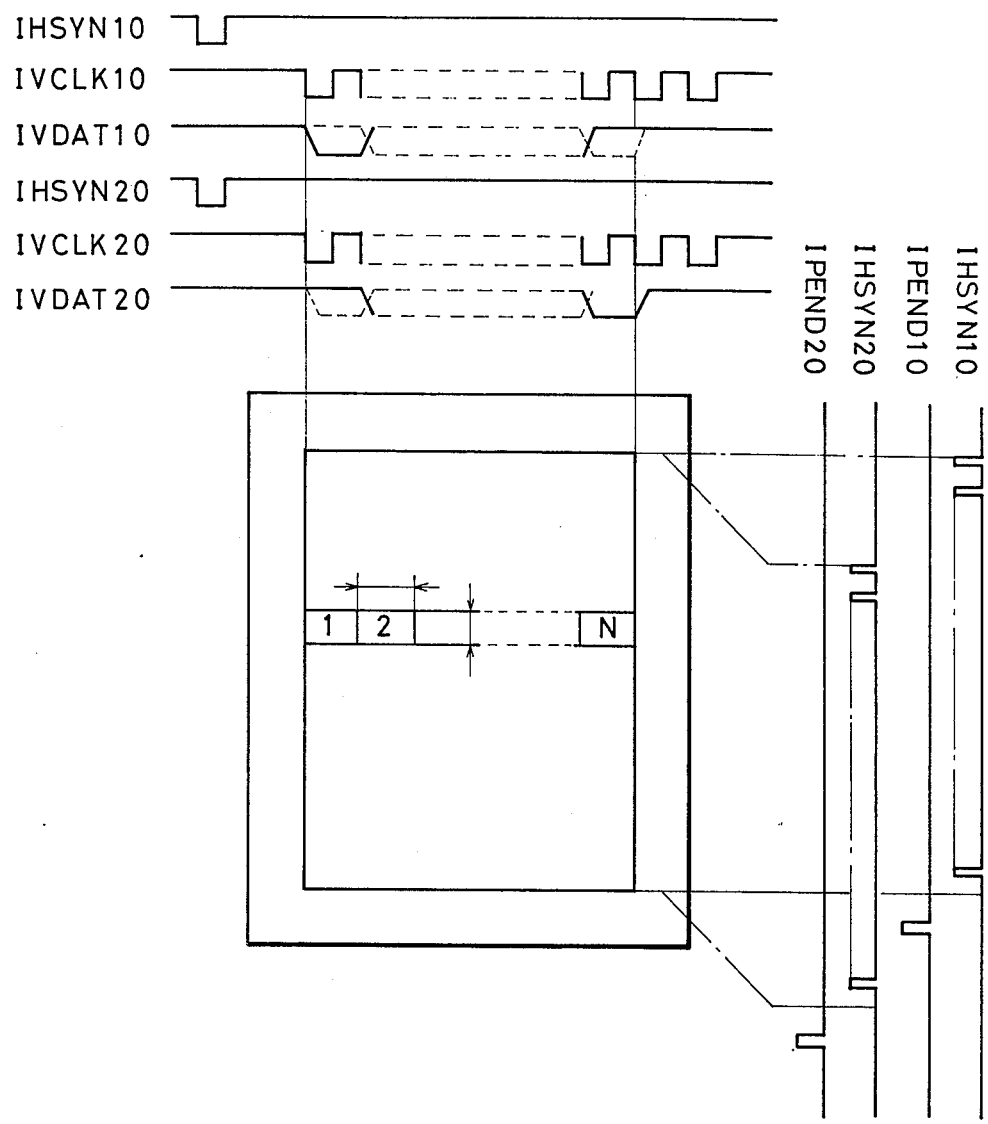
FIG. 11 shows a relationship between the interface signal and a data writing point.

Similarly, IHSYN 2 is a horizontal synchronized signal of the second color, IVCLK 2 is a video clock signal for the second color, and IPEND 2 is a page end signal for the second color. The host system sends out a video data signal IVDAT 2 vf dot image data for the second color based on IHSYN 2 and IVCLK 2, and discontinues its sending upon receipt of an IPEND 2. These video data signals IVDAT 1 and IVDAT 2 are sent to the printing data write control circuit. The relationship described in the above is shown in FIG. 11.

A signal IPRDY is a signal that informs that the dichromatic LBP 199 is a ready state, IPREQ is a signal which approves sending of a print starting signal IPRINT from the host system 500, IPRME is a prime signal which brings the dichromatic LBP 199 to an initial state, IPOW is a signal which informs that the dichromatic LBP 199 is the on-state.

Next, details of the command and status used for the dichromatic LBP 199 in FIG. 12(A) and FIG. 12(B), respectively.

In FIG. 12(A), SR1 to SR7 are status request command which correspond to statuses 1 to 7 in FIG. 12(B), CSTU is a command indicating paper feeding for the upper part of the cassette, CSTL is a command indicating the same for the lower part, VSYNC is a command indicating the start of sending printing data from the host system 500, SP1, SP2 and DP1 are commands indicating the printing mode, where SP1 is the printing operation with the first color alone, SP2 is the printing operation with the second color alone, and DP1 is a mode which indicates the printing operations of both of the first color and the second color. Finally, ME1 to ME9 are command indicating manual modes of various kinds.

In FIG. 12(B), "paper in transportation" is a status which shows that paper is fed and it is in transportation within the dichromatic LBP 199, VSYNC request is a status which indicates that the dichromatic LBP 199 received a print start position and that receipt of printing data is now possible, "manual" is a status which indicates that the paper feeding mode is in the manual state, "cassette top/bottom" is a status which indicates the state of cassette selection of the cassette paper feeding, "printing mode-first color mode, second color mode, two color mode" is a status which indicates the printing mode state that is selected, "cassette size (top)" and "cassette size (bottom)" are status that show the size code of cassette installed, "toner color (first color)" and "toner color (second color)" as status that show the toner color code of the developing unit installed, "test-/maint" is a status that indicates that it is in the test-/maintenance state, "data re-sending request" is a status which shows that re-printing is necessary due to jamming of a paper or the like, "during wait" is a status which indicates that the dichromatic LBP is in the warming-up state of the fixing unit, and "operator call" indicates an occurrence of a factor for an operator call of status 5. "Serviceman call" indicates that a factor for serviceman call of status 6 occurred. "Toner bag exchange" indicates that the toner is full in the toner pack. "No paper" indicates that there remains no paper in the cassette indicated. "Paper jam" indicates that a paper is jammed in the apparatus. "No first color toner" indicates that no toner exists in the first developing unit, "no second color toner" indicates that no toner exists in the second developing unit, "first laser failure" indicates that the first laser diode is not reaching a prescribed output yet or that the beam detector cannot detect the beam, "second laser failure" indicates that the second laser diode is not reaching a prescribed output yet. "Scan motor failure" indicates that the scan motor does not reach a prescribed speed of rotation even after elapse of a predetermined length of time or it deviates for some reason from the prescribed speed of rotation after reaching the prescribed speed of rotation. "First potential sensor failure" and "second potential sensor failure" show respectively that the the surface potential of the photosensitive body cannot be detected, and "re-sending page number" indicates the number of pages for re-printing when there occurred a data re-sending request status.

Figure 13:
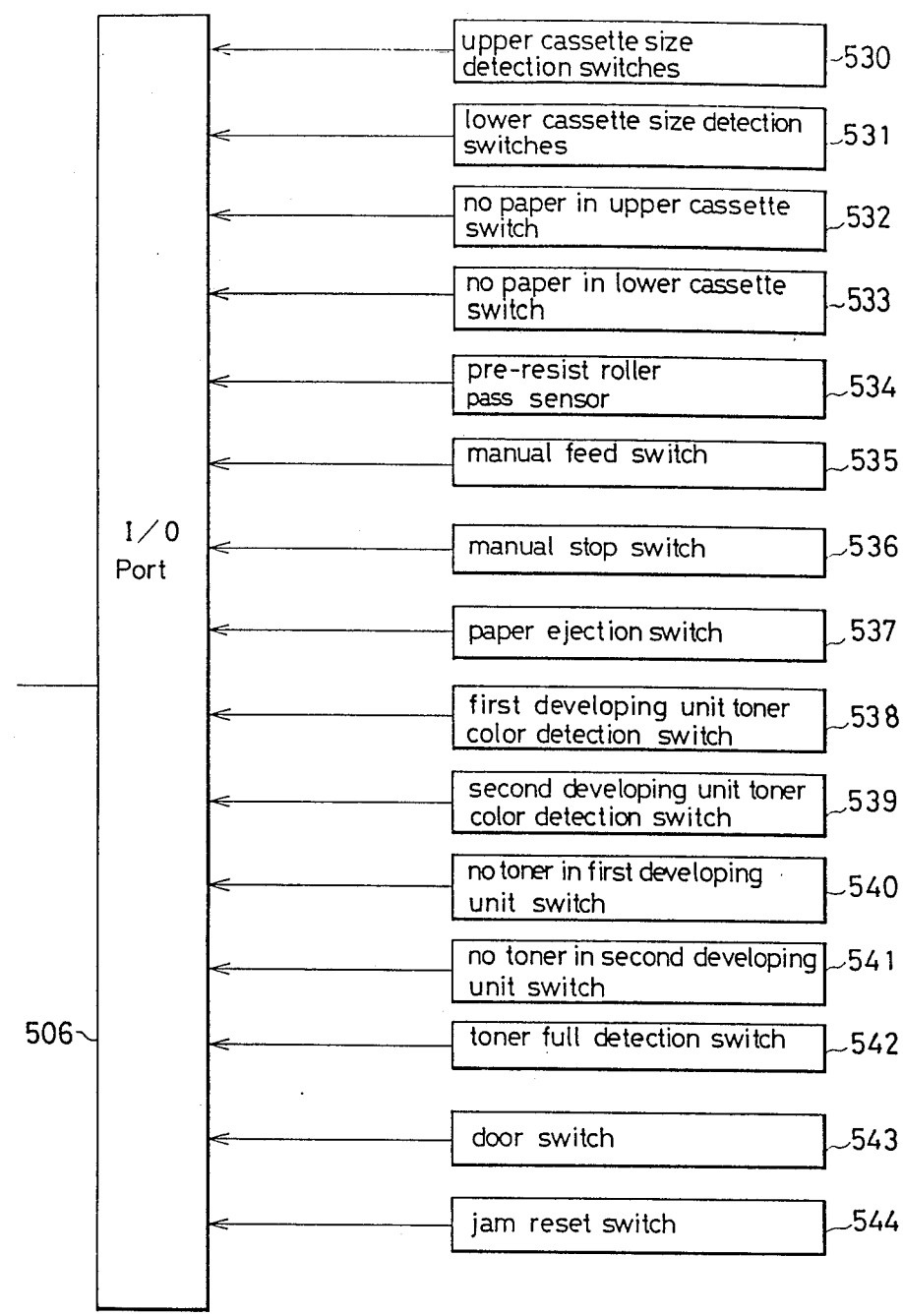
FIG. 13 is a block diagram showing a detail of every detectors shown in FIG. 8.

FIG. 13 is a detailed block diagram for various kinds of detectors 508 shown in FIG. 8. In FIG. 13, signals from various kinds of detectors are input to the I/O port 506. Reference numeral 530 represents upper cassette size detection switches which consist of four switches where various paper sizes are represented by combinations of these switches. Reference numeral 531 represents lower cassette size detection switches with configuration which is similar to the upper cassette size detection switch. Reference numeral 532 is a no paper in upper cassette switch which is turned on when there is no paper in the upper cassette. Reference numeral 533 is a no paper in lower switch. Reference numeral 534 is a pre-resist roller bus sensor detects presence or absence of the papers sent from the paper feeding cassette. Reference numeral 535 is a manual feed switch which detects a paper which is fed through manual feeding guide, and 537 is a paper ejection switch which is located in the fixing roller section. Reference numeral 538 first developing unit toner color detection switches that consist of three switches and designate toner colors by their combinations. Reference numeral 539 are second developing unit toner color detection switches whose configuration is similar to the first developing unit toner color detection switches. Reference numeral 540 is a no toner in first developing unit switch which detects that there exists no toner in the first developing unit, 541 is a no toner in second developing unit switch which detects that there exists no toner in the second developing unit, and 542 is a toner full detection switch which is activated when the toner pack is filled with toner.

Reference numeral 543 is a door switch which is turned on or off by opening and closing of the front cover, and 544 is a jam reset switch which is provided in the front cover. The jam reset switch is a switch which is turned on to confirm that a paper jamming is taken care of or that the toner pack is replaced when a paper jamming occurred or there is generated an operator call for filling of the toner. Accordingly, the operational display for a jam or filling the toner will not be cleared unless this switch is closed.

Figure 14:
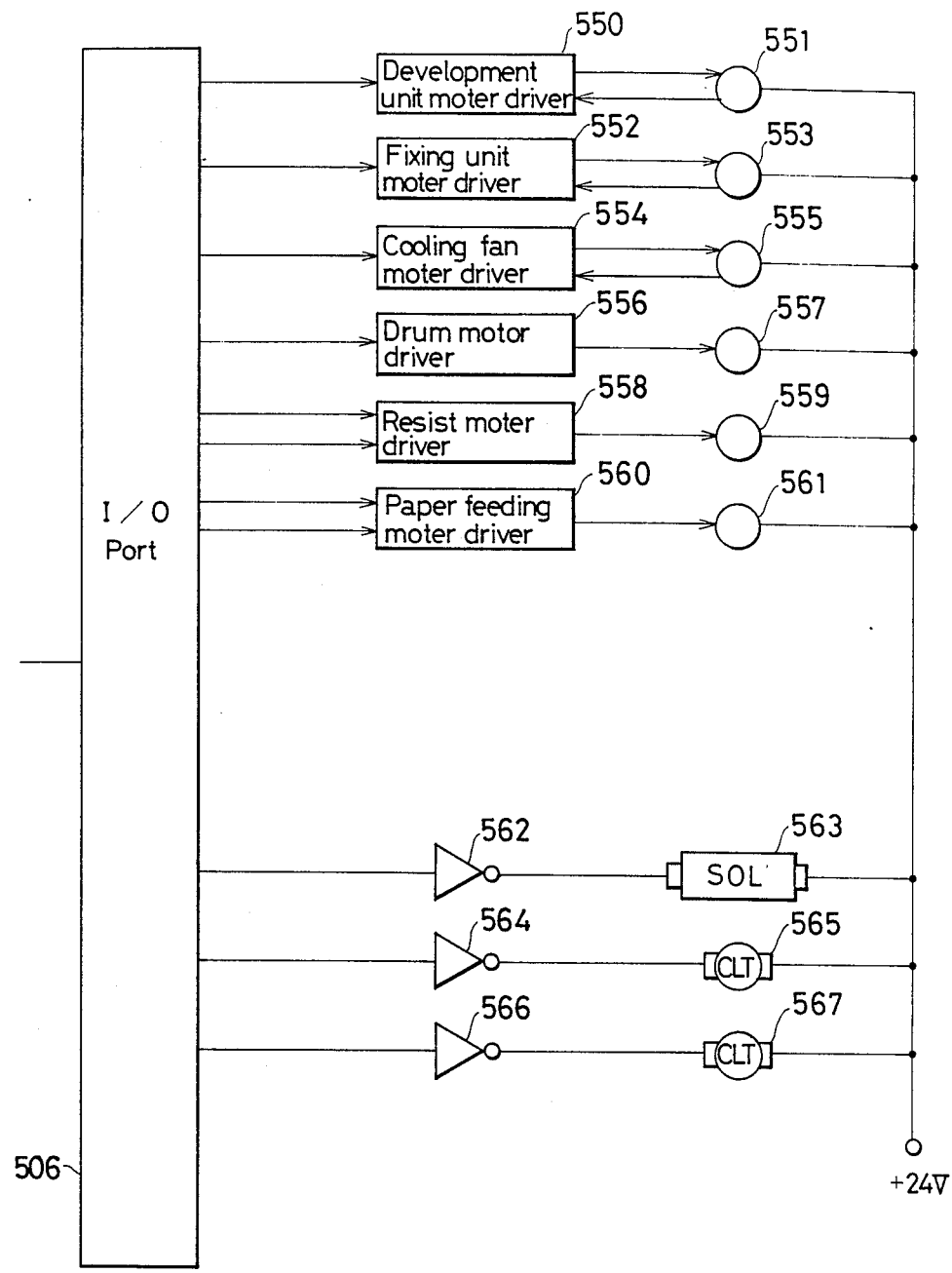
FIG. 14 is a block diagram showing a detail of the drive circuit and the output element shown in FIG. 8.

FIG. 14 is a block diagram which shows the details of a driving circuit 509 and an output element 510 shown in FIG. 8. In FIG. 14, 551 is a motor for developing units for which use is made of a Hall motor which is DC driven. Reference numeral 550 is a driver of the motor for the developing units, and is PLL controlled. Reference numeral 553 is a motor for the fixing units, and use is made of a Hall motor of DC drive. Reference numeral 552 is a driver of the motor for the fixing units, and is PLL controlled. Reference numeral 555 is a fan motor for cooling the interior of the apparatus for which use is made of a Hall motor driven by DC. Reference numeral 554 is a driver for the cooling fan motor, but is not PLL controlled as in the developing units and the fixing units. Reference numeral 557 is a driving motor for the photosensitive drum 200 which makes use of a four-phase pulse motor. Reference numeral 556 is a driver for the drum motor which makes use of a constant current 1-2 phase excitation type. Reference numeral 559 is a resist motor for driving the resist rollers 218 and manual feeding roller, which makes use of a four-phase pulse motor. Reference numeral 558 is a driving motor for the resist motor for which use is made of a constant voltage two-phase excitation type. Further, if the resist motor 559 is rotated in the forward direction, it rotates the resist rollers and if it is rotated in the reverse direction, it rotates the manual feeding roller.

Reference numeral 561 is a paper feeding motor which drives the lower paper feeding roller and the upper feeding roller, and makes use of a four-phase pulse motor. Reference numeral 560 is a driver for the paper feeding motor, and makes use of a constant voltage two-phase excitation type similar to the resist motor driver 558.

Reference numeral 563 is a solenoid for collecting toner, and when it is turned on, the blade 210 is pushed against the photosensitive body 200. Reference numeral 562 is a driver for the blade solenoid.

Reference numeral 565 is an electromagnetic clatch for first developing unit, and when the developing units are turned on in the state of turning-on of the clatch, the sleeve in the first developing unit is arranged to be rotated. Reference numeral 564 is a driver for the first electromagnetic clatch for the first developing unit. Reference numeral 567 is an electromagnetic clatch for the second developing unit, and when the motor 551 for developing units is turned on while the clatch is in on-state, the sleeve in the second developing unit is rotated. Reference numeral 566 is a driver for the electromagnetic clatch for the second developing unit.

Figure 15:
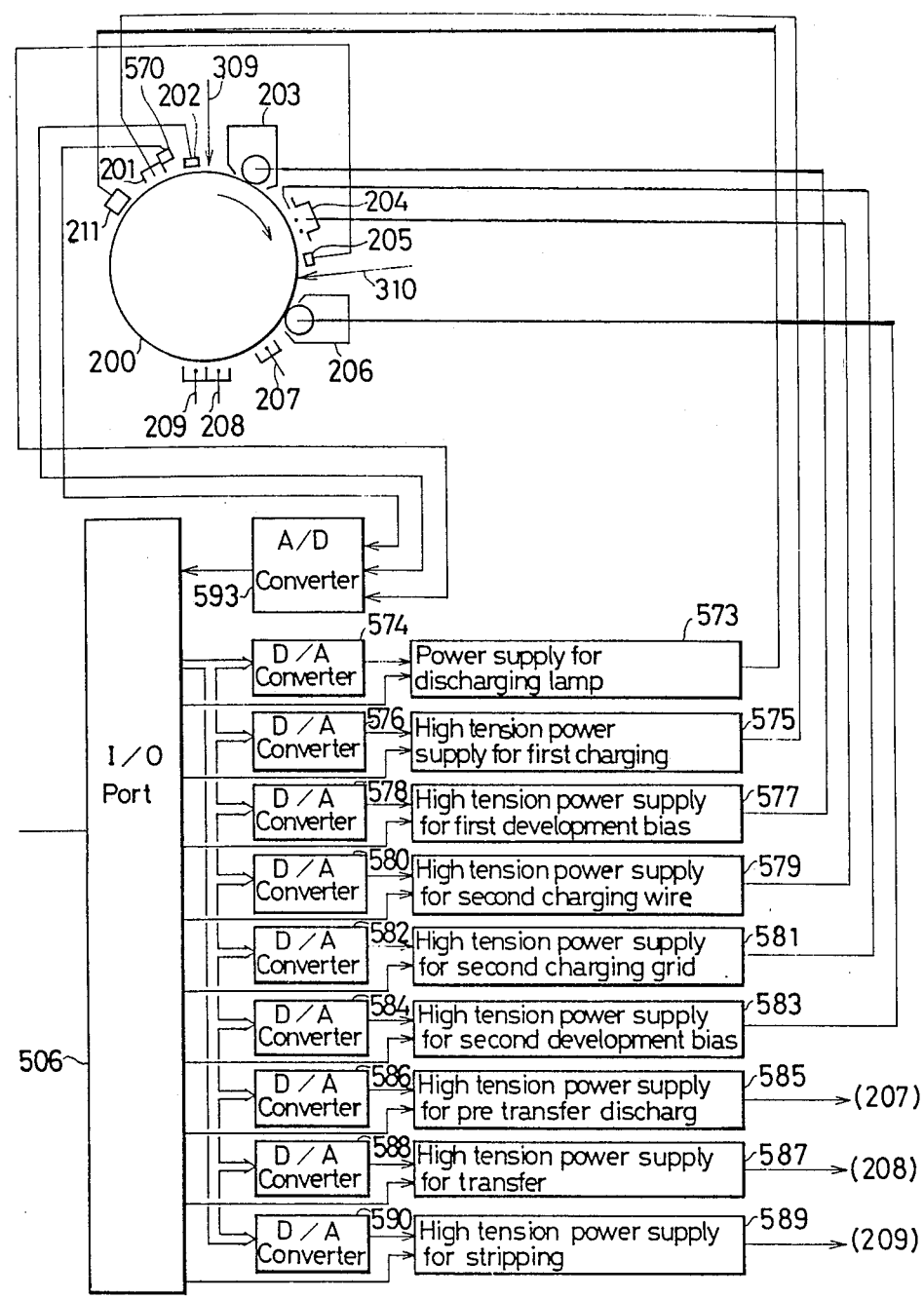
FIG. 15 is a block diagram showing a process control circuit and its I/O parts.

FIG. 15 is a block diagram which shows the details of the process control circuit 522 and its input-output elements 523 shown in FIG. 8. In FIG. 15, 201 is a first charger for charging with its corona discharge wire connected to the output terminal of the high tension power supply 575 for first charging. The input terminals of the high tension power supply for first charging are connected to the output of a D/A converter 576 which changes the high tension output current and to a signal from the I/O port which carries out ON/OFF of the high tension output. The input of the D/A converter 576 is connected to the I/O port 506, and CPU 501 controls the output current of the high tension power supply 575 for fist charging via the D/A converter 576. Reference numeral 570 is a drum temperature sensor which detects the temperature in the neighborhood of the photosensitive body 200, and its output is input to an A/D converter 593. The output of the A/D converter 593 is input to the I/O port 506 and is processed in the CPU 501. Reference numeral 202 is the first potential sensor which detects the surface potential of the photosensitive body 200, and its output is input to the A/D converter 593. Reference numeral 309 is the beam of the first semiconductor laser, 203 is the first developing unit, the sleeve of the developing unit is connected to the output terminal of the high tension power supply 577 for first development bias, and the input terminals of the high tension power supply 577 for first development bias are connected to the output of a D/A converter which changes the high tension output voltage and to a signal from the I/O port which carries out ON/OFF of the high tension output. The output of the high tension power supply for first development bias is an output of AC+DC.

Reference numeral 204 is a second charger for charging, or scorotoron charger. The corona discharge wire of the charger are connected to the output terminal of a high tension power supply 579 for second charging wire, and the grid of the charger is connected to the output terminal of the high tension power supply 581 for second charging. To the input terminals of the high tension power supply 579 for second charging wire are input the output of a D/A converter 580 which varies the high tension output voltage and a signal from the I/O port which carries out ON/OFF of the high tension output. To the input terminals of the high tension power supply 581 for second charging grid are input the output of a D/A converter 582 which varies the high tension output voltage and a signal from the I/O port which carries out ON/OFF of the high tension output. For the chargers except for the second charger for charging, use are made of general and charger.

Reference numeral 205 is the second potential sensor which detects the surface potential of the photosensitive body 200, and its output is input to the A/D converter 593. Reference numeral 310 is the beam of the second semiconductor laser, 206 is the second developing unit, the sleeve of the developing unit is connected to the output terminal of the high tension power supply 583 for second development bias, and the input terminals high tension power supply 583 for second development bias are connected to the output of a D/A converter 584 which varies the high tension output voltage and a signal from the I/O port which carries out ON/OFF of high tension output. The output of the high tension power supply for second development bias is a DC output. Reference numeral 207 is the pre-transfer discharging charger which is connected to the output terminal of a high tension power supply 585 for pretransfer discharger, and the input terminals of the high tension power supply 585 for pre-transfer discharge are connected to the output of a D/A converter 586 which varies the high tension output voltage and a signal from the I/O port which carries out ON/OFF of the high tension output.

Reference numeral 208 is the transfer charger which is connected to the output terminal of a high tension power supply 587 for transfer, and the input terminals of the high tension power supply 587 for transfer are connected to the output of a D/A converter 588 which varies the high tension output voltage and a signal from the I/O port which carries out ON/OFF of the high tension output.

Reference numeral 209 is the stripping charger which is connected to the output terminal of a high tension power supply 589 for stripping, and the input terminals of the high tension power supply 589 for stripping are connected to the output of a D/A converter 590 which varies the high tension output voltage and a signal from the I/O port which carries out ON/OFF of the high tension output.

Reference numeral 211 is the discharging lamp which is connected to a power supply 573 for discharging lamp, and the input terminals of the power supply 573 for discharging lamp are connected a D/A converter 574 which varies the amount of output light of the discharging light and a signal from the I/O port which carries out ON/OFF of the output of the discharging lamp.

Figure 16:
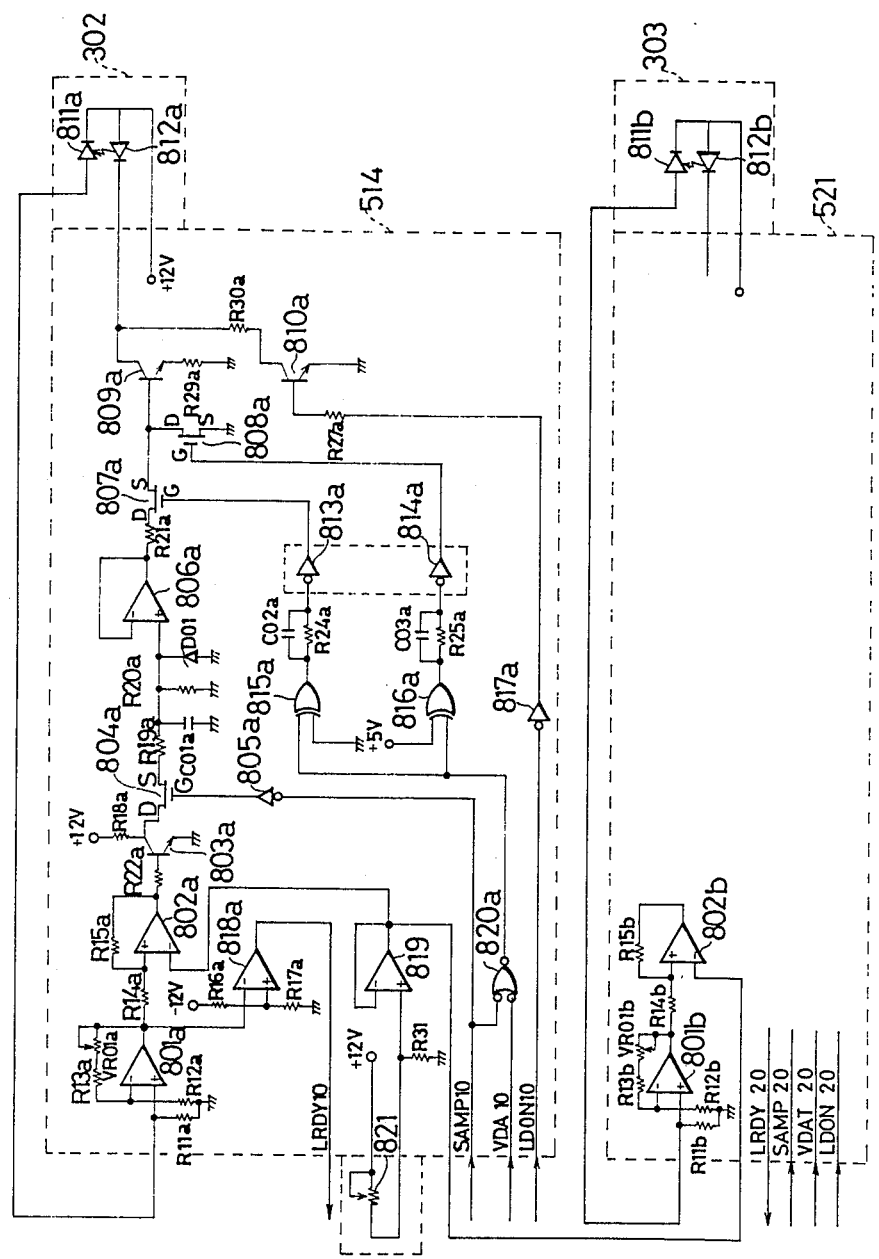
FIG. 16 shows the laser modulating circuits shown in FIG. 8.

FIG. 16 is a detailed circuit diagram for the first laser modulation circuit 514, the first semiconductor laser 302, the second laser modulation circuit 521, and the second semiconductor laser 303. First, the first laser modulation circuit 514 and the first semiconductor laser 302 will be described.

In FIG. 16, 302 is a first semiconductor laser diode which consists of a light-emitting laser diode 812a and a photodiode 811a for monitoring the output beam intensity from the laser diode.

Reference numeral 809a is a high frequency transistor, a resistor R29a which carries out optical modulation for the first laser diode 812a is a current detecting resistor, 810a is a transistor for lowing a bias current in the first laser diode 812a, R30a is its current limiting resistor, R27a a base current limiting resistor for the transistor 810a, and 817a is an inverter. To the input of the inverter 817a there is input a first laser diode enable signal LDON10, and when the signal becomes LOW level, the transistor 810a is turned on and a bias current flows in the first laser diode 812a. Reference numerals 807a and 808a are high speed analog switches for giving modulations to the first laser diode 812a, and each of the analog switches becomes on-state when a HIGH level signal is applied to the gate (G) and the resistance between the drain (D) and the source (S) becomes low. On the contrary, when a LOW level signal is applied to the gate, the resistance becomes high and the switch becomes off-state. Reference symbol R21a is a short-circuit protective resistor during On-OFF changes of the analog switches 807a and 808a, and 813a and 814a are gate drivers for the analog switches 807a and 808a. Reference symbols CO2a and CO3a are capacitors for speeding up, and R24a and R25a are input resistors for the gate drivers 813a and 814a. Reference symbols 815a and 816a are EXCLUSIVE-OR gates which can be changed by the output of a 2 AND gate 820a. The output of the 2 AND gate 820a becomes LOW level when either one of its inputs becomes LOW level, then the output of the EXCLUSIVE-OR gate 815a becomes LOW level, the analog switch 807a is turned on, and the first laser diode 812a becomes on-state. The condition for bringing the output of the AND gate 820a to LOW level is either the first video data signal VDAT10 is on LOW level or a first sample signal SAMP10 is on LOW level. When both of the inputs to the 2 AND gate are HIGH level, the output of the EXCLUSIVE-OR gate 816a becomes LOW level, the analog switch 808a is turned on, and the first laser diode 812a becomes off-state.

Reference numeral 806a is an operational amplifier and forms a voltage follower circuit. DO1 is a Zener diode which regulates the output of the first laser diode 812a within the maximum rated value. Further, a resistor R19a and the capacitor CO1a constitute an integration circuit, and R20a is a discharge resistor to discharge the charges on the capacitor CO1a at a fixed rate. Reference numeral 804a is an analog switch whose gate (G) is connected to the inverter 805a, and the input of the inverter 805a receives the first sample signal SAMP10. Reference numeral 803a is a transistor for level transformation, R22a is a base current limiting resistor for the transistor 803a, and R18a acts as a current limiting resistor during charging of the capacitor CO1a. Reference numeral 802a is a comparator which is endowed with a hysteresis characteristic by the action of resistors R14a and R15a.

To the + input side of the comparator 802a there is impressed through a resistor R14a the output voltage of a fist laser monitoring amplifier 801a. The amplifier 801a amplifies the output of a photodiode 811a which detects the light output from the first laser diode 812a. Resistors R12a, R13a, and VRO1a regulate the degree of amplification of the operational amplifier 801a. Accordingly, the degree of amplification of the operational amplifier 801a can be varied by varying VRO1a. Reference numeral R11a is a loading resistor for the output of the photodiode within the first laser diode, and between the ends of the resistor there is obtained a voltage which is proportional to the output current of the photodiode 811a. Since the output current of the photodiode 811a is proportional to the light output of the laser diode 812a, the light output of the laser diode can be adjusted by varying the volume VRO1a.

Reference numeral 818a is a comperator for confirming whether the first laser diode is emitting light, and to the side input there is impressed the output voltage of the operational amplifier 801a. To the + side input there is impressed a voltage that is divided by resistors R16a and R17a. Accordingly, when the first laser diode 812a emits light and its output becomes greater than the voltage that is divided by the resistors R16a and R17a, the output level of the comparator 818a changes from HIGH level to LOW level, and a first laser ready signal LRDY10 is output.

Further, to the − side input terminal of the comparator 802a there is impressed a setting voltage for laser light quantity. The setting votage used is the output of a voltage follower 819. To the + input terminal of the voltage follower 819 is input a voltage that is divided by an exposure adjusting volume 821 and a resistor R31 so that it is possible to vary the output voltage of the voltage follower 819 by varying the exposure adjusting volume 821.

Next, the operation of a first laser modulation circuit 514 and a first laser diode 302 will be described. First, when the first laser diode enable signal LDON10 becomes LOW level, a bias current flows in the first laser diode 812a. Next, when the first sample signal SAMP10 becomes LOW level, the output of a voltage follower 806a becomes 0 V and a modulating transistor 809a is not turned on, since the analog switches 804a and 805a are turned on but the capacitor CO1a is not charged. Consequently, there is flowing a current in the first laser diode 812a to an extent in which it will not radiate. At this time, there is no current in the first photodiode 811a so that the output of the comparator 802a is on LOW level and the transistor 803a is turned off, and hence, the capacitor CO1a is charged through resistors R18a and R19a. The time constants of the resistors R18a and R19a and the capacitor CO1a for the charging are chosen in the range of 20 to 50 msec.

If the values of the time constants are too small, response of the stabilizing circuit is too fast and the variations in the light output level of the laser become large. On the contrary, if they are too large, the response becomes poor and it takes long time before the light output becomes stabilized. Due to charging of the capacitor CO1a, the output voltage of the voltage follower 806a is raised gradually. Accordingly, a collector current begins to flow in response to the rise in the base voltage of the laser modulating transistor 809a.

In the first laser diode 812a there flows a resultant of the bias current from the transistor 810a and the collector current from the transistor 809a, and when the resultant current exceeds the threshold current for the first laser diode 812a, the first laser diode 812a emits light. Through the emission from the first laser diode 812a, a current flows in the first photodiode 811a for monitoring, the voltage of the + input terminal of the operational amplifier is raised, and the amplifier outputs a voltage which is an amplification of the input voltage. When the output voltage of the operational amplifier 801a becomes greater than the voltage divided by the resistors R16a and R17a, the output of a comparator 818a, namely, the first laser ready signal LRDY10, changes from HIGH level to LOW level. When the output voltage of the operational amplifier 801a exceeds the voltage at the − input terminal of the comparator 802a, namely, the set voltage for the first laser light quantity, the output of the comparator 802a changes from LOW level to HIGH level, the transistor 803a is turned on, and the condenser CO1a id discharged through the resistor R19a. Accordingly, the base voltage of the modulating transistor 809a is also lowered and the light output of the first laser diode is lowered. When the light output of the first laser diode is lowered, the voltage of the + input terminal of the comparator 802a also becomes lower than the set voltage for the light quantity of the first laser, so that the transistor 803a is turned off again and the capacitor CO1a is charged again through the resistors R18a and R19a. In this manner, when the light output of the first laser diode 812a reaches the set voltage at the − terminal for light quantity of the first laser, the comparator 802a thereafter repeats gradually ON and OFF in the neighborhood of the set voltage for light quantity of the first laser, and the light output of the first laser diode 812a is stabilized.

When the CPU 501 confirms via the I/O port that the first laser ready signal LRDY10 becames LOW level, the sample timer that will be described later is started to operate, the first sample signal SAMP10 is kept on LOW level for a fixed length of time in the region outside of printing for each line, to stabilize the laser light quantity by turning on the analog switches 804a and 807a.

Next, when the dichromatic LBP 199 becomes in the printable state and the first video data signal VDAT10 is sent out from the host system 500, the analog switches 807a and 808a repeat ON and OFF in response to the first video data signal VDAT10, the first laser diode 812a is modulated by the modulating transistor 809a, and writes a dot image data on the photosensitive body 200.

In the above, the first laser modulation circuit 514 and the first semiconductor laser 302 were described in detail. The second laser modulation circuit 521 and the second semiconductor laser 303 have similar configurations. However, to the light quantity setting voltage of the second laser diode 812b, namely, to − input terminal of the comparator 802b, is applied the output of the voltage follower 819. Hence, by varying the exposure adjustment volume 821, the output voltage of the voltage follower 819 is varied, so that the − voltages at the − input terminals of comparators 802a and 802b are varied simultaneously. Therefore, by varying the exposure volume 821, the light output of the first laser diode 812a and the light output of the second laser diode 812b can be adjusted at the same time.

Figure 17:
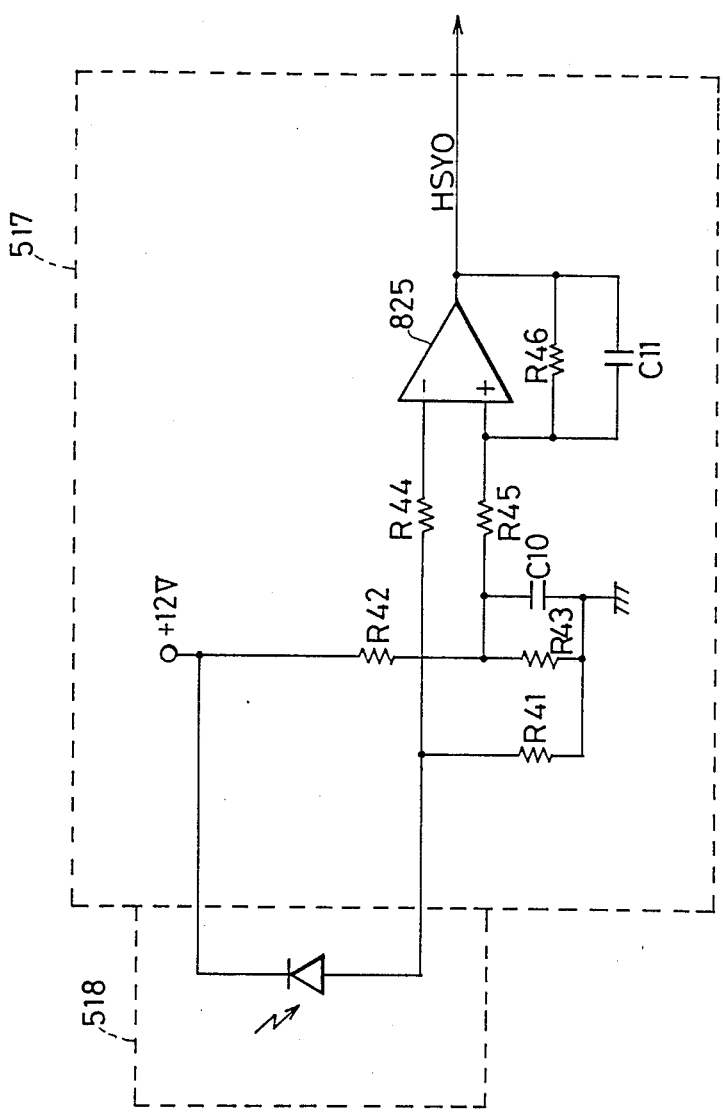
FIG. 17 shows the beam detector and the beam detecting circuit shown in FIG. 8.

FIG. 17 is a detailed circuit diagram for the beam detection circuit 517 and the beam detector 518 shown in FIG. 8. In FIG. 17, 518 is a beam detector for which use is made of a PIN diode with very fast response. The beam detector 518 serves also as a reference pulse in writing printing data in the photosensitive body 200 so that the generating position of the pulse has to be kept stable all the time.

The anode side of the beam detector 518 is connected to the − side input terminal of a high speed comparator 825 via load resistor R41 and a resistor R44. Further, to a resistor R43 there is connected in parallel a capacitor C10 for noise removal. In addition, R46 is a resistor for positive feedback to provide the hysteresis characteristic and C11 is a capacitor for feedback to improve the output waveform by producing a fast feedback.

Next, the operation of the beam detector 518 and the comparator 825 will be described. When a laser beam passes the beam detector 518 at high speed, there flows a pulsed current in the beam detector 518, generating a positive pulsed voltage at the − input terminal of the comparator 825. The pulsed voltage is compared with the voltage at the + input terminal, and a negative pulse HSYO is output from the comparator 825.

Figure 18:
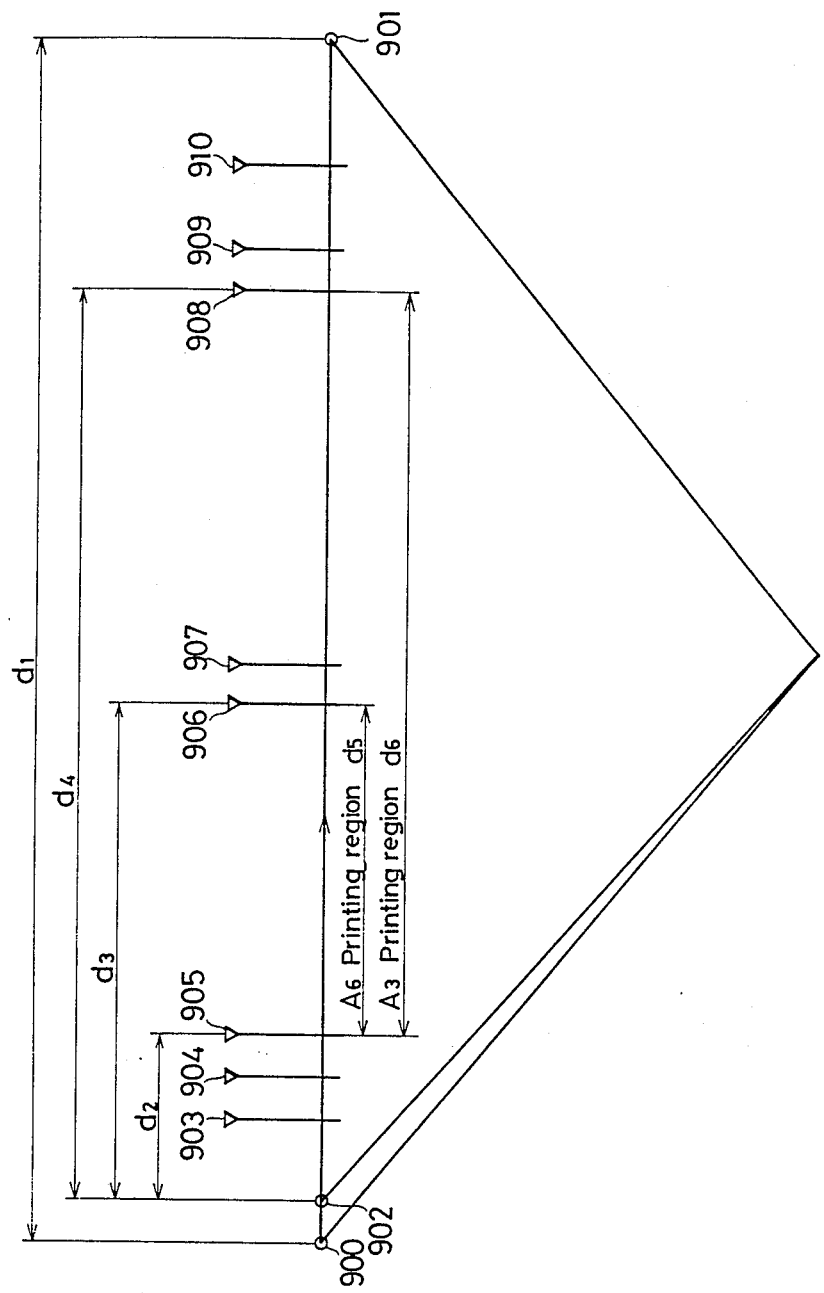
FIG. 18 shows a relationship between a scanning range of the laser beam at one time, a beam detecting point, and a data writing point.

FIG. 18 is a diagram which shows the range of one scanning of taser beam on the photosensitive body 200, and the positional relationship between beam detection position, data write position, and so on within the range.

In FIG. 18, 900 is a beam irradiation starting point, and 901 is a beam scan end point, and a beam which arrived the beam scan end point 901 starts the next cycle of beam scan from the beam irradiation starting point 900 by the next surface of the polygonal mirror, with time zero. Reference numeral 902 is a beam detection starting point of the beam detector 518, 903 is the left side-surface of the photosensitive body, and 910 is its right side-surface. Reference numeral 904 is the left end surface of the paper, 909 is the right end surface of the paper size A3, and 907 is the right end surface of the paper size A6. Reference numeral 905 is the data record starting point, 908 is the data write end point of the paper size A3, and 906 is the data write end point of the paper size A6.

Reference symbol d2 is the distance from the beam detection starting point 902 to the write starting point, d3 is the distance from the beam detection starting point to the write end point for A6 size, and d4 is the corresponding distance for A3 size. Further, d1 is the range of one scan of the beam.

Figure 19:
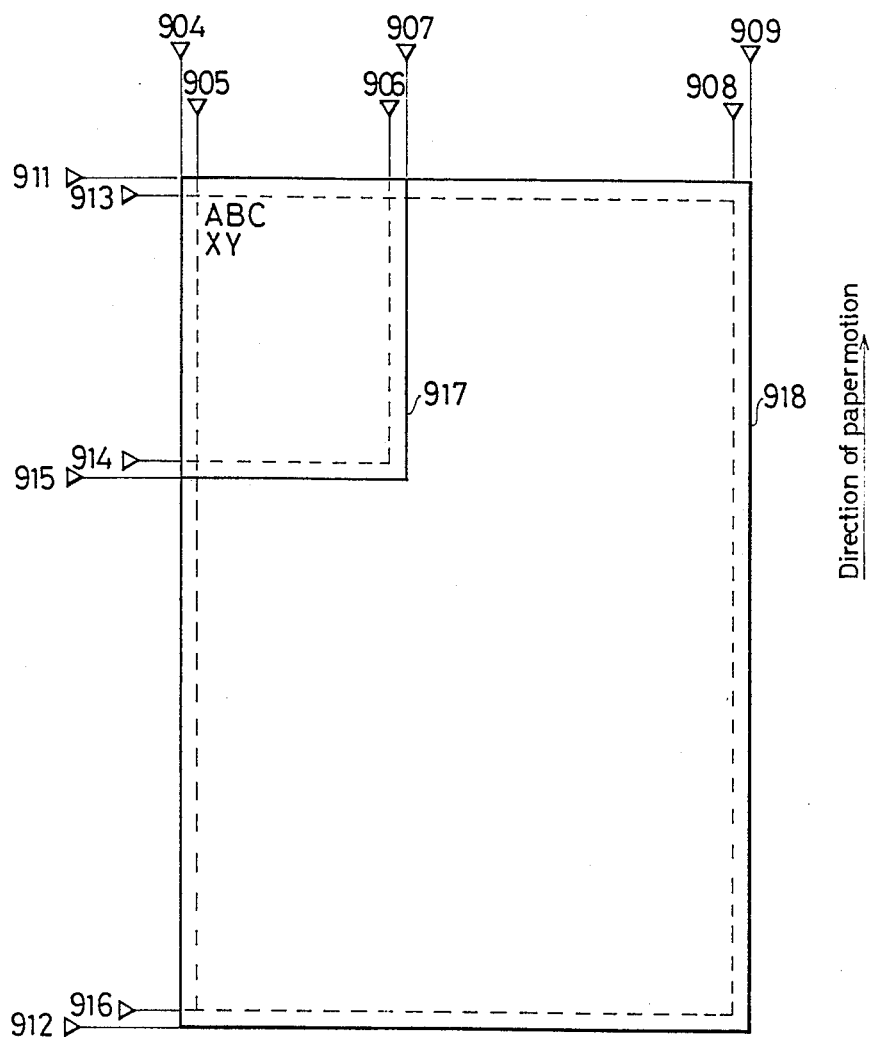
FIG. 19 show a relationship of the data writing points on an over all paper to be recorded.

The distances d5 and d6 are effective printing ranges for sizes A6 and A3. As may be seen from the figure, the papers for the present printer is fed always with the left end surface as the reference so that the distance from the beam detection starting point 902 to the record starting point 905 is the same for papers of all sizes. Therefore, data writing needs be started after elapse of time that corresponds to the distance between the point 902 and the record starting point 905. FIG. 19 shows the entire sizes of papers and their printing areas, not only their horizontal dimensions as shown in FIG. 18.

In FIG. 19, 917 and 918 represent A6 paper and A3 paper, respectively. Reference numerals 904, 905, 906, 907, 908, and 909 are the same positions as shown in FIG. 55.

Reference numeral 911 is the front end of the paper, 913 is the data write starting point in the vertical direction of the paper, 912 is the rear end of an A3 size paper, and 916 is represents the data write end point for an A3 size paper. Reference numeral 915 is the rear end of an A6 size paper and 914 represents the data write end point for an A6 size paper.

Figure 20:
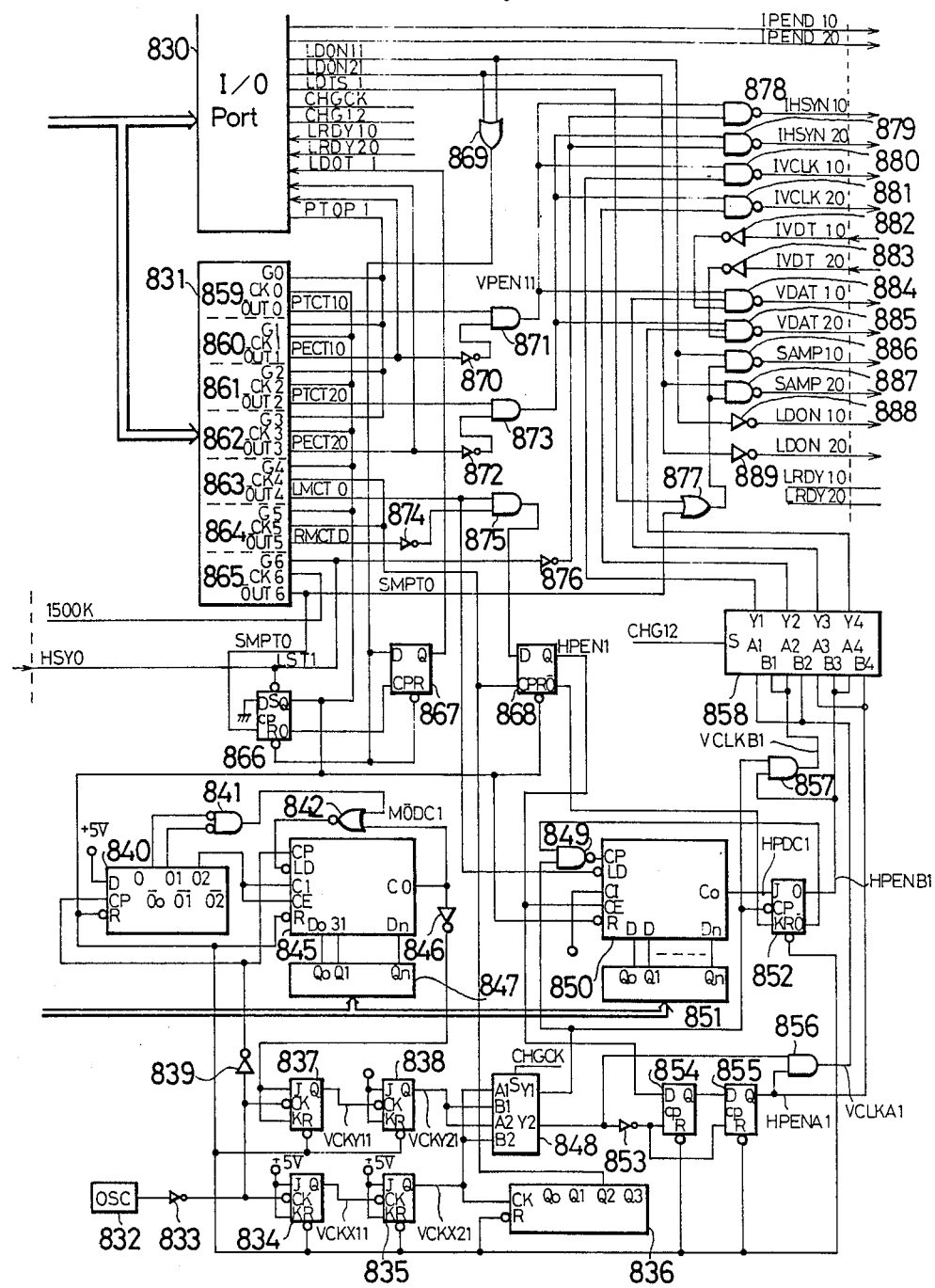
FIG. 20 shows the printed data writing control circuit shown in FIG. 8.
Figure 21:
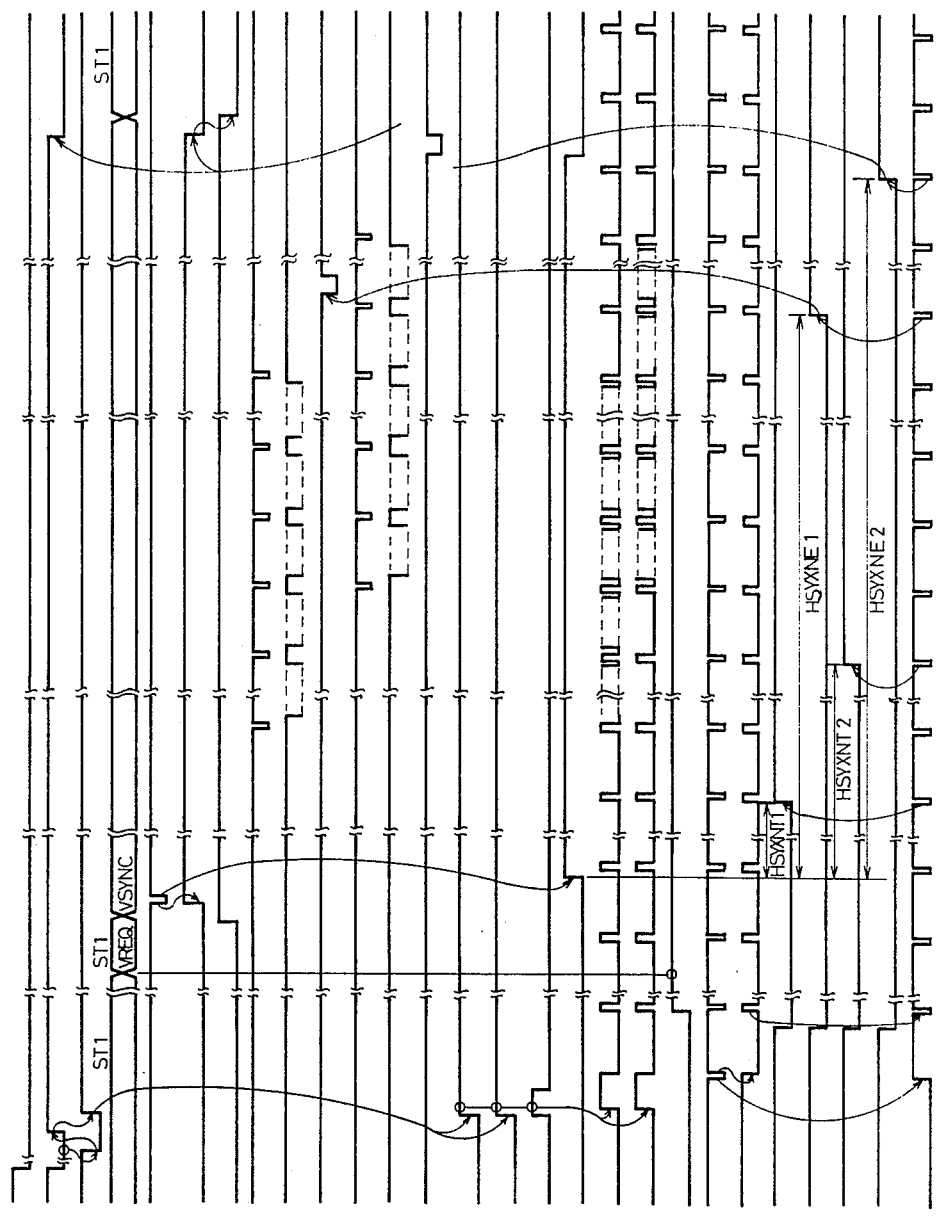
FIG. 21 is a timing chart of a printed data writing control signal in a two color print mode.
Figure 22:
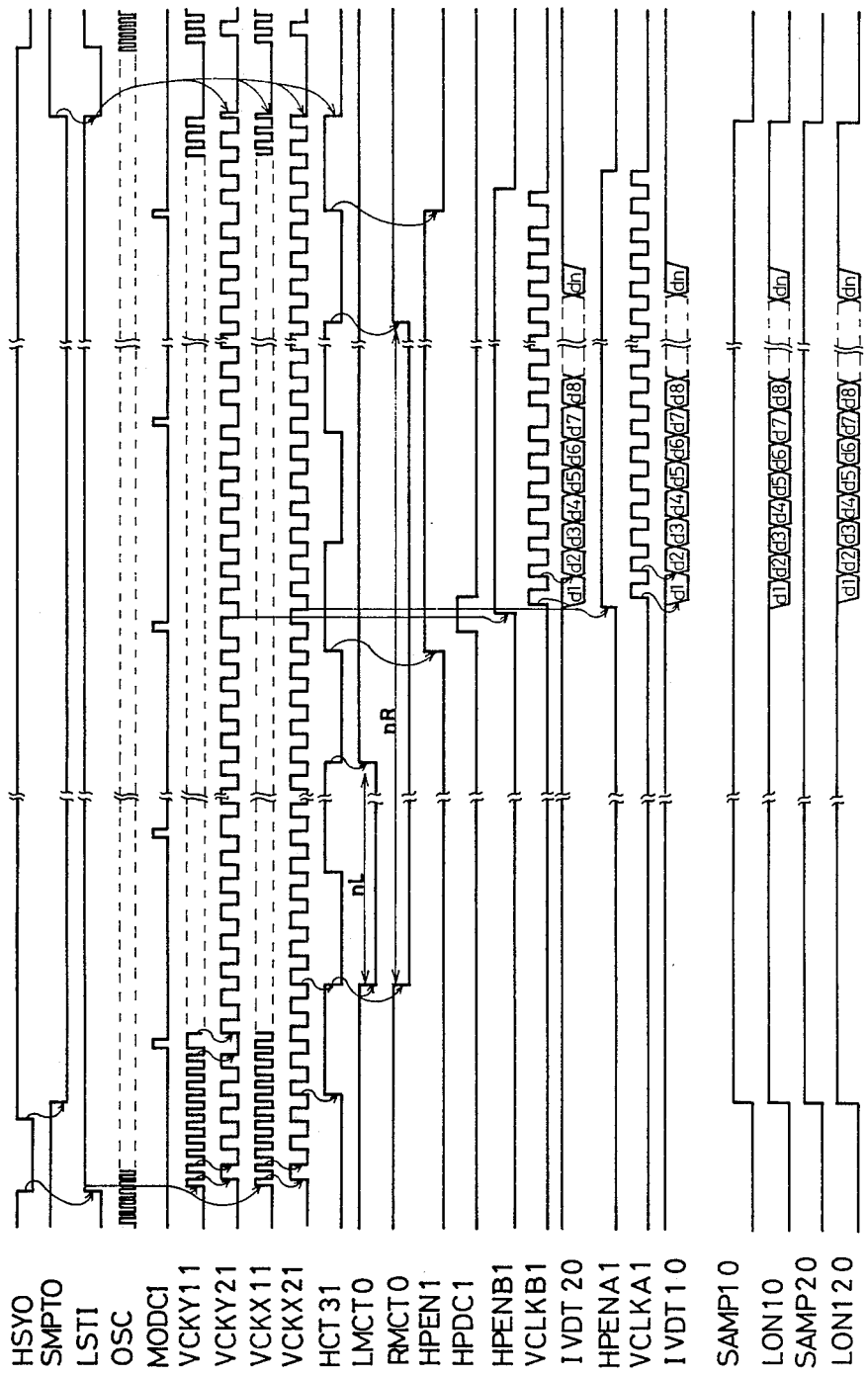
FIG. 22 is a timing chart of a data writing control signal for one line.

FIG. 20 is a detailed circuit diagram for the printing data write control circuit 513 in FIG. 8. The principal functions of the printing data write control circuit 513 includes to send printing data from the host system 500 to the laser modulation circuits 514 and 521 in order to write them in predetermined areas on the photosensitive body 200 in response to the size of the paper to be printed. In addition, it sends necessary signals to the laser light output stabilizing circuits of the laser modulation circuits 514 and 521. Further, it sends timing signals necessary for sending of printing data to the host system 500.

In FIG. 20, 830 is an I/O port which carries out sending and receipt of signals necessary for control of the laser modulation circuits 514 and 521 and the printing data write control circuit 513. Reference numeral 831 consists of counter/timer which carry out control of printing data write control, laser light output sampling, and so forth, and the setting of the operational mode and the setting of the pre-set values for the counter/timer can be done programmably in the CPU 501.

Reference numeral 865 is a laser light output sampling timer, and to its gate input G6 there is input a beam detection signal HSYO which is the output of a beam detection circuit 517. The timer is started when the beam detection signal HSYO is shifted from LOW level to HIGH level, and the completion of the timer operation is arranged to coincide with the completion of the operation of the beam detector 518 to be ready to the next detection operation.

Consequently, every time when a beam detection signal HSYO is input to the input G6, the timer 865 is activated. To the clock input CK6 of the timer 865, there is input a clock of 1500 kHz. The output SMPTO of the timer 865 is input to one input of a 2 OR gate 877 whose output is sent via two 2 NAND gates 886 and 887 to the first laser modulation circuit 514 and the second laser modulation circuit 517 as first sample signal SAMP10 and second sample signal SAMP20, respectively. The other input of the 2 NAND gate 886 receives the first laser diode enable signal LDON11 which is output from the I/O port 830 so that it is possible to forbid independently the first sample signal SAMP10. The other input of the 2 NAND gate 887 receives the second laser diode enable signal LDON21 which is output from the I/O port 830 so that it is possible to forbid independently the second sample signal SAMP20. Further, to the other input of the 2 OR gate 877, there is input the laser test signal LDTS1 output from the I/O port 830, and it is possible to set the first semiconductor laser 302 and the second semiconductor laser 303 in the forced emission state. To the I/O port 830 there are input the first laser ready signal LRDY10 and the second laser ready signal LRDY20 so that by judging the forced emission state of each of the first and second ready signal it is possible to confirm whether or not each laser is emitting.

Reference numeral 866 is a D-type F/F which generates a line start signal LST1, and it is set by a beam detection signal HYSO and is reset by the rising of a sample timer output SMPTO. Reference numeral 867 is a D-type F/F which generates a beam detection ready signal LDOT1 is input to the I/O port 830. The D-type F/F's 866 and 867 can also be reset by the output of the 2 OR gate 869. The inputs to the 2 OR gate 869 are the first and the second laser diode enable signals.

Reference numeral 832 is a crystal oscillator with oscillation frequency of about 32H Hz which generates reference clocks for image clock pulses. Reference numerals 834 and 835 are J-F/F which form quartervary counter and generate a first video clock VCKX21 (about 8 MHz) that corresponds to the minimum modulation unit, one dot, of the laser beam, by dividing the output of the crystal oscillator 832 into four.

Reference numerals 837 and 838 are J-F/F similar to 834 and 835, and forms a quarternary counte. To the J-K input of the J-K F/F 837 there is input to the carry out CO of an n-bit binary counter 845 via an inverter 846. The Q outputs of the J-K F/F 834, 835, 837, and 838 carry out toggle operation synchronized with the clock input CK when the J-K inputs are on HIGH level, and discontinue the toggle operation when the J-K inputs are on LOW level. As a result, the second video clock signal VCKY21 which is the output of the last stage J-K F/F 838 becomes, when the pulse separation in the ordinary operation is called "1", during the time of generation of carry out signal CO of the n-bit binary counter 845, "5/4", prolonged by a quarter clock. The preset inputs $D_0$ to $D_n$ are connected to the outputs $Q_0$ to $Q_n$ of the n-bit latch 847, and their set values can be given values that correspond to DIP-SW or the like of the CPU 501. These set values are for setting the carry out numbers of the n-bit binary counter 845 during one line (that is, during the time when LST1 is on HIGH level), and eventually set the clock generation number of "11/4". An inverter 839, a shift register 840, 2 NOR gates 841 and 842 are circuits for giving a predetermined operation to the n-bit binary counter 845.

The second video clock VCKY21 is used for correcting the difference between the scan length l1 and l2 of the two laser beams shown in FIG. 39(B). For that purpose, one needs only to designate the first video clock signal VCKX21 to the longer scan length l1 of the laser beam and the second video clock signal VCKY21 to the shorter laser beam l2. Reference numeral 848 is a selector to carry out the designation wth the output CHGCK of the I/O port 830.

Next, the correction method will be described by making reference to an example. For instance, if the laser beam l1 with longer scan length is 200 mm and the laser length l2 with shorter scan length is 199 mm, the difference in the scan length is 1 mm. If the resolving power is 12 lines per mm, 12 dot clocks of the video clock signal VCKY21 for laser beam 2 with shorter scan length need be prolonged per 2,400 dot clocks (200×12). In this case, correction of ¼ dot clock has to be carried out for a number of 12×4=48 times for 2,400 dots since ¼ dot clock is prolonged in one correction.

Accordingly, in the n-bit binary counter 845 for which the clock input CP is ¼ dot clock, 48 carry outs need be output during clock counts of 9,600 (namely, 2,400×4). In other words, it needs be preset so as to generate one carry for every 200 counts.

Reference numeral 836 is a binary counter whose Q2 output HCT31 outputs an 8-dot clock (about 1 MHz) which is obtained by dividing the first video clock VCKX21 into eight parts. Reference numeral 863 is a left margin counter which sets the data write starting point based on the beam scan starting point. Reference numeral 864 is a right margin counter which sets the data write end point based on the beam scan starting point. To the gate input G4 of the left margin counter 863 and the gate input G5 of the right margin counter 864 there is input the line start signal LST1, and to the clock input CK4 of the left margin counter 863 and the clock input CK5 of the right margin counter 864 there is input the 8-dot clock HCT31. Both counter with a single counter for each can give corrections for the variations in the data write starting point and the data write end point due to mechanical errors in attaching the beam detector 518, simultaneously for the two laser beams. The reason for giving corrections to the errors are that both deviations in the 8-bit clock unit position and the data write end position remain in the tolerable range provided that the setting for both counter is changed in response to DIP-SW or the like, and that adjustment of the errors beyond the above value can be carried out easily. The set value for the right margin counter is varied for different size of the paper.

Reference numeral 875 is a 2 AND gate to whose one input receives the output LMCTO of the left margin counter 863 and the other input receives the output RMCTO of the right margin counter 864 via an inverter 874, so that the output of the 2 AND gate 875 represents the horizontal printing region.

The output of the 2 AND gate 875 is shifted for 4 dot portion by a shift register 868 whose Q output provides a horizontal printing region signal HPEN 1.

The horizontal printing region signal HPEN 1 is input to the CE input of an n-bit binary counter 850 and to the shift register 854. The n-bit binary counter 850, a 2 NAND gate 849, an n-bit latch, and a J-K F/F 852 has a configuration which can shift the data write starting point by one dot unit, and the output of the J-K F/F 852 outputs a horizontal printing region signal HPENB 1. The preset inputs Do to Dn of the n-bit binary counter 850 that are connected to the outputs of the n-bit latch 851, sets the number of shifts to the right, and the set value can be set by CPU 501 to values in response to DIP-SW or the like. The shift registers 854 and 855, inverter 853 form a circuit which shifts the horizontal printing region signal HPEN 1 by 2 dot clocks to the right, and the output of the shift register 855 outputs a second horizontal region signal HPENA 1. This is arranged in this manner because the first horizontal printing region signal HPENB 1 is shifted to the right by 2 dot clocks even for a minimum setting value.

The output of an AND gate 857 is a first video clock signal VCLKB which shows the video clock signal for the first horizontal region. One of the inputs to the AND gate 857 is the first horizontal region signal HPENB 1, and the other input is the Y1 output of the selector 848. Further, the output of an AND gate 856 is the second video clock signal VCLKA 1 that shows the video clock signal for the portion of the second printing region, and one of the inputs to the AND gate 856 is the second horizontal printing region signal HPENA 1 and the other is the Y2 output of the selector 848.

As described in the above, a signal that can adjust the data write starting point in the unit of 1 dot, the first horizontal region signal HPENB 1, and the first video clock signal VCLKB 1 are used for correcting the error in the scan starting point of two laser beams as shown in FIG. 39(A). In this case, the errrod may be adjusted by designating the second horizontal printing region signal HPENA 1 and the second video clock signal VCLKA 1 to a laser beam S2 whose scan starting point comes earlier and by designating the first horizontal printing region signal HPENB 1 and the first video clock signal VCLKB 1 for a laser beam S1 whose scan starting point comes later.

A selector 858 is the selector for carrying out the above designation which is carried out by the output CHG 12 of the I/O port 830.

Reference numerals 859 to 862 are counters for setting the data write starting point and the data write end point for the vertical direction (direction of motion of the paper), where 859 is a first page top counter for setting the data write starting point for the first color, 860 is a first page end counter for setting data write end point for the first color, 861 is a second page top counter for setting data write starting power for the second color, and 862 is a second page end counter for setting data write end point for the second color.

The gate inputs Go to G3 for the counters 859 to 862 are connected to a page top signal PTOP 1 which is an output of the I/O port and is activated by VSYNC command.

The clock inputs CK0 to CK3 of the counters 859 to 862 are connected to the line start signal LST 1, and as a result, it becomes possible to count with one line of scan as the unit (one dot as the unit). The method of setting each counter will be described later.

Reference numeral 871 is a 2 AND gate whose one input is the output PTCT 10 of the first page top counter 859 and the other input is the output PECT 10 of the first page end counter 860 via an inverter 870. Accordingly, the output of the 2 AND gate 871 becomes a vertical printing region signal VPEN 11 for the first color.

Reference numeral 873 is a 2 AND gate where one input the output PTCT 20 of the second page top counter 861 and the other input is the output PECT 20 of the second page end counter which is input via an inverter 872. Accordingly, the output of the 2 AND gate 873 represents a vertical printing region signal VPEN 21 for the second color.

The output PECT 10 of first page end counter and the output PECT 20 of the second page end counter are input to the I/O port 830, and after the completion of each counting operation send a first page end signal IPEND 10 and a second page end signal IPEND 20 to the host system 500.

Reference numerals 878 and 879 are 2 NAND gates that send a horizontal synchronized signal IHSYN 10 for the first color and a horizontal synchronized signal IHSYN 20 for the second color, respectively, to the host system 500.

Reference numerals 887 and 881 are 2 NAND gates that send a video clock signal IVCLK 10 for the first color and a video clock signal IVCLK 20 for the second color, respectively, to the host system 500.

Reference numeral 884 is a 3 NAND gate which sends a video data signal IVDT 10 for the first color from the heat system 500 to the first laser modulation circuit 514 as a first video data signal VDAT 10.

Reference numeral 885 is a 3 NAND gate which sends a video data signal IVDT 20 for the second color from the host system 500, to the second laser modulation circuit 521 as a second video data signal VDAT 20.

Reference numeral 888 is an inverter which sends a first laser diode enable signal LDON 10 to the first laser modulation, and 889 is an inverter which sends a second laser diode enable signal LDON 20 to the second laser modulation circuit 521.

A timing chart for the principal signals for a portion of one page and for one line in the dichromatic printing mode are shown in FIG. 58 and FIG. 59, respectively.

Next, the operation of each component which is activated in response to control command issued from the control section of the dichromatic LBP 199 will be described in detail by making reference to the flow charts shown in FIG. 26 to FIG. 35.

FIG. 26 to FIG. 30 are flow charts that illustrate the overall operation of the dichromatic LBP.

Figure 26A:
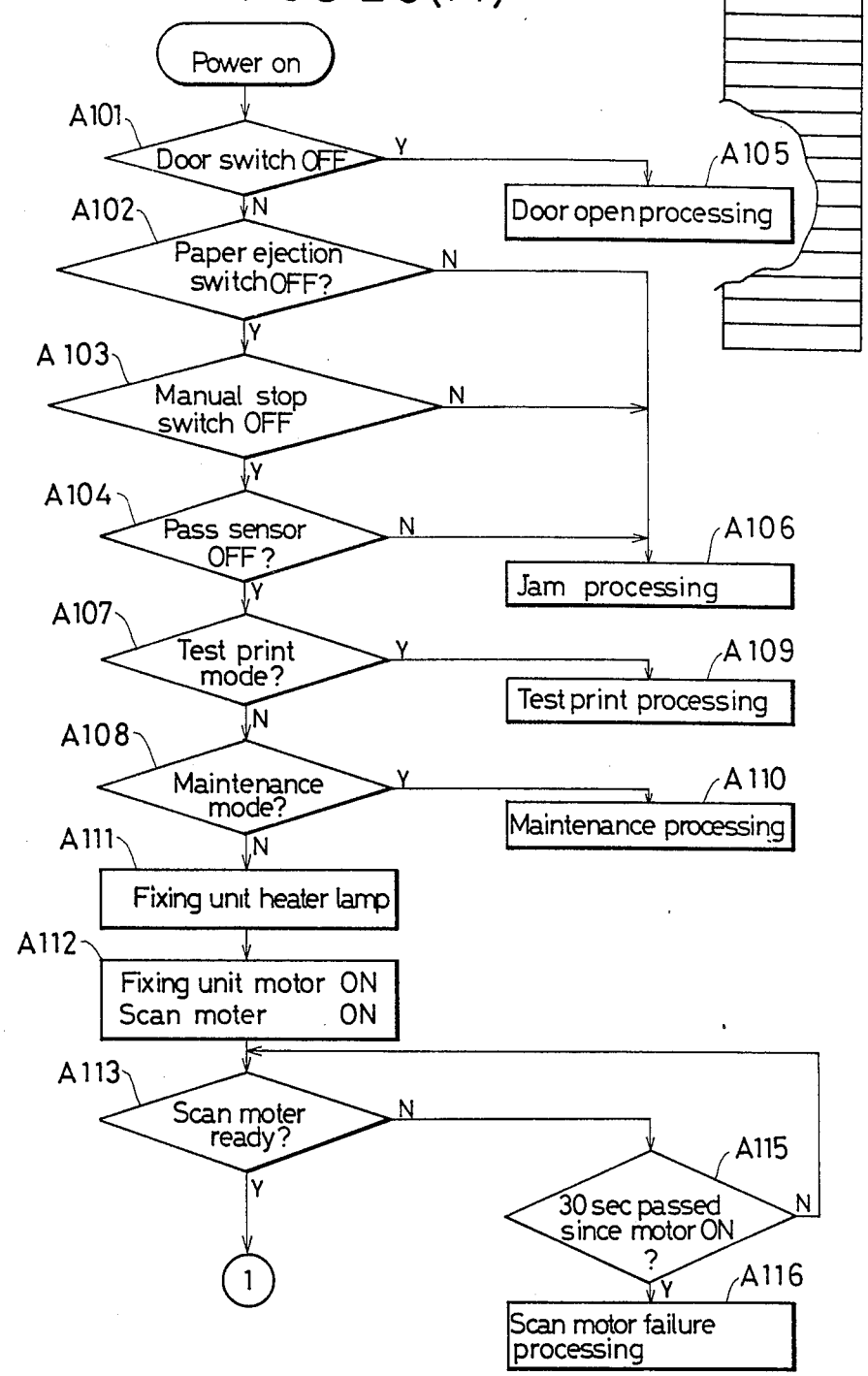
FIG. 26 to 30 are a flow chart showing an overall operation of the two color LBP.
Figure 26D:
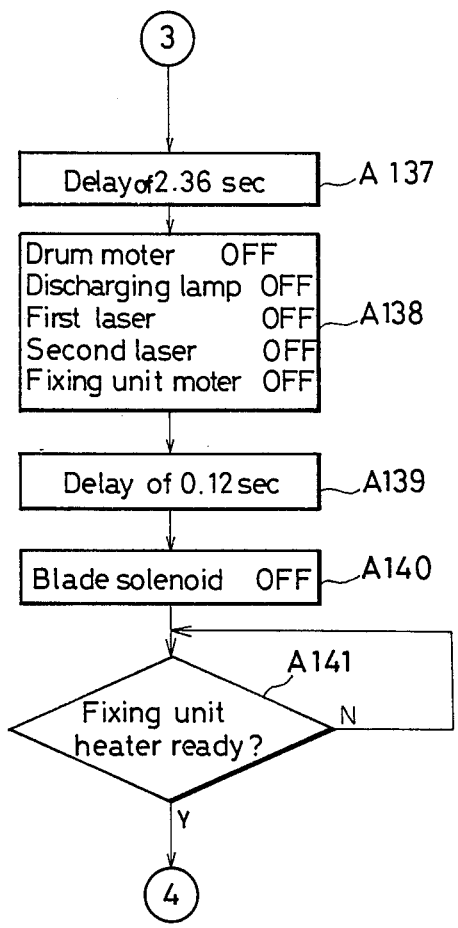

In FIG. 26 are shown a self-diagnosis and warm-up processings for the dichromatic LBP.

In FIG. 26, when the operator closes a power supply 520, the system program housed in the ROM 502 is started, first the self-diagnostic processing of steps A101 to A104 are executed, and when the door switch is ON (negation of step A101), it goes to door opening processing (step A105), and becomes jam processing (step A106) through paper ejection switch ON, manual stop switch ON, and bus sensor ON.

Then, if it is not in the test print mode nor in the maintenance mode (negation of step A107 and negation of step A108), the heater lamp, which heats the fixing unit 221 that takes a relatively long time before the apparatus becomes ready, is turned on (step A111) to start warm-up processing. Next, the motor and the scan motor 512 of the fixing unit 221 is turned on (step A112). Here, if it is in the test print mode (affirmation of step A107), the test print processing is given (step A109), and if it is further in the maintenance mode, the maintenance processing is carried out (step A110).

When the scan motor 512 becomes in the ready state by being turned on (affirmation of step A113), the blade solenoid is turned on (step A114). Further, if the scan motor 512 does not become ready state even after 30 seconds from the turning-on of the motor (negation of step A113 and affirmation of step A115), the failure processing of the scan motor 512 is executed (step A116).

After a subsequent delay processing (step A117), each of the drum motor of the photosensitive body 200, the motor 425 for the developing units, the clatch for the first driving unit 203, the clatch for the second developing unit 206, and the lamp of the discharger 211 is turned on (step A118), and after a delay processing (step A119), each of the first laser diode 302, the second laser diode 303, the laser test device, the pre-transfer charger 208 is turned on (step A120).

After an ensuing delay processing (step A121), failure is checked of the first laser diode 302 and the second laser diode 303 by the use of the monitors (steps A122 and A123), and if they are found to be normal (affirmation of step A122 and affirmation of step A123), it is checked with the horizontal synchronized signals HSYNC whether their beam detection is ready or not (step A126). Further, if the first laser diode 302 has a failure (negation of step A122), a failure processing for the first laser (step A124) is carried out, and if the second laser diode 303 is in failure negation of (step A123), a failure processing for the second laser (step A125) is carried out. In addition, if beam is not detected with a horizontal synchronized signal HSYNC (negation of step A126), there is carried out a beam detection failure processing (step A127).

Figure 33A:
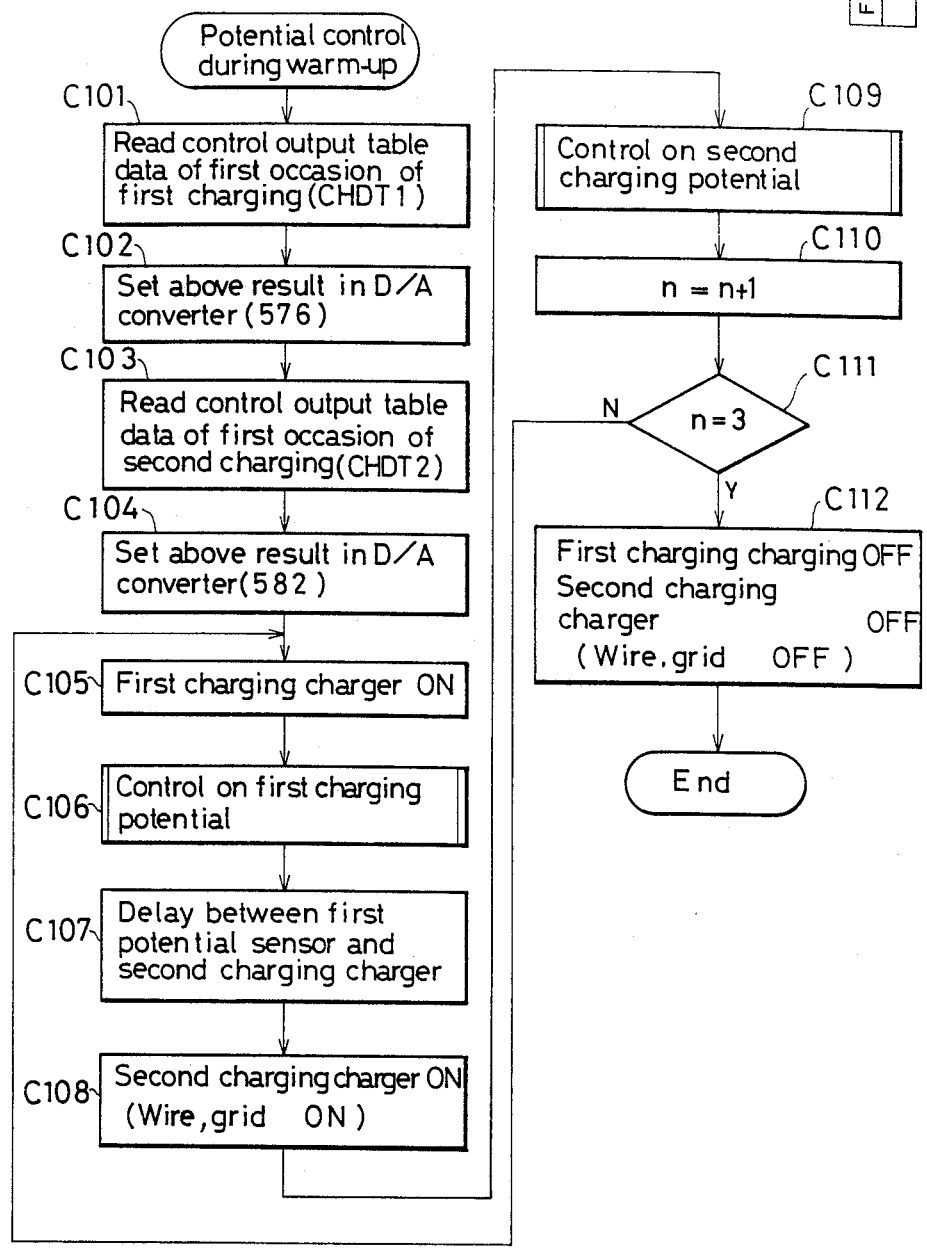
FIG. 33 is a flow chart showing a subroutine for a voltage control before a first printing and a voltage control at a warming up time.
Figure 33B:
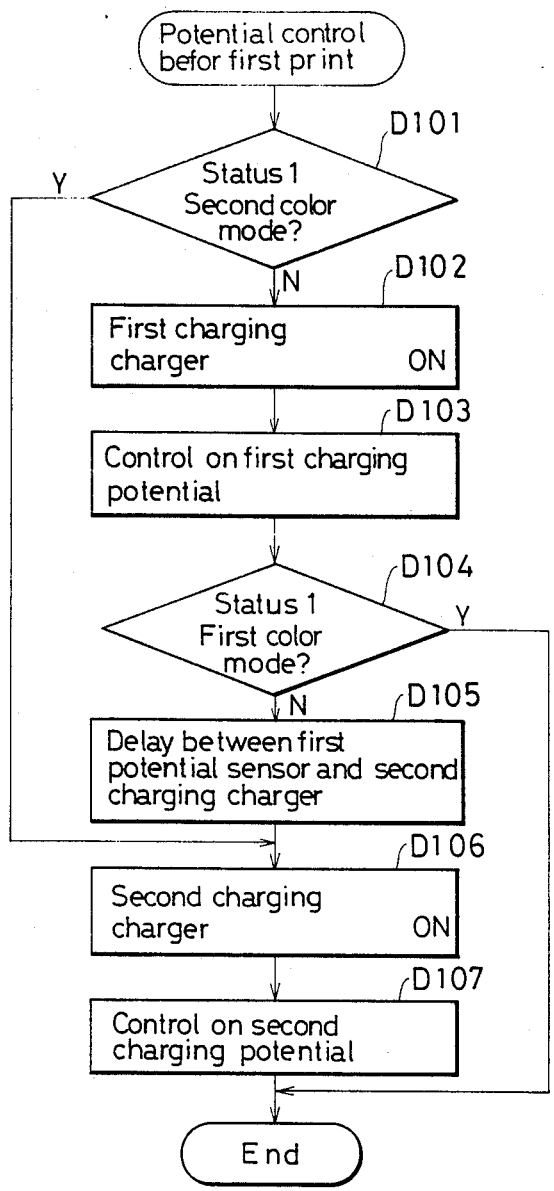
Figure 34A:
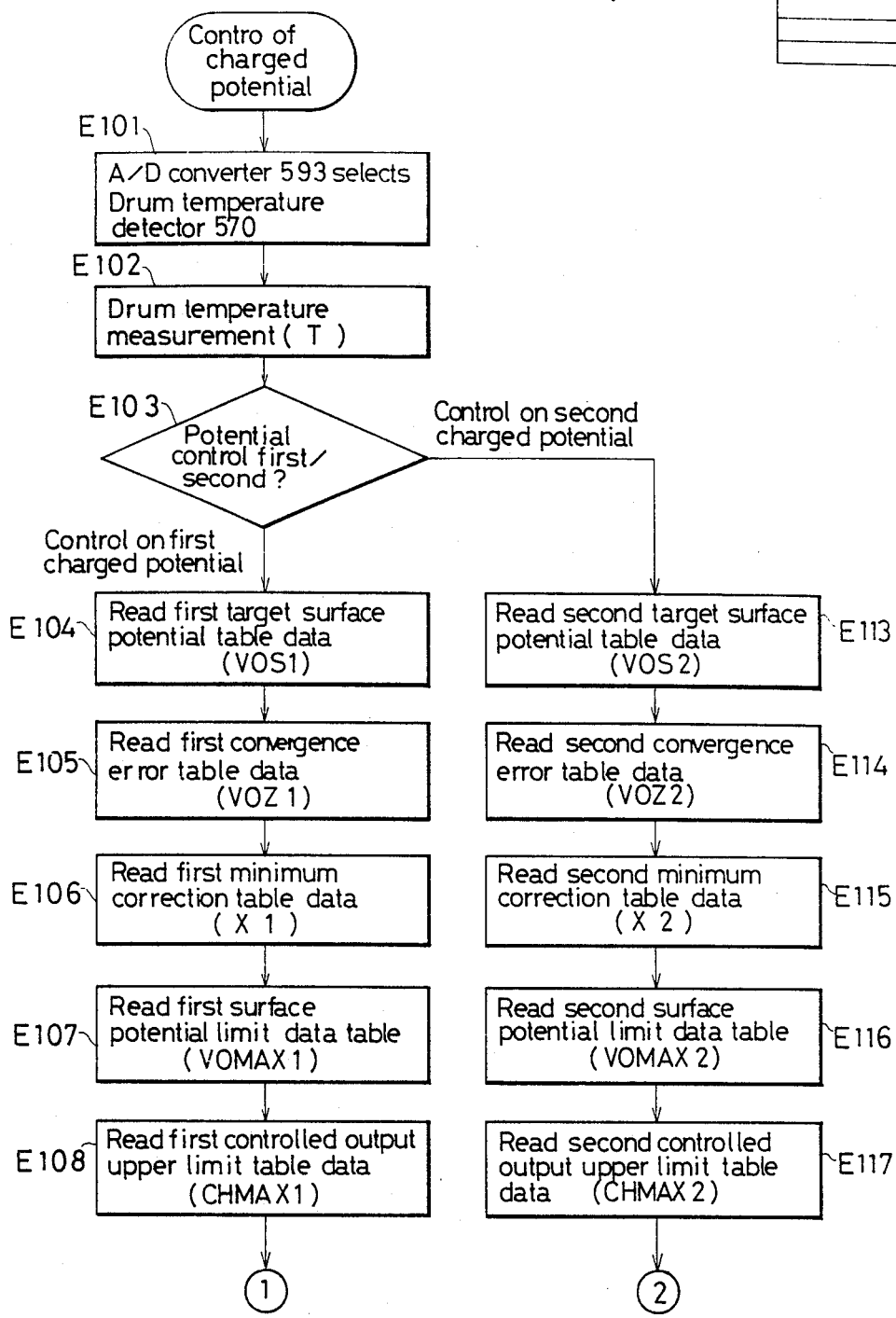
FIGS. 34 and 35 is a flow chart showing a subroutine for a charging voltage control.
Figure 34B:
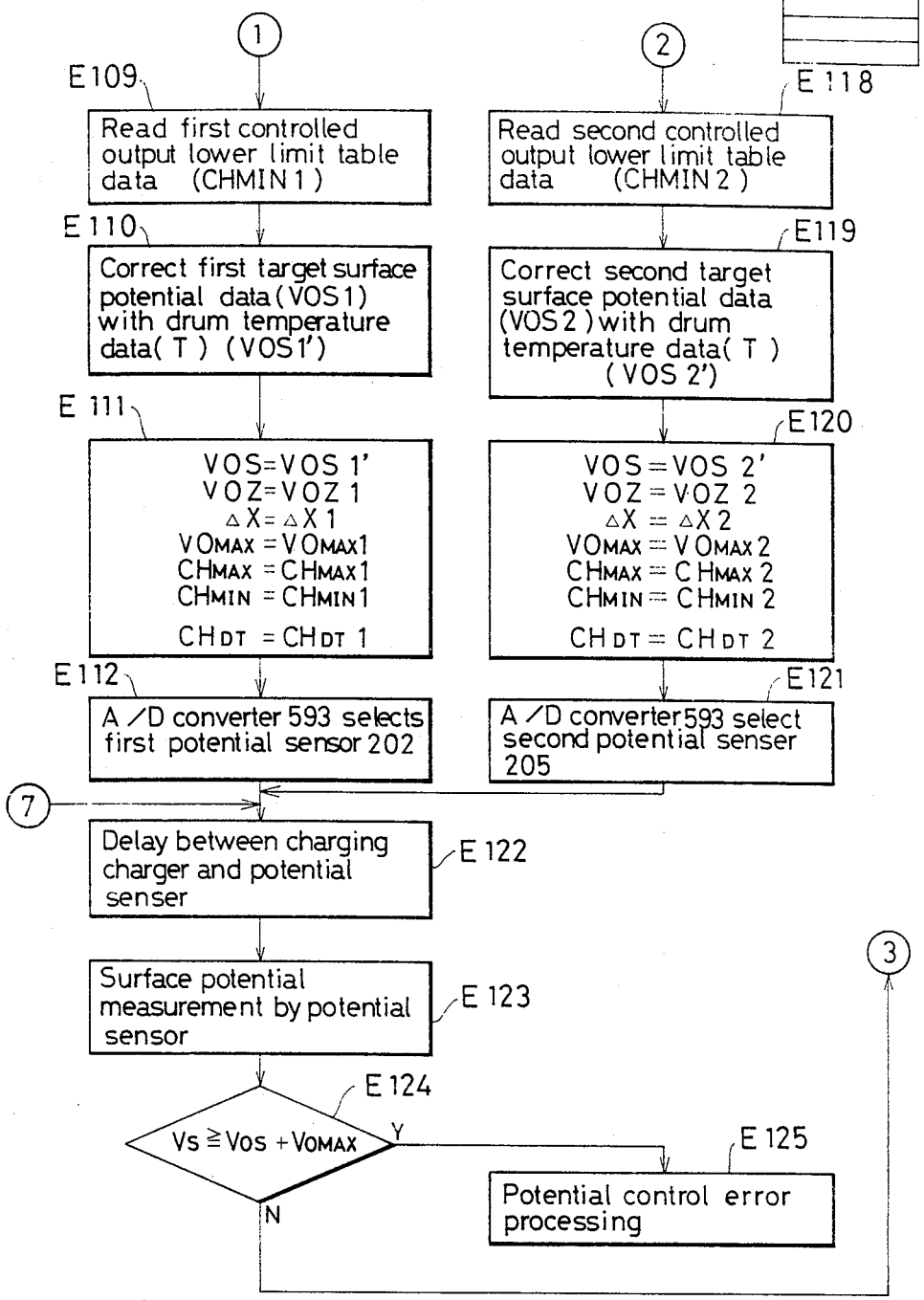
Figure 34C:
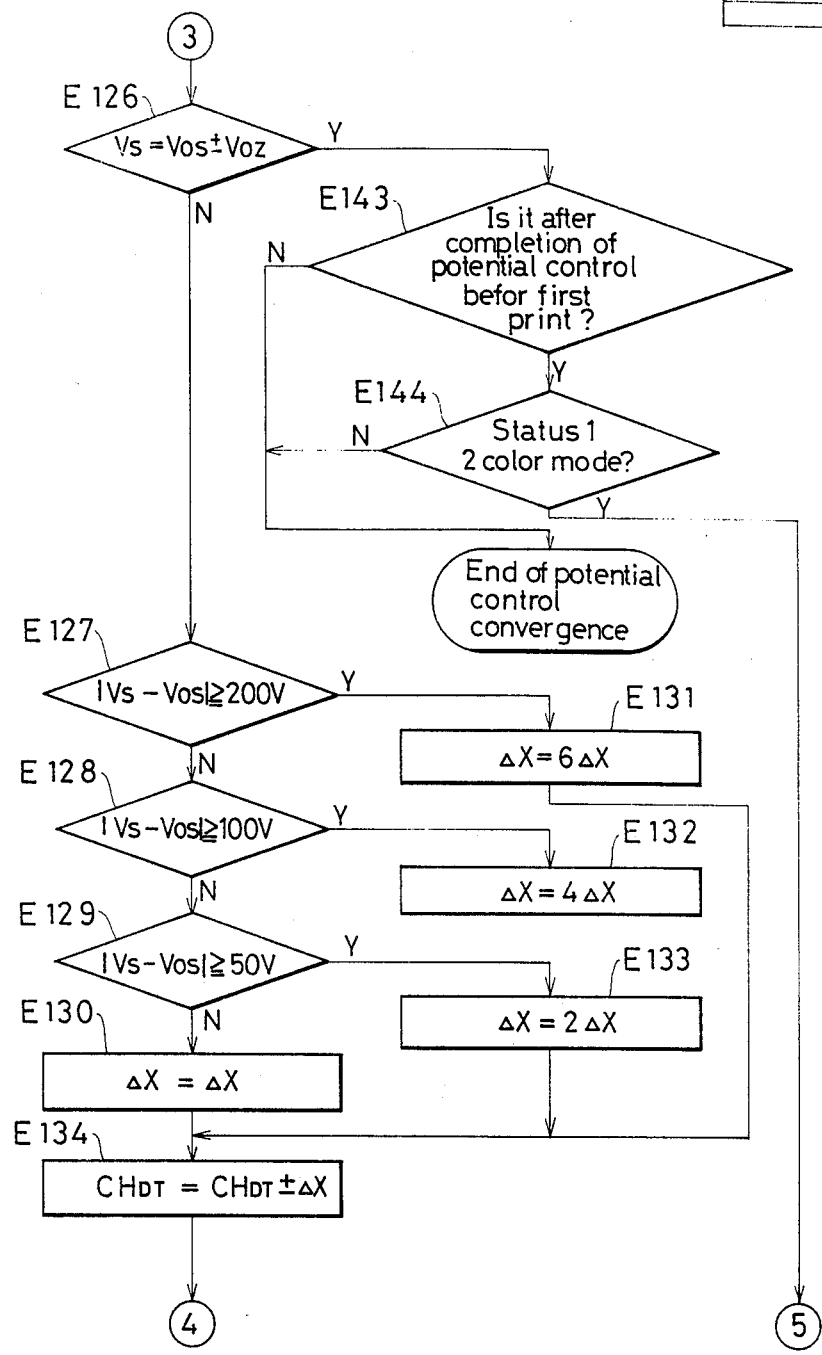
Figure 34D:
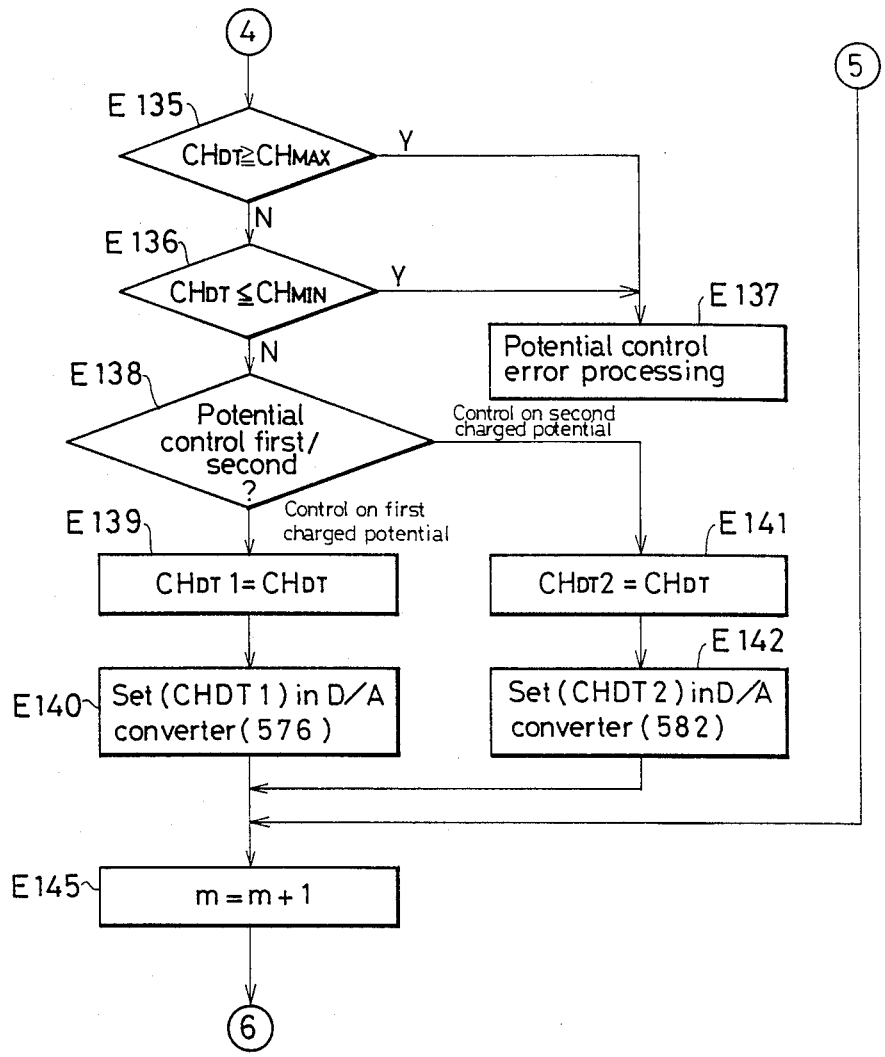

After an ensuing delay processing (step A129), the stripping charger 209 is turned on (step A130), a potential control during warm-up such as shown in FIG. 33, via a delay processing (step A131) is carried out (step A132). Here, step A132 is a processing for preparing the apparatus as soon as possible for the first printing.

After an ensuing delay processing (step A133), it proceeds to the processings of step A134 to step A140. Namely, in step A134, each of the pre-transfer charger 207, the transfer charger, and the stripping charger 209 are turned off. In step A136, the motor 425 for the developing units, the clatch of the first developing unit 203, the clatch of the second developing unit 206, the first charging unit 201, and the second charging unit 204 are turned off. In step A136, the motor 425 for the developing units, the clatch for the first developing unit 203, the clatch for the second developing unit 206, the first charger 201, and the second charger 204 are turned off. In step A138, the drum motor of the photosensitive body 200, the discharger 211, the first laser diode 302, the second laser diode 303, and the motor for the fixing unit 222 are turned off. In step A140, the blade solenoid is turned off.

Figure 27A:
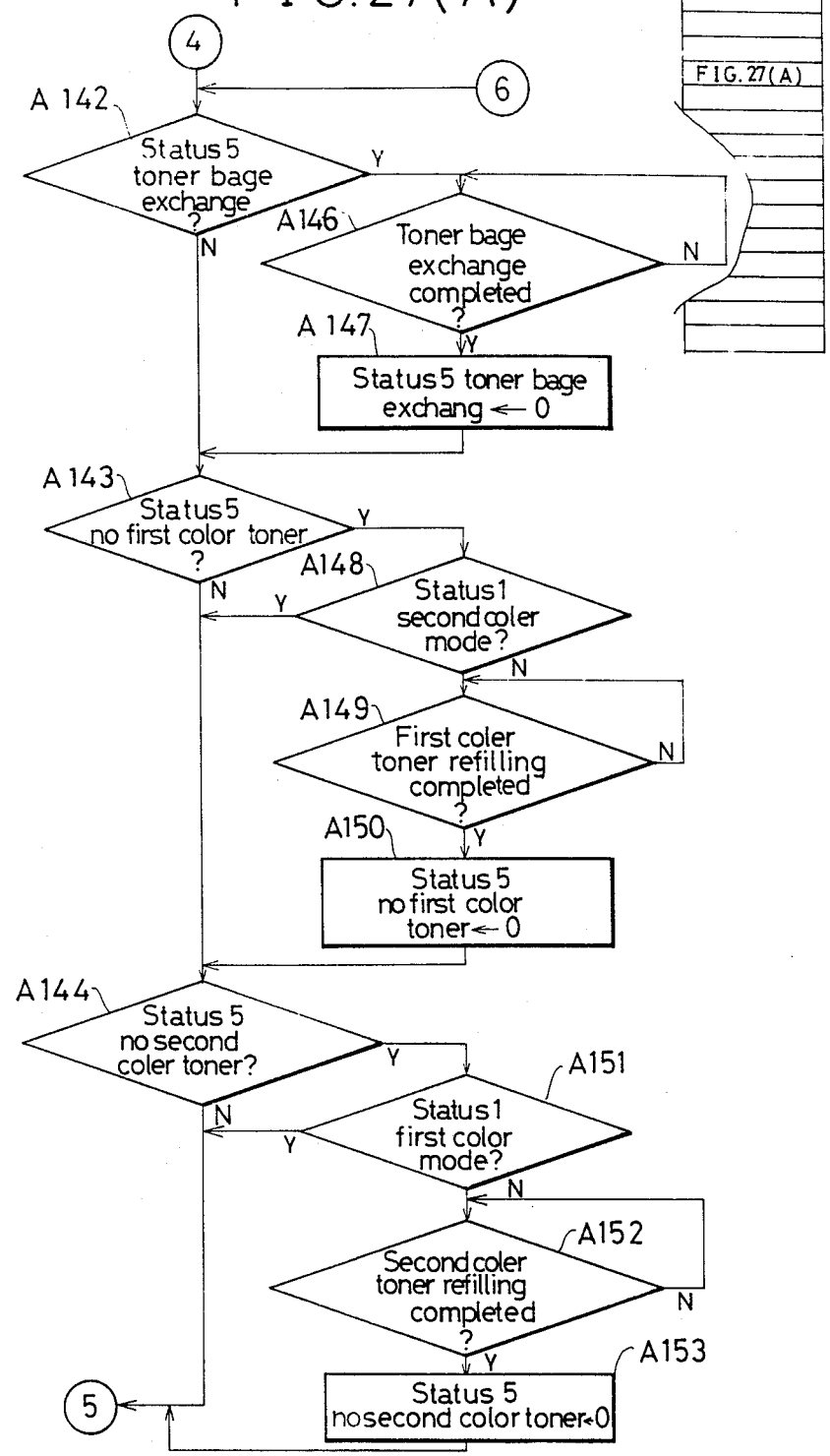
Figure 27B:
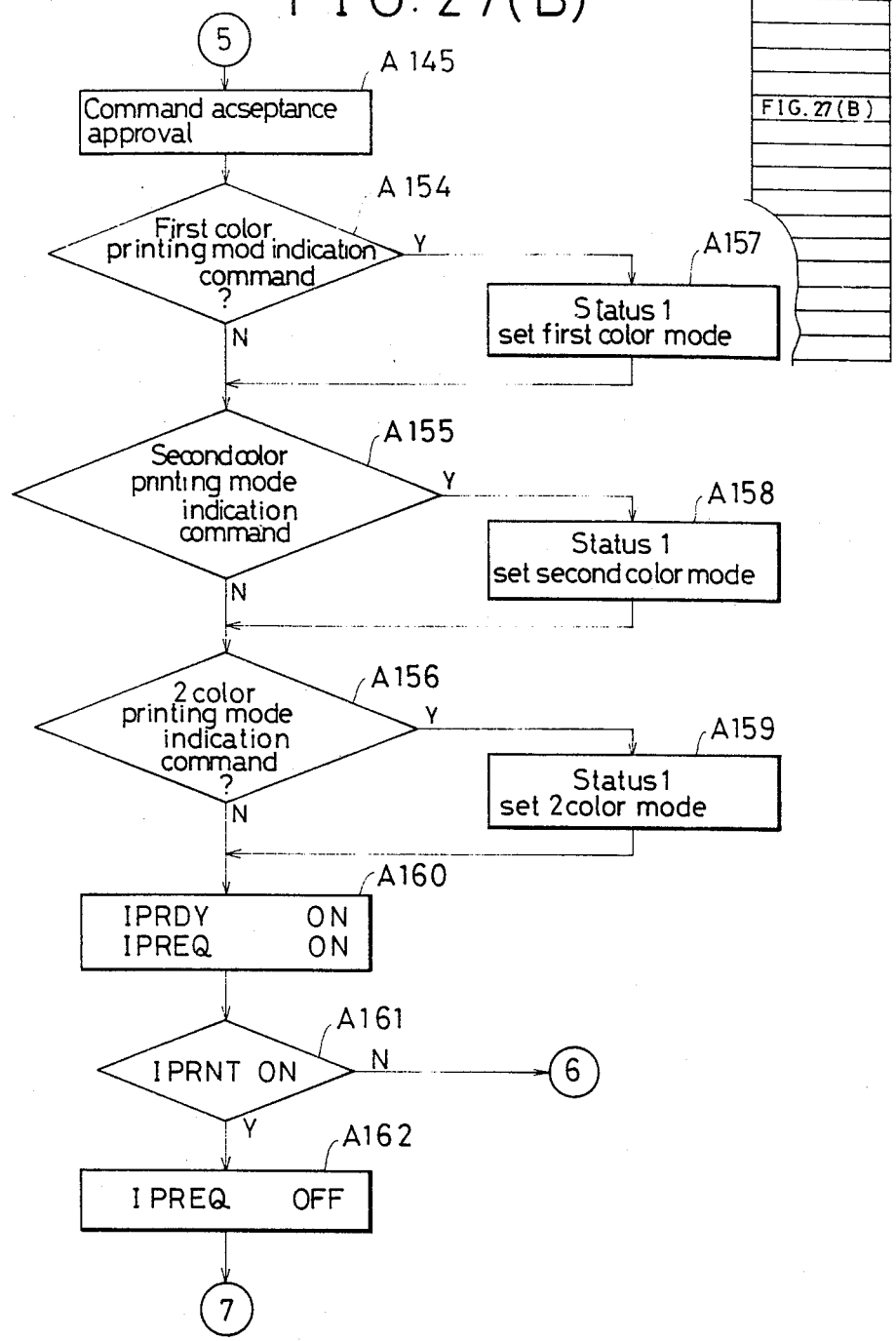

Thereafter, with the fixing unit 221 in ready state (affirmation of step A141), each step of the self-diagnosis and warm-up are completed, and it proceeds to the routine shown in FIG. 27.

In FIG. 27, there are shown processings of reporting the condition of each part of the dichromatic LBP 199 to the host system, and outputting the print request when there are received normal judgment about the condition of each parts from the host system 500.

in FIG. 27, judgment is obtained first from the host system about the contents of status 5 (steps A142 to A145). Namely, in step A142, whether or not the toner bag is to be exchanged is judged. If it is necessary to be exchanged (affirmation of step A142), after waiting for the exchange of the toner bag (step A146), and after completion of exchange (affirmation of step A146, and step A147), it proceeds to step A143. In step A143, whether there exists a no toner state of the first color is judged by ON/OFF of the empty step of the first developing unit 203. If there is no first color toner (affirmation of step A143), whether or not it is in the second color mode is checked by status 1 (step A148), and if it is in the first color mode and in the two color mode (negation of step A148), and proceeds to step A144 after completion of refilling of the first color toner of the first developing unit (affirmation of step A149 and step A150). If the second color mode is determined (affirmation of step A148), the process proceeds to step A144 by skipping steps A149 and A150. In step A144, whether or not the second color toner is in empty state is judged by the ON/OFF of the empty switch of the second developing unit 206. If there is no second color toner (affirmation of step A144), whether or not it is in the first color mode is checked by status 1 (step A151), and if it is in the second color mode and two-color printing mode (negation of step A151), it proceeds to step A145 with the completion of refilling of the second color toner for the second developing unit (affirmation of step A152, and step A153). It is in the first color mode (affirmation of step A151), it proceeds to step A145 by skipping steps A152 and A153.

In this way, a command acceptance (step A145) from the host system 500 is allowed if there exist no abnormality in the conditions of the toners of the first developing unit 203 and the second developing unit 206.

If there is a command which indicates the first color printing mode (affirmation of step A154), the first color mode is set for status 1 (step A157), and if there is a command which indicates the second color printing mode (affirmation of step A155), the second color mode is set in status 1 (step A158).

Further, if there is a command which indicates the two-color printing mode (affirmation of step A156), the two-color mode is set in status 1 (step A159).

Then, when in the ensuing step A160, a processing is carried out which turns on IPRDY and IPRE, there is carried out a processing which judges whether or not IPRINT is in the on-state. If it remains in off-state (negation of step A161), it goes back to step A142, and if it is in on-state (affirmation of step A161), print request (step A162) is turned to off, and it proceeds to the printing processing following the routine shown in FIG. 28.

Figure 28A:
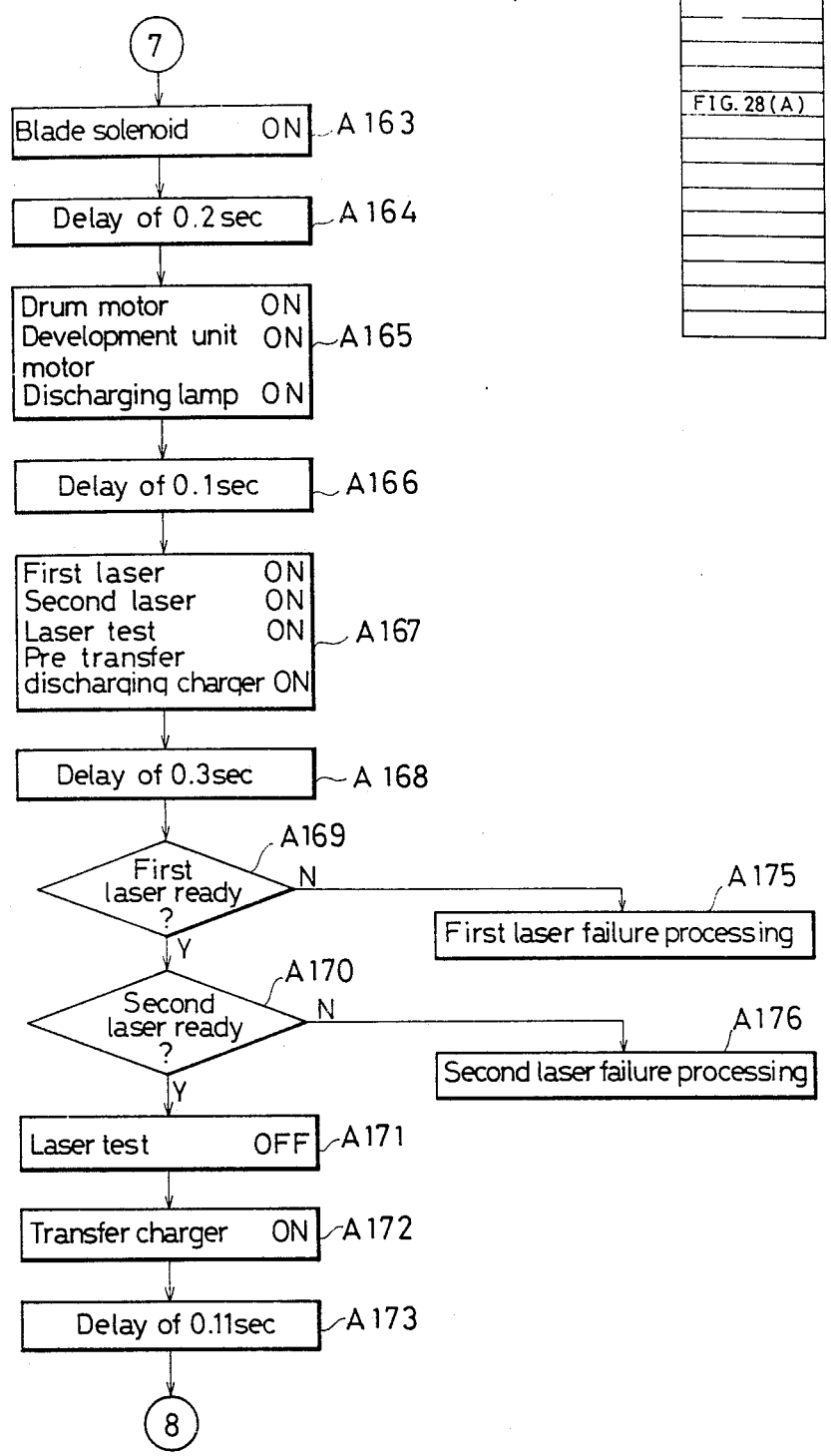
Figure 28D:
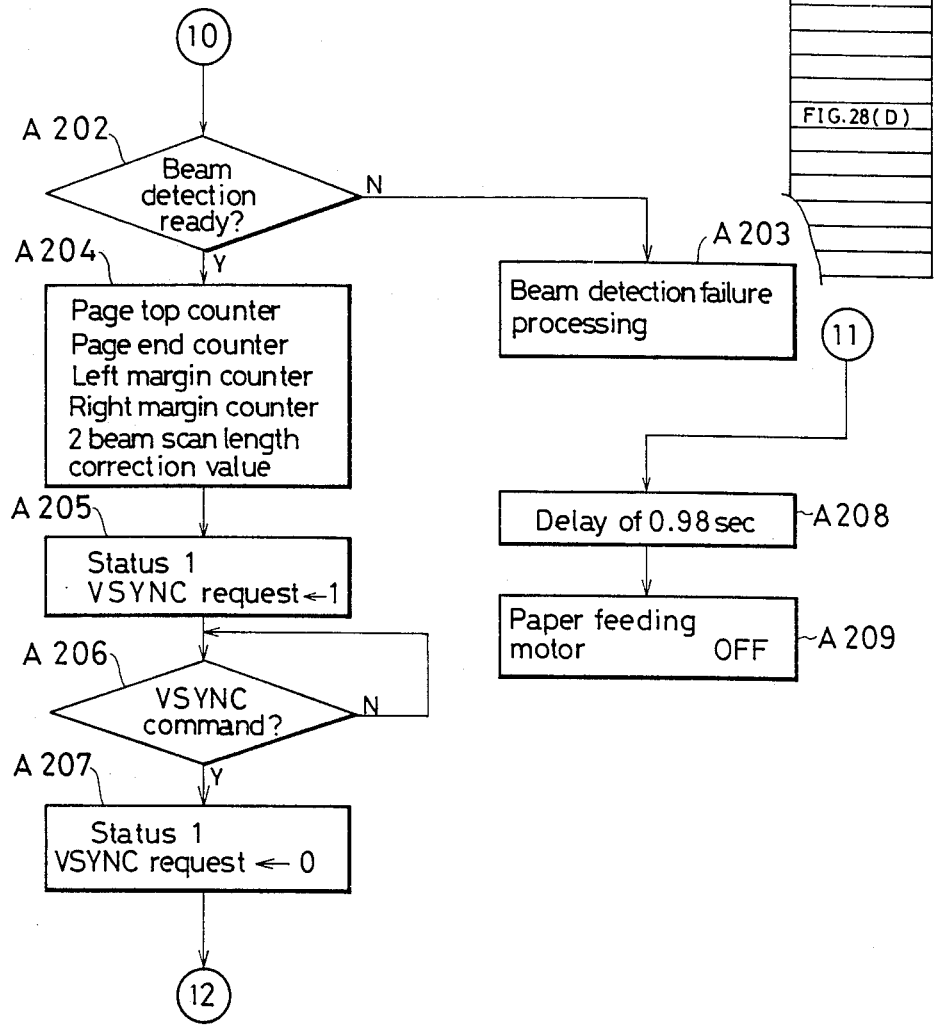
Figure 29A:
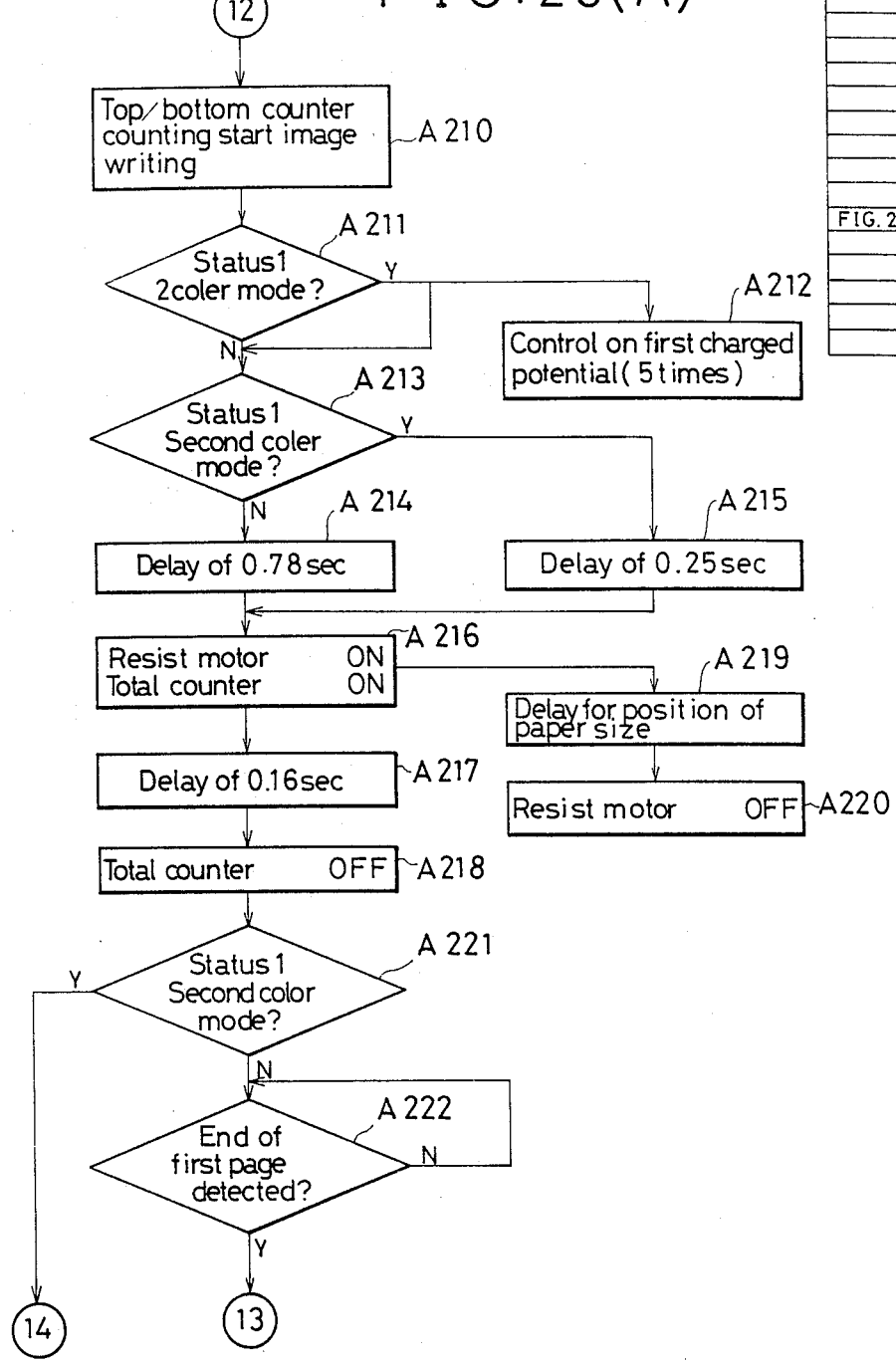

In FIG. 28, processings similar to the routine warm-up processings are executed in step A163 to step A174.

In the ensuing step A177, whether or not it is in the second color mode is checked by status 1. If it is not in the second color mode (negation of step A177), the clatch of the first developing unit 203 is turned on to drive the first developing unit 203 (step 178), and then it proceeds to step A179. If it is in step second color mode (affirmation of step A177), it proceeds to step A179 by shipping step A178.

In step A179, whether or not it is in the first color mode is checked by status 1. If it is not in the first color mode (negation of step A179), the clatch of the second developing unit 206 is turned on to drive the second developing unit 206 (step A180), and proceeds to step A181. If it is in the second color mode, it proceeds to step A181 by shipping step A180.

In step 181, the bias table data about the toner color of the first developing unit 203 is read, and in the ensuing step A182, the bias table data read is set in the D/A converter 578. In the next step A183, the bias table data about the toner color of the second developing unit 206 is read, and in the ensuing step A184, the bias table data that is read is set in the D/A converter 584.

After an ensuing delay processing (step A185), a potential control before a first printing as shown in FIG. 23 is carried out (step A186).

In an ensuing step A187, whether or not it is in the second color mode is checked by status 1. If it is not in the second color mode (negation of step A187), the development bias 409 of the first developing unit 203 is turned on (step A18) before proceeding to step A190. If it is in the second color mode (affirmation of step A187), it proceeds to step A190 by skipping step A188, and at the same time, a control on the potential by second charging as shown in FIG. 33 is carred out (step A189).

In step A191 that follows a delay processing of step 190, whether or not it is in the first color mode is checked by status 1. If it is not in the first color mode (negation of step A191), the development bias 409 of the second developing unit is turned on (step A192) and proceeds to step A194. If it is in the first color mode (affirmation of step A191), it proceeds to step A194 by skipping step A192, and at the same time, a control on the potential by the first charging as shown in FIG. 33 is carried out (step A193).

In step A194, whether the paper feeding cassette is in the top or in the bottom is judged by status 1. When it is judged to be the top one, the paper feeding motor is driven to be rotated in the forward direction to feed a paper in the top cassette (step A195) to proceed to step A199, and at the same time, the paper feeding motor is turned off (step A109) after a delay processing of step A208. On the hand, if it is judged to be the bottom one, skips step A195, and after a delay processing (step A196), the paper feeding motor is rotated in the reverse direction to feed a paper in the bottom cassette (step A197) before proceeding to step A199, and at the same time, after a delay processing of step A208 it turns off the paper feeding motor (step A209).

In step A199, whether or not it is in the second color mode is confirmed by status 1. If it is not in the second color mode (negation of step A199), it proceeds to step A202 after a delay processing of step A200, and if it is in the second color mode (affirmation of step A199), it proceeds to step A202 after a delay processing of step A201.

In step A202, it confirms that beam detection is ready by a horizontal synchronized signal HSYNC before proceeding to step A204. If on the other hand beam detection is not ready (negation of step A202), it carries out a beam detection failure processing.

In step A204, the page top counter, page end counter, left margin counter, right margin counter, and a two-beam scan length correction value are set.

In the ensuing step A205, a VSYNC request of status 1 is set. At the same time, it waits for a VSYNC command (step A206), and when the VSYNC command is issued from the host system 500, a VSYNC request 1 is reset (step A207).

In an ensuing step A210 of FIG. 34, counting by the top/bottom counter is started to write an image. Following that, whether or not it is in the dichromatic printing mode is confirmed by status 1 (step A211). If it is in the first color mode or in the second color mode (negation of step A211), it proceeds to step A213, and if it is in the dichromatic mode (affirmation of step A211), it proceeds to step A213 as well as repeats the control on the potential by the first charging as shown in FIG. 33 for five times (step A212).

In the ensuing step A213, whether or not it is in the second color mode is confirmed by status 1. If it is not in the second color mode (negation of step A213), after a delay processing of step A214 it proceeds to step A216, and if it is in the second color mode (affirmation of step A213), after a delay processing of step A215 it proceeds to step A216.

When in step A216 the resist motor is turned on and the total counter is turned on, after a delay processing (step A217) it proceeds to step A221 by turning off the total counter, and at the same time, after a delay for the portion of the paper size (step A219) the resist motor is turned off (step A220).

In step A221, it is confirmed again whether or not it is in the second color mode. If it is not in the second color mode (negation of step A221), the first color image writing is completed when the first page end is detected (affirmation of step A222), an IPEND 1 is output (step A223) and the process proceeds to step A224. In step A224, it is confirmed whether or not it is in the first color mode.

If status 1 is the first color mode (affirmation of step A224), when there is a first color toner in the first developing unit 203 (negation of step A231) even if there is not a second color toner in the second developing unit 206 (affirmation of step A238), the print request IPREQ is turned on (step A248).

Figure 30A:
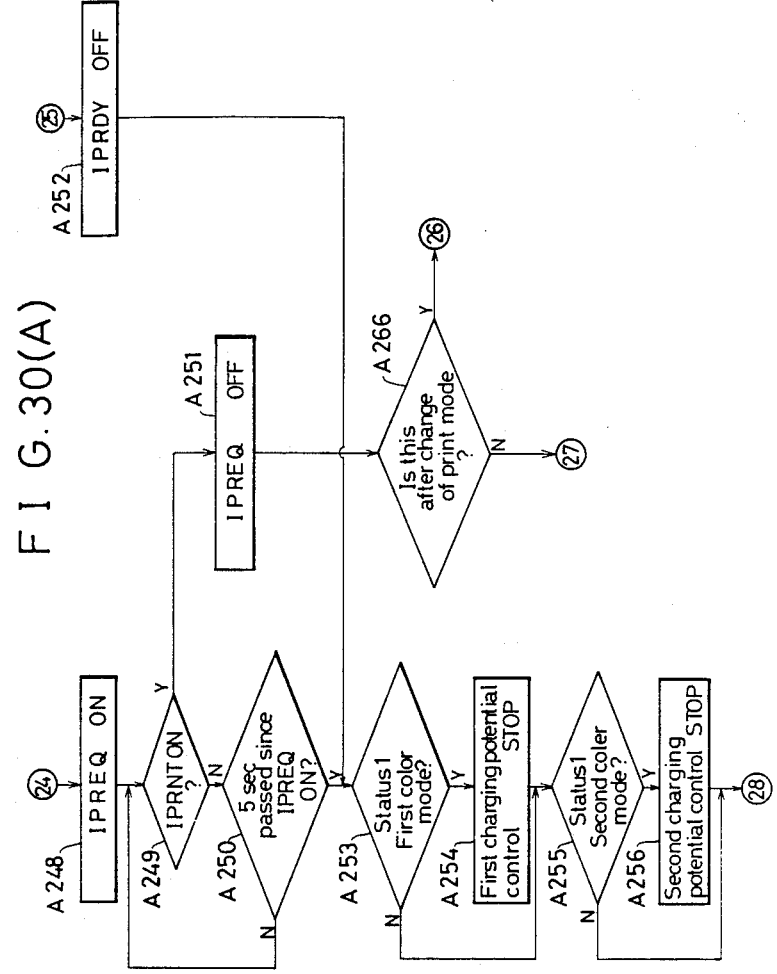

Here, if there is no first color toner in the first developing unit 203 (affirmation of step A231), and further, there is no second color toner in the second developing unit 206 (affirmation of step A232), the print ready signal IPRDY is turned off (step A252) as shown in FIG. 30.

Further, even if there is no first color toner in the first developing unit 203 (affirmation of step A231), when there is the second color toner in the second developing unit 206 (negation of step A232) and both of the first color and the second color have the same color (affirmation of step A233), the development bias 400 of the first developing unit 203 and its clatch are turned off (step A235) at the time when there is issued an indication command for the second color printing mode (affirmation of step A234. Then, the first charger 201 is turned off by an interruption of the control on charged potential of the first charger 201 (step A236), the second color mode of status is set (step A237), and through a print request IPREQ is turned on (step A248).

In contrast to the above, when there is the first color toner in the first developing unit 203 (negation of step A231) and the second color toner in the second developing unit 206 (affirmation of step A238), if there is an indication command for the second color printing mode (affirmation of step A239), the development bias of the first developing unit 203 and its clatch are turned off (step A235), the first charging unit 201 is turned off by an interruption of the control on the charged potential of the first charger 201 (step A236), the second color mode of status 1 is set (step A237), and a print request IPREQ is turned on (step A248).

On the other hand, when the second color mode is confirmed in step A221 and the first color mode is not confirmed in step A224, the second color image write is completed with the detection of the second page end (affirmation of step A225), a IPEND 2 is output (step A226), and the process proceeds to step A227.

If the status 1 is the second color mode (affirmation of step A227), even if there is no second color toner in the second developing unit 206 (affirmation of step A240), when the first color is in the first developing unit 203 (negation of step A241) and both of the first color and the second color are the same color (affirmation of step A242), the development bias of the second developing unit 206 and its clatch are turned off (step A244) at the time when an indication command for the first color printing mode is issued (affirmation of step A243) and the second charger 204 is turned off by an interruption of control on the charged potential of the second charger 204 (step A245a). After a first color mode of status 1 is set (step A245b), a print request IPREQ is turned on as shown in FIG. 30 (step A248).

Further, in step A227 if status is other than the second color mode, whether or not "no first color toner" is judged by status 5 (step A228), and whether or not "no second color toner" is judged by status 5 (step A229). Then, if there is no toner in both of step A228 and step A229, the print ready IPRDY is turned off (step A252).

In addition, if there are toners of the first color and the second color exist (negation of step A228 and negation of step A229), it proceeds to step A248. At the same time, control on the potential by second charge is carried out twice as shown in FIG. 33 (step A230).

Moreover, by deleting the judgments of step A233 and step A242 from the routine of step A221 through step A248, it is possible to carry out continuous development by switching development even when the toners of the first developing unit 203 and the second developing unit 206 are not the same color.

In FIG. 67, after the processing of turning on a print request IPREQ in step A248, a judgment processing waiting 5 seconds from turning-on of the IPRNT ON (steps A249 and A250) is carried out. If the IPRNT is turned on (affirmation of step A249), the print request IPREQ is turned off (step A251) to judge whether or not the printing mode is changed (step A266).

If the printing mode is changed (affirmation of step A266), it returns to step A177, and the first developing unit 203 or the second developing unit 206 is brought to the developable state, by watching satus 1 between step A177 and step A193.

If the printing mode is not changed (negation of step A266), it returns to step A194, and the processings between step A177 through step A194 are omitted.

However, in the case of either printing mode, processings are carried out for both cases without having the processing of step A142 through step A174, so that the recording operation can be continued without temporarily interrupting the dichromatic LBP 199.

In contrast, when the judgement processing of waiting the IPRNT ON for 5 minutes (step A249 and A250), if 5 seconds elapsed (affirmation of step A250), after an interruption processing of step A253 to step A265, it goes back to step A142 and goes into the waiting state which is waiting for a command from the host system 500.

Further, when the print ready IPREQ is turned off (step A252), the printing operation becomes unnecessary so that after the interruption processing of step A253 through step A265 it returns to step A142 and goes into the state waiting for a command from the host system 500.

Figure 31B:
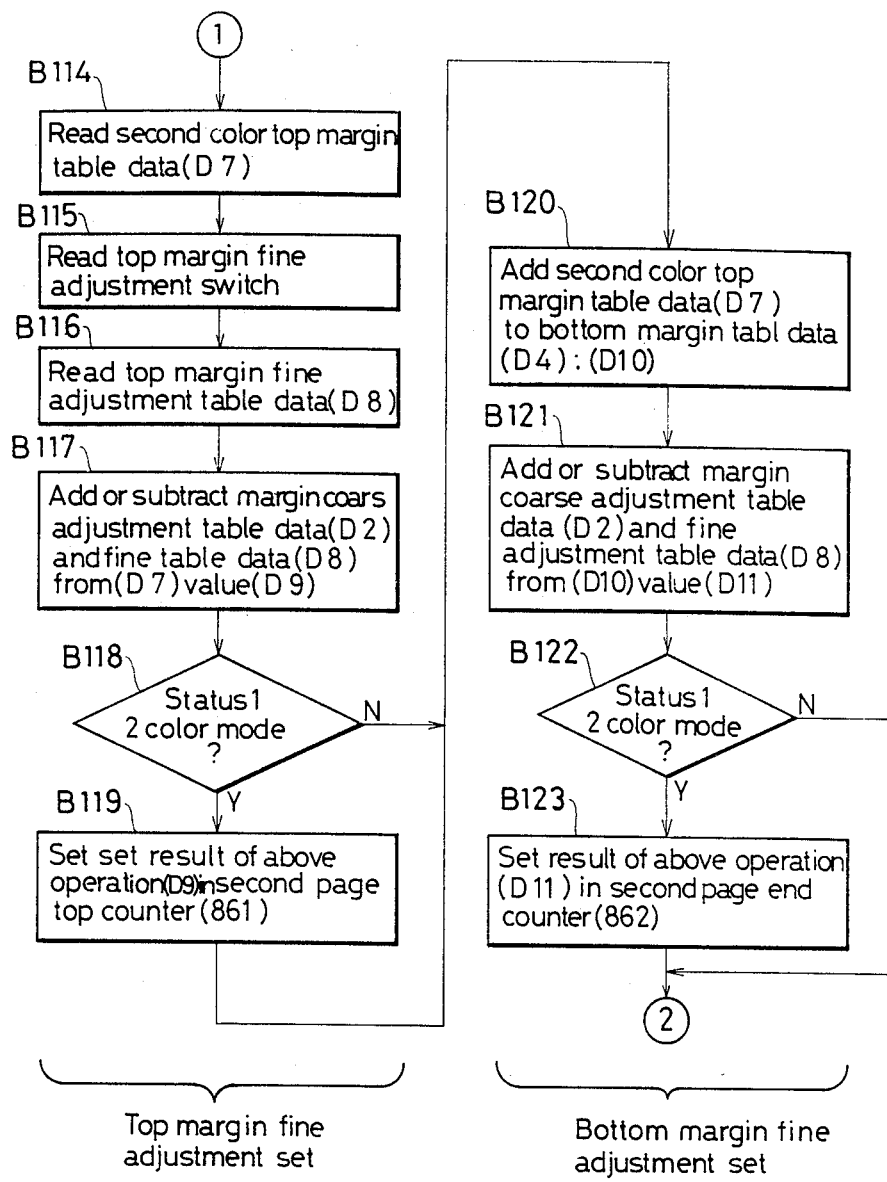
FIGS. 31 and 32 are a flow chart showing a subroutine for setting a page top counter, a page end counter, a left margin counter, a right margin counter, and a two beam scan length correction value.
Figure 32B:
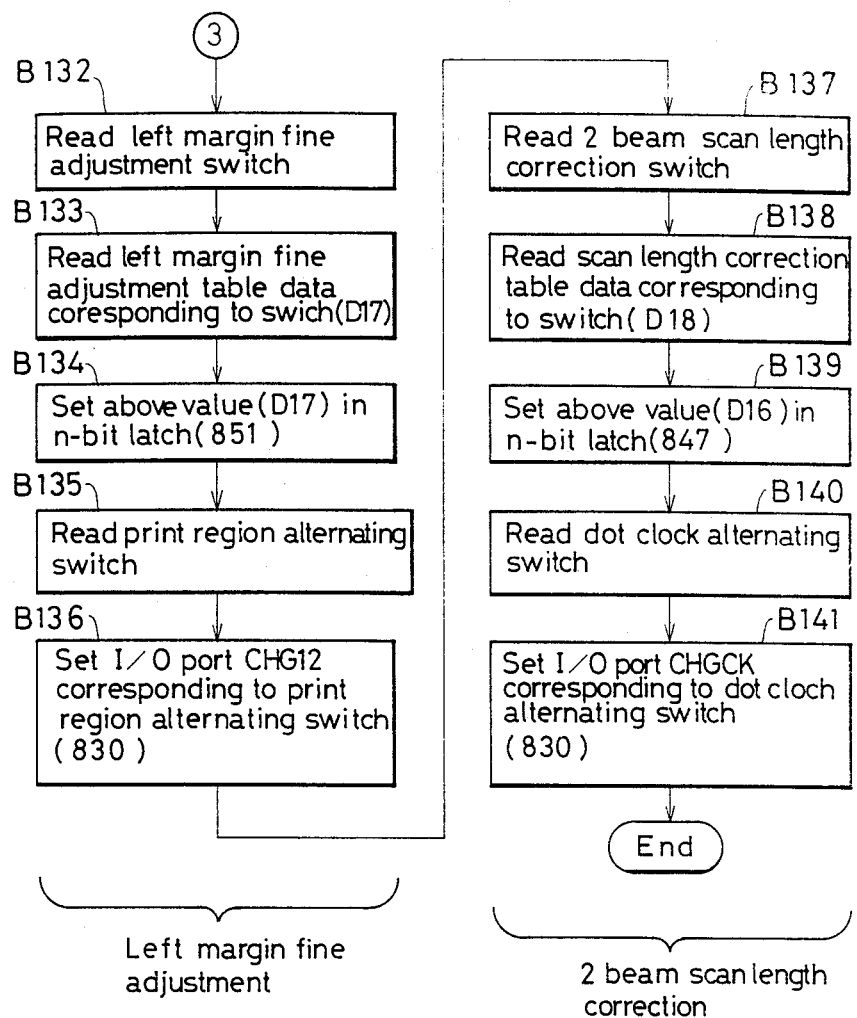

FIG. 31 and FIG. 32 are flow charts that show step A204 shown in FIG. 28.

The subroutine shown in FIG. 31 and FIG. 32 can be classified into a top margin coarse adjustment setting processing of step B101 to step B107, a bottom margin coarse adjustment setting processing of step B108 to step B113, a top margin fine adjustment setting processing of step B114 to step B119, a bottom margin fine adjustment setting processing of step B120 to step B123, a left margin coarse adjustment setting processing of step B124 to step B128, a right margin coarse adjustment setting processing of step B129 to step B131, a left margin fine adjustment setting processing of step B132 to step B136, and a two-beam scan length correction setting processing of step B137 to step B141, and their details are as shown in the figures.

Namely, in the coarse adjustment setting processing of step B101 to step 107, a first color top margin tble data is read (step B101), the top margin coarse adjustment switch is detected (step B102), and a top margin coarse adjustment table data D2 is read (step B103).

In step B104, the top margin coarse adjustment table data D2 is added to or substructed from the first color top margin table data D1 to obtain a value D3.

In step B105 when the status 1 does not indicate the two color mode (nagation of step B105), the value D3 is set in the first page top counter 859 (step B106), and the process proceed to a routine for bottom margin coarse adjustment. When the status 1 indicates the two color mode (affirmation of step B105), the value D3 is set in the second page top counter 861 (step B107), and the process proceeds to a routine having step B108 to step B113.

In step B108, a bottom margin table data D4 of a designated paper size is read, and in step B109, the first color top margin table data D1 is added to the bottom margin table data D4 to obtain a value D5.

In step B110, the margin coarse adjustment table data D2 is added to or subtracted from the value D5 to obtain a value D6.

In step B111 when the status 1 does not indicate the two color mode (nagation of step B111), the value D6 is set in the first page end counter 860 (step B113), and the process proceeds to a routine having step B114 to step B119 for the top margine file adjustment. When the status indicates the two color mode (affirmation of step B111), the value D6 is set in the second page end counter 862 (step B112), and the process proceeds to the routine of step B114 to step B119.

In step B114, a two color top margin table data D7 is read, in step B115, the top margin fine adjustment switch is detected, and in step B116, a top margin fine adjustment table data D8 corresponding to the switch is read.

In step B117, the margin coarse adjustment table data D2 and the fine adjustment table data D8 are added to and subtracted from the two color top margin table data D7 to obtain a value D9.

In step B118 when the status 1 does not indicate the two color mode (nagation of step B118), the process proceeds to a routine having step B120 to step B123 for the bottom margin fine adjustment. When the status 1 indicates the two color mode (affirmation of step B118), the value D9 is set in the second page top counter 861, and the process proceeds to the routine of step B120 to step B123.

In step B120, the two color top margin table data D7 is added to the bottom margin table data D4 to obtain a value D10, and in step B121, the margin coarse adjustment table D2 and margin fine adjustment data D8 is added to or substrated from the value D10 to obtain a value D11.

In step B122 when the status 1 does not indicate the two color mode (nagation of step B122), the process proceeds to a routine having step B124 to step B128 for a left margin coarse adjustment When the status 1 indicates the two color mode (affirmation of step B122), the value D11 is set in the second page end counter (step B123), and the process proceeds to the routine of step B124 to step B128.

In step B124, a left margin table data D12 is read, in step B125 the left margin coarse adjustment switch is detected, and in step B126 a left margin coarse adjustment table data D13 corresponding to the detected switch is read.

In step B127, a margin coarse adjustment table D13 is added to or substrated from the left margin table data D12 to obtain a value D14.

In step B128, the value D14 is set in the left margin counter 863 and the process proceeds to a routine having step B124 to step B131 for right margin coarse adjustment.

In step B129, a right margin table data D15 for a designated paper size is read and in step B130, the margin coarse adjustment table data D13 is added to or substrated from a right margin table data D15 to obtain a value D16.

In step B131, the value D16 is set in the right margin counter 864 and the process proceeds to a routine having step B132 to step B136 for right margin fine adjustment. In step B132, the left margin fine adjustment switch is detected, in step B133, a left margin fine adjustment table data D17 corresponding to the switch is read, and in step B134, the table data D17 is set in the n bit latch 851.

In step B135, a print range chaning switch is detected, in step B136 an output CHG12 of the I/O port 830 is set in accordance with the print range changing switch, and the process proceeds to a routine having step B137 to step B141 for a two beams scanning length correction.

In step B137, a two beams scanning length correction switch is detected, in step B138, a scanning length correction table data D18 is read, and in step B139, the table data D18 is set in the n bit latch 847. In step B140, the dot clock changing switch is detected, in step B141 an output CHGCK of the I/O port is set, and then the process of the step A204 shown in FIG. 27 is finished.

FIG. 33 is flow chart which shows the potential control during warm-up and the potential control before first print.

In the potential control during warm-up, the value CHDT1 of the first time controlled output by first charging is read from the table data (step C101), and set the value that is read in the D/A converter 576 (step C102). Further, the value (CHDT2) of the first time controlled output by second charging is read from the table data (step C103), and the value that is read is set in the D/A converter 582 (step C104).

Figure 35:
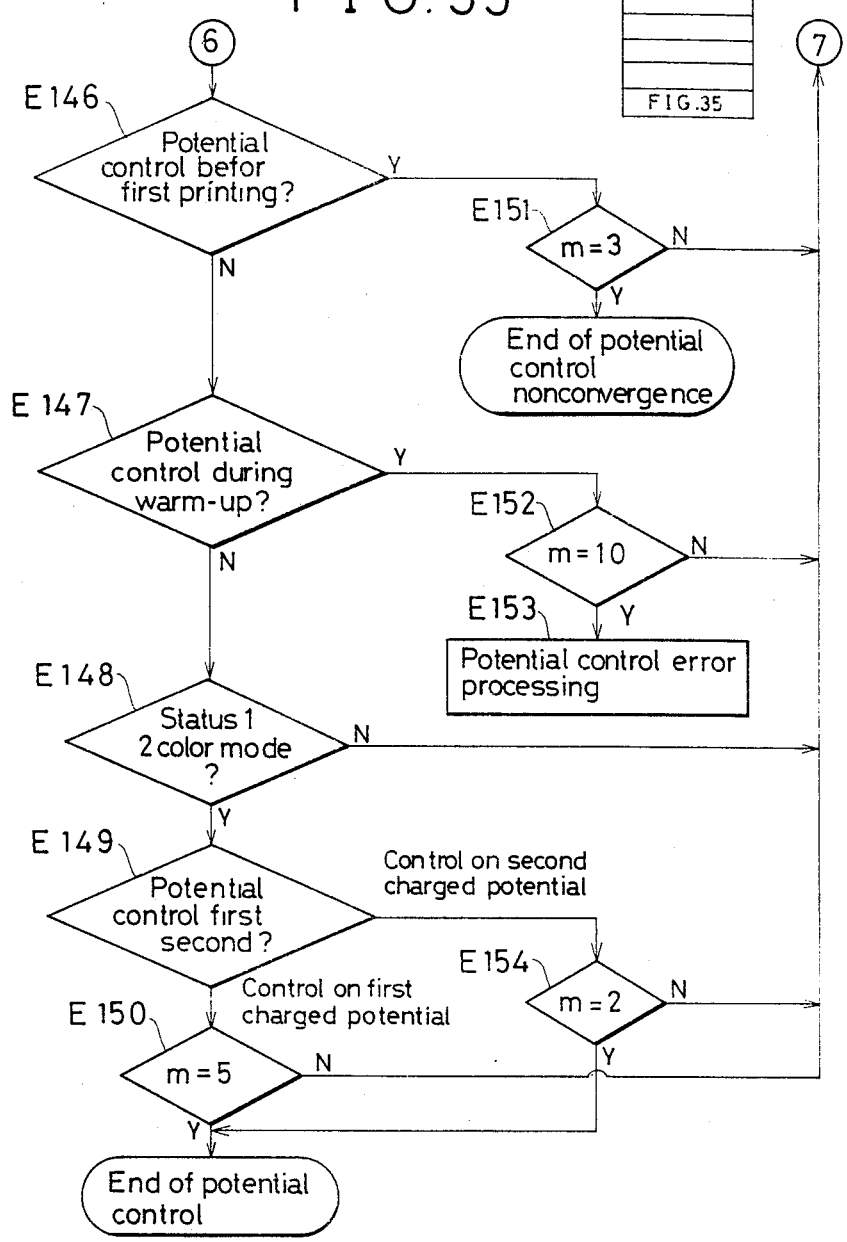

When the first charger is turned on in the ensuring step C105, a control on the potential by first charging is carried out (step C106) as shown in FIG. 34 and FIG. 35. After an ensuing delay processing (step C107), when the second charger 204 is turned on in step C108, a control on the potential by second charging is carried out (step C109).

Then, the number of time of the potential control, n, is incremented (step C110), and the steps from C105 to C111 are repeated until the number n of the potential control reaches three. When the control is repeated for three times, the first charger 201 and the second charger 204 are turned off (step C112), the potential control in warm-up is completed.

For the potential control before first print, if status 1 is not the second color mode (negation of step 101), the first charger 201 is turned on (step D102) to carry out the first charge potential control (step D103), as shown in FIG. 34 and FIG. 35. If it is the first color mode only (affirmation of step D104), the pre-first-print potential control is completed.

In addition, if there is the second color mode also (negation of step D104), after a delay processing (step D105), the second charger is turned on to carry out a second charged potential control (step D107) as shown in FIG. 34 and FIG. 35, completing the pre-first-print potential control.

Moreover, if status 1 is the second color mode in the initial step D101, the second color mode alone is executed so that the second charger 204 is turned on (step D106) to carry out a second charged potential control (step D107) as shown by FIG. 34 and FIG. 35, completing the pre-first-print potential control.

As described above, in the two color LBP199 embodying the present invention, one of the two laser beams irradiated from the laser scan motor between the beam irradiation starting point 900 and the beam scanning end point 901 is detected by the beam detecter 518 and the detected laser beams from the beam detecter 518 is converted to the beam detect signal to be transferred to the print data writing control circuit 513. And, the distances between the record starting points 905 and the beam detection starting points 902 in the horizontal direction of the paper are the same even if the paper size are different each other, therefore after an elapsed time corresponding to a length between a beam detecting starting point 902 and a record starting point 905, the data writing is carried out. Thus, the print starting points may be adjusted in accordance with the paper sizes.

The other hand, since the print starting points 913 are arranged a same point regardless the paper size and the elapse of time from a start of the data writting of the first laser beam 309 to a start of the data writting of the second laser beam 310 corresponds to the distance between the first laser beam 309 and the second laser beam 310, it is possible to set up the print starting points in accordance with the paper size.

Namely, the process of step A204 shown in FIG. 28 is carried out by the routine shown in FIGS. 31 and 32.

Namely, the top margin coarse adjustment is accomplished by adjusting the two set values in the first page top counter 859 and the second page top counter 861 in accordance with setting condition of the first setting means (DIP-SW etc.). Also, the top margin fine adjustment is carried out by correcting according to the read top margin fine adjustment table data D8 corresponding to the second setting means (DIP-SW etc.).

Minimum variable (by 1 bit of the switch) for the first and second setting means are integers of an output of the beam detector 1 and the minimum variable for the second setting means is small value than the minimum variable for the first setting means.

Moreover, the left margin coarse adjustment is carried out by adjusting the set value of the left margin counter 863 in accordance with the condition of the third setting means (DIP-SE etc.).

Also, the left margin fine adjustment is carried out at same time by correcting according to the left margin fine adjustment table data D17 responding to the fourth setting means (DIP-SE etc.).

Therefore, it is possible to fine adjust print starting points of plural size of papers with a small number time of adjustment, particularly to fine adjust each starting point for the first and second color. Namely, the print starting points for two color are correctly and speedly adjusted.

In summary, an image forming apparatus according to the present invention is capable of automatically, speedly, and correctly adjusting print starting points in accordance with the image forming ranges.

Various modifications will become possible for those skilled in the art after receiving the teachings of the present disclosure without departing from the scope thereof.

What is claimed is:

1. An image forming apparatus in which a data is recorded by irradiating laser beams on a charged image bearing member to form an electrostatic latent image and by developing and transferring the electrostatic latent image, comprising:

means for charging the image bearing member;

at least two image forming means disposed around the recording medium for recording data in a plurality of print modes, said image forming means comprising means for forming electrostatic latent images on the image bearing member by scanning laser beams in accordance with the data to be recorded and means for developing the electrostatic latent image, the electrostatic latent image forming means is constructed to irradiate a laser beam between a beam irradiation starting point and a data record starting point;

means for supplying a print data transfer start signal and the data to be recorded;

means for detecting the laser beam from the electrostatic latent image forming means;

at least two counter means for counting beam detecting signals from said detecting means in accordance with a print data transfer start signal and for generating allowable signals when the counted values of the detecting signal reach to predetermined set values;

write control means for controlling said data supplying means and the electrostatic latent image forming means such that the data to be recorded are supplied from said data supplying means upon the generation of the allowable signals and in accordance with the data to be recorded electrostatic latent images are formed on the image bearing member by the electrostatic latent image forming means, whereby each of print starting points is adjusted by adjusting the set values of said counter means.

2. The image forming apparatus as claimed in claim 1, wherein the set values of said counter means is determined in accordance with image forming images in which the images are formed.

3. The image forming apparatus as claimed in claim 1, wherein said first counter means in constructed to count the detecting signal of the laser beam from the first electrostatic latent image forming means in a first print mode, said second counter means is constructed to count the detecting signal of the laser beam from the second electrostatic latent image forming means in a second print mode, said write control means is constructed to control said data supplying means and the first electrostatic latent image forming means in such a manner that a first data to be recorded is supplied from said data supplying means in accordance with the allowable signal from said first counter means and a first latent image is formed on the image bearing member by the first electrostatic latent image forming means, and said write control means further is constructed to control said data supplying means and the second electrostatic latent image forming means in such a manner that a second data to be recorded is supplied from said data supplying means in accordance with the allowable signal from said second counter means and a second latent image is formed on the image bearing member by the second electrostatic latent image forming means.

4. The image forming apparatus as claimed in claim 1, wherein said detecting means is constructed to detect a scanning point of the laser beam and to output the detecting signals corresponding to the scanning point of the laser beam.

5. The image forming apparatus as claimed in claim 3, wherein a set value of said first counter means is determined according to an image forming range of the first data to be recorded and a set value of said second counter means is determined according to an image forming range of the second data to be recorded.

6. The image forming apparatus as claimed in claim 1, wherein the set values of said counter means are automatically determined with a microprocessor control system.

7. The recording apparatus as claimed in claim 1, wherein the first print mode is a first uni-color print mode and the second print mode is a second uni-color print mode.

8. The recording apparatus as claimed in claim 1, wherein the first print mode is a uni-color print mode and the second print mode is a multi-color print mode.

9. The recording apparatus as claimed in claim 7, wherein the printed color is the second uni-color print mode is different from the printed color in the first uni-color print mode.

* * * * *